US011831575B2

United States Patent
Sha et al.

(10) Patent No.: US 11,831,575 B2
(45) Date of Patent: *Nov. 28, 2023

(54) ELECTRONIC DEVICE, METHOD AND APPARATUS FOR WIRELESS COMMUNICATION SYSTEM FOR CHANNEL ESTIMATION

(71) Applicant: Sony Group Corporation, Tokyo (JP)

(72) Inventors: Ziyuan Sha, Beijing (CN); Zhaocheng Wang, Beijing (CN); Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/980,567

(22) Filed: Nov. 4, 2022

(65) Prior Publication Data
US 2023/0064870 A1 Mar. 2, 2023

Related U.S. Application Data

(63) Continuation of application No. 16/648,245, filed as application No. PCT/CN2018/115288 on Nov. 14, 2018, now Pat. No. 11,552,756.

(30) Foreign Application Priority Data

Nov. 15, 2017 (CN) .......................... 201711125720.0

(51) Int. Cl.
*H04L 5/00* (2006.01)
*H04W 72/04* (2023.01)

(52) U.S. Cl.
CPC ........... *H04L 5/0048* (2013.01); *H04W 72/04* (2013.01)

(58) Field of Classification Search
CPC .............. H04L 5/0048; H04L 25/0204; H04L 25/0232; H04L 25/022; H04L 5/005; H04W 72/04
See application file for complete search history.

(56) References Cited

U.S. PATENT DOCUMENTS 11,552,756 B2 * 1/2023 Sha ........................ H04L 5/005
2006/0133401 A1 6/2006 Ise et al.
(Continued)

FOREIGN PATENT DOCUMENTS

CN 102549963 A 7/2012
CN 102577486 A 7/2012
(Continued)

OTHER PUBLICATIONS

International Search Report and Written Opinion dated Jan. 30, 2019 for PCT/CN2018/115288 filed on Nov. 14, 2018, 10 pages.
(Continued)

*Primary Examiner* — Justin T Van Roie
(74) *Attorney, Agent, or Firm* — XSENSUS LLP

(57) ABSTRACT

An electronic device and method for wireless communication system, and a storage medium. In the method, reference signal are carried merely on a part of communication sources for channel estimation, channel states on the communication resources carrying the reference signal are estimated, and conditions of channel paths from a transmitter to a receiver are estimated by using the estimated channel states of the communication resources. Thereby, channel states on other communication resources from the transmitter to the receiver can be obtained from the estimated channel path conditions.

19 Claims, 22 Drawing Sheets

(56) References Cited

U.S. PATENT DOCUMENTS

| | | |
|---|---|---|
| 2012/0082252 A1 | 4/2012 | Annavajjala et al. |
| 2016/0261325 A1 | 9/2016 | Ko et al. |
| 2017/0013403 A1 | 1/2017 | Sen |
| 2017/0180063 A1 | 6/2017 | Berscheid et al. |
| 2018/0375568 A1 | 12/2018 | De Rosa et al. |
| 2021/0013954 A1 | 1/2021 | Zhao et al. |

FOREIGN PATENT DOCUMENTS

| | | |
|---|---|---|
| CN | 102939787 A | 2/2013 |
| CN | 104702543 A | 6/2015 |
| CN | 104735691 A | 6/2015 |
| EP | 1928136 A2 | 6/2008 |
| WO | 2017/155016 A1 | 9/2017 |
| WO | 2017/171617 A1 | 10/2017 |
| WO | 2017/214988 A1 | 12/2017 |

OTHER PUBLICATIONS

Van der Bergh et al. "LTE in the Sky: Trading Off Propagation Benefits with Interference Costs for Aerial Nodes", May 2016, Wireless Communications, Networking, and Positioning with UAVs (Year: 2016).

Moreira et al. "A Context-aware Communication Link for Unmanned Aerial Vehicles", 2010 Sixth Advanced International Conference on Telecommunications (Year: 2010).

\* cited by examiner

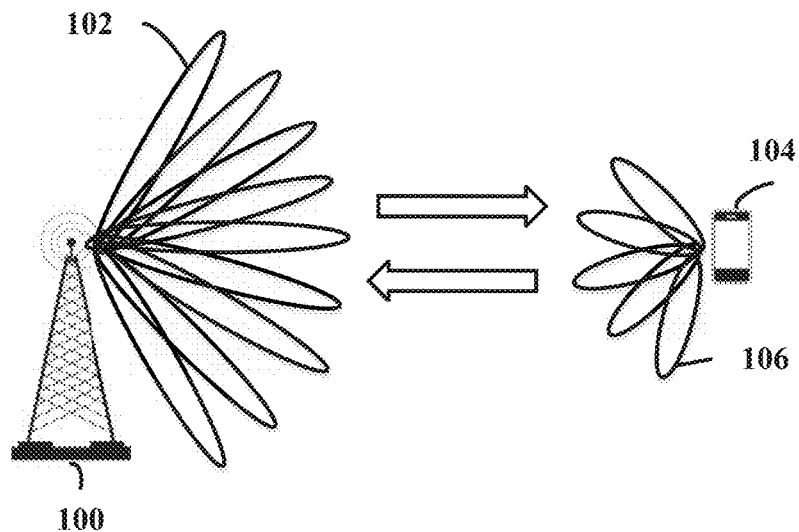
FIG. 3
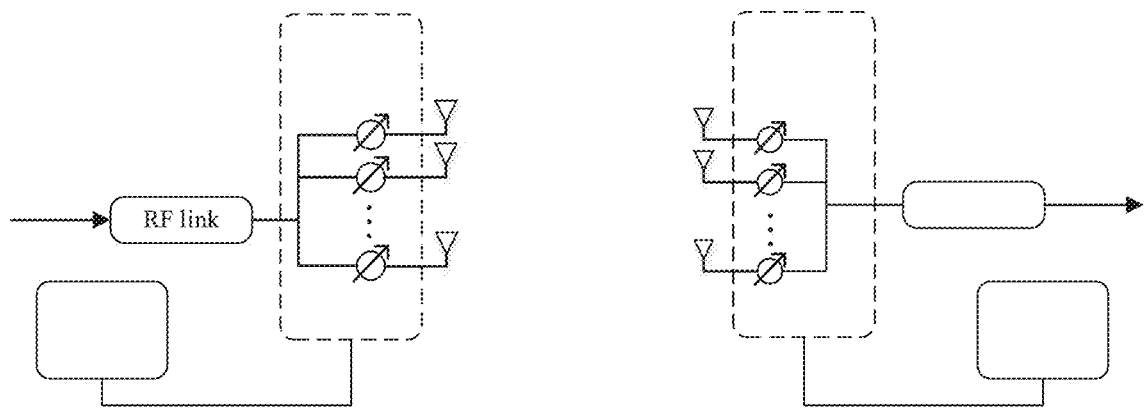
FIG. 4a
FIG. 4b

ELECTRONIC DEVICE, METHOD AND APPARATUS FOR WIRELESS COMMUNICATION SYSTEM FOR CHANNEL ESTIMATION

CROSS-REFERENCE TO RELATED APPLICATIONS

The present disclosure is a continuation of U.S. application Ser. No. 16/648,245, filed Mar. 18, 2020, now U.S. Pat. No. 11,552,756, which is based on PCT filing PCT/CN2018/115288, filed Nov. 14, 2018, which claims the benefit of priority to Chinese patent Application No. 201711125720.0 filed on Nov. 15, 2017, each of which is hereby incorporated by reference in its entirety.

FIELD OF THE INVENTION

The present disclosure relates generally to a wireless communication system and, in particular, to a technique for channel estimation.

BACKGROUND

With the development and widespread application of mobile Internet technology, wireless communication has unprecedentedly met people's voice and data communication needs. With increase of the used frequency bands (such as 26 GHz, 60 GHz or higher frequency bands), wireless channels will definitely suffer greater negative effects such as path loss, atmospheric absorption loss and the like compared with lower frequency bands (such as 2 GHz). In order to provide higher communication quality and capacity, a wireless communication system uses various technologies at different levels.

In recent years, Massive Multi-Input Multi-Output (MIMO) technology and millimeter wave technology are considered to be parts of key technologies of 5G in the future, and have attracted extensive attention in the academics and industry. The millimeter wave band has a large amount of available spectrum resources, which can meet the growing traffic demand of mobile communications. In addition, because the millimeter wave has a short wavelength, according to the antenna theory, sizes of antennas for a millimeter wave system are also small, making it possible to place hundreds or even thousands of antennas in a small range of space, which further contribute to application of a large-scale antenna technology in a real-world system.

In addition, in the large-scale antenna technology, a beam forming technology can be used to effectively make up for the shortcomings of millimeter wave channel fading excessively, and provide a possibility of applying the millimeter wave technology in mobile communications. Beamforming can improve the directivity of antenna transmission and/or reception to provide a beamforming gain to compensate for the loss of wireless signals. For this reason, 3GPP introduces a concept of Beam Management in formulation of 5G standards, in which one important process is Beam Sweeping. In the beam sweeping technology, a Beam Sweeping process is used to find matching transmission beams and receiving beams between a base station and a terminal equipment, thereby establishing a beam pair link (BPL) between the base station and the terminal equipment.

In the communication of millimeter wave bands, due to introduction of a large-scale antenna array, the dimension of a channel matrix (the number of receiver antennas multiplied by the number of transmitter antennas) becomes very large, which makes direct estimation of the channel matrix to be more complicated. The overhead of the reference signal will be greater.

Disclosure of the Invention

In view of the above, the present disclosure provides an electronic device, method, and apparatus for a wireless communication system, and a storage medium.

One aspect of the present disclosure relates to an electronic device for a receiver in a wireless communication system. According to an embodiment, the electronic device comprises a processing circuitry configured to: estimate, based on reference signals from a transmitter of the wireless communication system, channel states on communication resources carrying the reference signals, wherein the reference signals are distributed over communication resources of the communication system in a first frequency domain range, and frequency domain resources of the communication system are divided into a plurality of orthogonal frequency domain ranges including the first frequency domain range; and estimate conditions of channel paths from the transmitter to the receiver using the estimated channel states on the communication resources; wherein channel states on communication resources of other frequency domain ranges from the transmitter to the receiver are derived from the estimated conditions of the channel paths.

One aspect of the present disclosure relates to an electronic device for a receiver in a wireless communication system. According to an embodiment, the electronic device comprises a processing circuitry configured to: estimate, based on reference signals from a transmitter of the wireless communication system, channel states on communication resources carrying the reference signals, wherein the reference signals are distributed at a predetermined interval over frequency domain, and the predetermined interval is determined based on a maximum delay spread of channel and a frequency domain interval between adjacent communication resources in the communication system; and estimate conditions of channel paths from the transmitter to the receiver using the estimated channel states on the communication resources; wherein channel states on communication resources of other frequency domain ranges from the transmitter to the receiver are obtained from the estimated conditions of the channel paths.

One aspect of the present disclosure relates to an electronic device for a transmitter of a wireless communication system. According to some embodiments, the electronic device comprises a processing circuitry configured to: determine that reference signals are to be arranged only on communication resources of the communication system in a first frequency domain range; and transmit the reference signals to a receiver of the wireless communication system by using the communication resources in the first frequency domain range, wherein frequency domain resources of the communication system are divided into a plurality of orthogonal frequency domain ranges including the first frequency domain range; wherein conditions of channel paths from the transmitter to the receiver are estimated by using the estimated channel states on the communication resources; and wherein channel states of other frequency domain ranges from the transmitter to the receiver on communication resources are obtained from the estimated conditions of the channel paths.

One aspect of the present disclosure relates to an electronic device for a transmitter of a wireless communication system. According to some embodiments, the electronic device comprises a processing circuitry configured to: transmit reference signals to a receiver of the wireless communication system by using communication resources, wherein the reference signals are distributed at a predetermined interval over frequency domain, and the predetermined interval is determined based on a maximum delay spread of channel and a frequency domain interval between adjacent communication resources in the communication system, and wherein channel states on communication resources carrying the reference signals are estimated based on the reference signals from the transmitter; wherein conditions of channel paths from the transmitter to the receiver are estimated by using the estimated channel states on the communication resources; wherein channel states on other communication resources from the transmitter to the receiver are obtained from the estimated conditions of the channel paths.

Another aspect of the present disclosure relates to a method for a receiver in a wireless communication system. According to some embodiments, the method comprises: estimating, based on reference signals from a transmitter of the wireless communication system, channel states on communication resources carrying the reference signals, wherein the reference signals are distributed over communication resources of the communication system in a first frequency domain range, and frequency domain resources of the communication system are divided into a plurality of orthogonal frequency domain ranges including the first frequency domain range; and estimating conditions of channel paths from the transmitter to the receiver using the estimated channel states on the communication resources; wherein channel states on communication resources of other frequency domain ranges from the transmitter to the receiver are derived from the estimated conditions of the channel paths.

Another aspect of the present disclosure relates to a method for a receiver in a wireless communication system. According to some embodiments, the method comprises: estimating, based on reference signals from a transmitter of the wireless communication system, channel states on communication resources carrying the reference signals, wherein the reference signals are distributed at a predetermined interval over frequency domain, and the predetermined interval is determined based on a maximum delay spread of channel and a frequency domain interval between adjacent communication resources in the communication system; and estimating conditions of channel paths from the transmitter to the receiver using the estimated channel states on the communication resources; wherein channel states on communication resources of other frequency domain ranges from the transmitter to the receiver are obtained from the estimated conditions of the channel paths.

Another aspect of the present disclosure relates to a method for a transmitter in a wireless communication system. According to some embodiments, the method comprises: determining that reference signals are to be arranged only on communication resources of the communication system in a first frequency domain range; and transmitting the reference signals to a receiver of the wireless communication system by using the communication resources in the first frequency domain range, wherein frequency domain resources of the communication system are divided into a plurality of orthogonal frequency domain ranges including the first frequency domain range; wherein conditions of channel paths from the transmitter to the receiver are estimated by using the estimated channel states on the communication resources; and wherein channel states on communication resources of other frequency domain ranges from the transmitter to the receiver are obtained from the estimated conditions of the channel paths.

Another aspect of the present disclosure relates to a method for a transmitter in a wireless communication system. According to some embodiments, the method comprises: transmitting reference signals to a receiver of the wireless communication system by using communication resources, wherein the reference signals are distributed at a predetermined interval over frequency domain, and the predetermined interval is determined based on a maximum delay spread of channel and a frequency domain interval between adjacent communication resources in the communication system, and wherein channel states on communication resources carrying the reference signals are estimated based on the reference signals from the transmitter; wherein conditions of channel paths from the transmitter to the receiver are estimated by using the estimated channel states on the communication resources; wherein channel states on other communication resources from the transmitter to the receiver are obtained from the estimated conditions of the channel paths.

Yet another aspect of the present disclosure relates to a computer-readable storage medium storing one or more instructions. In some embodiments, the one or more instructions, when executed by one or more processors of an electronic device, cause the electronic device to perform methods according to various embodiments of the present disclosure.

Yet another aspect of the present disclosure relates to various devices including components or units for performing operations of methods according to embodiments of the present disclosure.

The above content is provided to summarize some exemplary embodiments to provide a basic understanding of various aspects of the subject matter described herein. Therefore, the above-mentioned features are merely examples and should not be construed as narrowing the scope or spirit of the subject matter described herein in any way. Other features, aspects, and advantages of the subject matter described herein will become apparent from the following detailed description with reference to the accompanying drawings.

DESCRIPTION OF THE DRAWINGS

A better understanding of the present disclosure may be obtained when considering following detailed description of embodiments in conjunction with the accompanying drawings. The same or similar reference numerals are used in the drawings to indicate the same or similar components. Figures are included in the present specification together with the following detailed description and form a part of the specification, for illustrating the embodiments of the present disclosure and explaining the principles and advantages of the present disclosure. Among them:

FIG. 3 schematically illustrates an exemplary beamforming operation.

FIGS. 4a and 4b are diagrams respectively illustrating configurations of a base station side and a user equipment side in a single user system.

Figure 1:
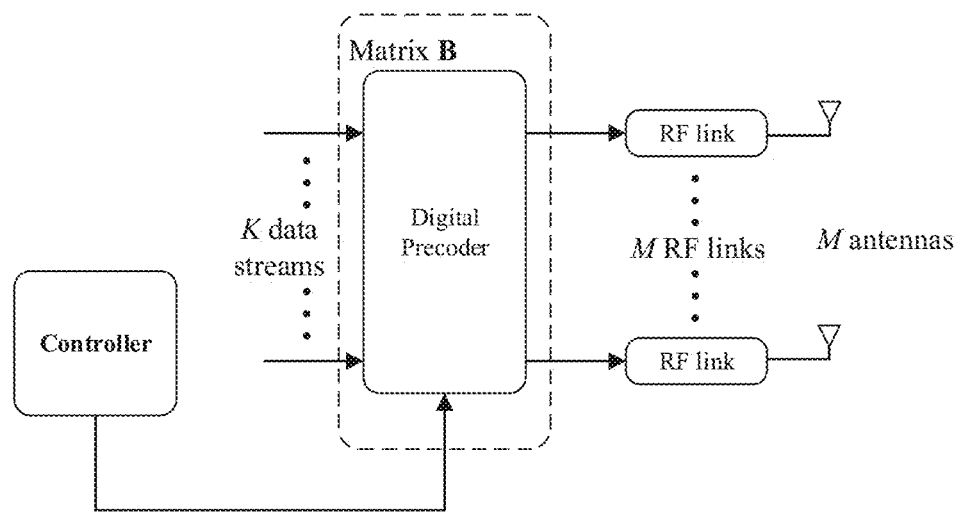
FIG. 1 schematically illustrates a conceptual structure of a base station.

Although the embodiments described in this disclosure may be susceptible to various modifications and alternative forms, specific embodiments thereof are shown by way of example in the drawings and are described in detail herein. It should be understood, however, that the drawings and detailed description thereof are not intended to limit the embodiments to the particular forms disclosed, but on the contrary, the intention is to cover all modifications, equivalents, and alternatives falling within the spirit and scope of the claims. Program.

DETAILED DESCRIPTION OF PREFERRED EMBODIMENTS

Representative applications of various aspects of the device and method according to the present disclosure are described below. These examples are described only to enrich the context and to help to understand the described embodiments. Therefore, it is clear to those skilled in the art that the embodiments described below can be implemented without some or all of the specific details. In other cases, well-known process steps have not been described in detail in order to avoid unnecessarily obscuring the described embodiments. Other applications are possible, and the solutions of the present disclosure are not limited to these examples.

Typically, a wireless communication system includes at least a base station and a user equipment (UE), and the base station provides communication services for one or more UEs.

In this disclosure, the term "base station" has the full breadth of its usual meaning and includes at least a wireless communication station that is used as a part of a wireless communication system or a radio system to facilitate communication. As an example, the base station may be, for example, an eNB in a 4G communication standard, a gNB in a 5G communication standard, a remote radio head, a wireless access point, a UAV control tower, or a communication apparatus performing similar functions. Application examples of the base station will be described in detail below with reference to the drawings.

In this disclosure, the term "user equipment" or "UE" has the full breadth of its usual meaning and includes at least terminal equipment that is used as part of a wireless communication system or a radio system to facilitate communication. As an example, the UE may be a terminal equipment such as a mobile phone, a laptop computer, a tablet computer, a vehicle on-board communication apparatus, or the like, or an element thereof. Application examples of the UE will be described in detail below.

In the present disclosure, the terms "transmitter side"/"transmitting side" have the full breadth of their usual meanings, and generally indicate a side in a communication system for transmitting a signal flow. Depending on the direction of the signal flow in the communication system, such as uplink/downlink signal transmission, the "transmitter side"/"transmitting side" can indicate "base station" or "user equipment" side of the communication system. Similarly, the terms "receiver side"/"receiving side" have the full breadth of their usual meanings and may accordingly indicate the "user equipment" or "base station" side in a communication system.

It should be noted that although the embodiments of the present disclosure are mainly described below based on a communication system including a base station and a user equipment, these descriptions can be correspondingly extended to a case of a communication system including a transmitter side and a receiver side. For example, depending on the direction of the signal flow in the communication system, the operation at the transmitter side may correspond to the operation of the base station or the operation of the user equipment, and the operation at the receiver side may correspond to the operation of the user equipment or the operation of the base station.

The base station and the UE may have multiple antennas supporting MIMO technology. The use of MIMO technology enables the base station and the UE to use the spatial domain to support spatial multiplexing, beamforming, and transmission diversity. Spatial multiplexing can be used to transmit different data streams in the same frequency simultaneously. The data streams can be sent to a single UE to increase the data rate (can be classified as SU-MIMO technology) or to multiple UEs to increase the total system capacity (can be classified as MU-MIMO technology). This is done by spatially precoding each data stream (i.e., performing amplitude scaling and/or phase adjustment) and then transmitting each spatially precoded stream on downlinks (DL) from the base station to the UE via multiple transmission antennas. The spatially precoded data streams arrive at one or more UEs with different spatial signatures, which enables each UE to receive the data stream via its multiple antennas and restore one or more data streams destined for that UE. On uplinks (UL) from the UE to the base station, each UE transmits a spatially pre-coded data stream via its multiple antennas, which enables the base station to receive the data streams via its antennas and identify the source of each spatially pre-encoded data stream.

In a wireless communication system, generally, at a transmitting side (for example, a base station side) and a receiving side (for example, a user equipment), each antenna is connected to a radio frequency link for transmission and reception. Generally speaking, in operation, at the transmitting side, a data stream to be transmitted is first subject to baseband processing, and then converted into a radio frequency signal via a radio frequency link for transmission through a corresponding antenna, and the corresponding radio frequency link at the receiving side processes the received radio frequency signal into a baseband signal, and then further performs baseband processing to obtain the desired data stream.

Generally, in baseband data processing, in order to enable multiple data streams to multiplex the same transmission resources for transmission via radio frequency links and corresponding antennas, a digital precoding architecture is mainly used. Amplitudes of signals transmitted via respective radio frequency links can be adjusted so as to reduce interference between multiple data signals carried on the same transmission resources. Such processing performed before data is transmitted via a radio frequency link and an antenna may be referred to as baseband digital processing of data at a transmitting side.

For a digital precoding matrix used in a digital precoder, there usually are two design schemes: codebook based design scheme and non-codebook based design scheme. In the codebook based design scheme, the digital precoding matrix must be selected from a preset codebook. In the non-codebook based design scheme, there is no such constraint, and the base station and the user equipment can design the precoding matrix based on Channel State Information (CSI). The above-mentioned digital precoding processing can be regarded as belonging to a part of baseband digital processing in the wireless communication.

For example, FIG. 1 schematically illustrates a conceptual structure of a prior art base station. As shown in FIG. 1, in the digital precoding architecture, the base station is equipped with M antennas (M is an integer and M≥1), and each antenna is arranged with a corresponding radio frequency link. Under the control of a controller, a digital precoder obtains K-way data streams (K is an integer and K≥1) and performs digital precoding on the K-way data streams (for example, the K-way data stream passes through a M×K digital precoding matrix B). The encoded data is sent to one or more users via radio frequency link(s) and antenna(s).

Correspondingly, the user side may have multiple configuration forms, so that corresponding baseband digital processing can be performed on the encoded data received via the radio frequency links in order to obtain the desired data stream.

Figure 2:
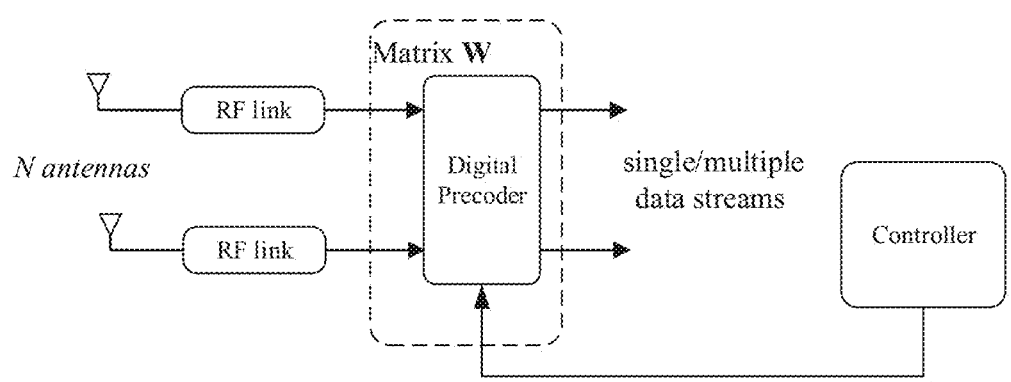
FIG. 2 schematically illustrates a conceptual structure of a user equipment.

FIG. 2 shows a user side equipped with multiple antennas. As shown in FIG. 2, the user side is equipped with N antennas (N is an integer and N≥1). Each antenna transmits the received data to the digital precoder through a corresponding radio frequency link. Under the control of the controller, the digital precoder uses a digital precoding matrix W with a size of Ku×N (Ku is an integer and Ku≥1) to digitally precode the received data, thereby obtaining a single-way data (when Ku=1) or multi-way data (when Ku>1).

For a digital precoding matrix used in a digital precoder, there usually are two design schemes: codebook based design scheme and non-codebook based design scheme. In the codebook based design scheme, the digital precoding matrix must be selected from a preset codebook. In the non-codebook based design scheme, there is no such constraint, and the base station and the user equipment can design the precoding matrix based on Channel State Information (CSI). The above-mentioned digital precoding processing can be regarded as belonging to a part of baseband digital processing in the wireless communication.

Further, in a wireless communication system, especially a high-frequency communication system such as a millimeter-wave communication system, each radio frequency link can be used to connect multiple phase shifters and antennas, and at least one radio frequency link can be used to form a directional beam. Thus, an analog beamforming training/scheme is implemented. An analog beamforming training refers to a process of optimizing RF configuration information for the base station and user equipment (for example, configuration values for the phase shifters related to the base station and the user equipment, also known as weight vectors for the phase shifters). The effect is to improve the receiving signal-to-noise ratio of the user equipment. Taking downlink as an example, the base station configures values for multiple phase shifters connected to multiple antennas of the base station to form directional transmission beams. The user equipment configures values for multiple phase shifters connected to multiple antennas of the user equipment to form directional receiving beams, and transmission beams of the base station and receiving beams of the user equipment form sets of beam pairs for the downlink. The process of downlink beamforming training is a process of finding an optimal beam pair composed of an optimal transmission beam of the base station and an optimal receiving beam of the user equipment. Similarly, in the uplink, the receiving beams of the base station and the transmission beams of the user equipment also form a set of beam pairs.

The following briefly describes a beam sweeping process in the wireless communication system with reference to FIG. 3. A rightward arrow in FIG. 3 indicates a downlink direction from the base station 100 to the terminal equipment 104, and a leftward arrow indicates an uplink direction from the terminal equipment 104 to the base station 100. As shown in FIG. 3, the base station 100 includes $n_{t\_DL}$ downlink transmission beams ($n_{t\_DL}$ is a natural number greater than or equal to 1, and exemplarily illustrated as $n_{t\_DL}=9$ in FIG. 3), and the terminal equipment 104 includes $n_{r\_DL}$ downlink receiving beams ($n_{r\_DL}$ is a natural number greater than or equal to 1, and exemplarily illustrated as n $n_{r\_DL}=5$ in FIG. 3). In addition, in the wireless communication system shown in FIG. 3, the number $n_{r\_UL}$ of uplink receiving beams of the base station 100 and the coverage range of each uplink receiving beam are the same as that of the downlink transmission beams. The number $n_{t\_UL}$ of uplink transmission beams of the terminal equipment 104 and the coverage range of each uplink transmission beam are the same as that of the downlink receiving beams. It should be understood that according to the system requirements and settings, the uplink receiving beams and the downlink transmission beams of the base station can have different coverage ranges and amounts, so it is for the terminal equipment.

As shown in FIG. 3, during the downlink beam sweeping process, the base station 100 sends $n_{r\_DL}$ downlink reference signals to the terminal equipment 104 via each of $n_{t\_DL}$ downlink transmission beams 102, and the terminal equipment 104 receives the $n_{r\_DL}$ downlink reference signals by using $n_{r\_DL}$ downlink receiving beams respectively. In this way, the base station 100 send $n_{t\_DL} \times n_{r\_DL}$ downlink reference signals to the terminal equipment 104 via $n_{t\_DL}$ downlink transmit beams sequentially, and the terminal equipment 104 receives $n_{t\_DL}$ downlink reference signals via each downlink receiving beam 106, that is, receives a total of $n_{t\_DL} \times n_{r\_DL}$ downlink reference signals from the base station 100 via the $n_{r\_DL}$ downlink receiving beams. The terminal equipment 104 measures the $n_{t\_DL} \times n_{r\_DL}$ downlink reference signals (such as measuring the signal received powers of the downlink reference signals (such as RSRP)), so that a downlink transmission beam of the base station 100 and a downlink receiving beam of the terminal equipment 104 when the measurement result is better or the best are determined as a matching transmission and receiving beam pair for downlink, and a downlink beam pair link (hereinafter referred to as BPL) is established.

During the uplink beam sweeping, similar to the downlink beam sweeping, the terminal equipment 104 sends $n_{r\_UL}$ uplink reference signals to the base station 100 via each of $n_{t\_UL}$ uplink transmission beams 106, and the base station 100 receives the $n_{r\_UL}$ uplink reference signals by using $n_{r\_UL}$ uplink receiving beams respectively. In this way, the terminal equipment 104 sends $n_{t\_UL} \times n_{r\_UL}$ uplink reference signals to the base station 100 via the $n_{t\_UL}$ uplink transmission beams sequentially, and the base station 100 receives $n_{t\_UL}$ uplink reference signals via each uplink receiving beam 102, that is, the base station 100 receives a total of $n_{r\_UL} \times n_{t\_UL}$ uplink reference signals from the terminal equipment 104 via the $n_{r\_UL}$ uplink receiving beams. The base station 100 measures the $n_{r\_UL} \times n_{t\_UL}$ uplink reference signals (such as measuring signal received powers of the uplink reference signals (such as RSRP)), so that an uplink transmission beam of the terminal equipment 104 and an uplink receiving beam of the base station 100 when the measurement result is better or the best are determined as a matching transmission and receiving beam pair for uplink, and an uplink beam pair link is established.

It should be understood that the uplink receiving beams and the downlink transmission beam of the base station may have different coverage ranges and amounts, and the uplink transmission beams and the downlink receiving beam of the terminal equipment may have different coverage ranges and amounts, and the foregoing determination operation may still be performed similarly.

The receiving beams and transmission beams of the base station and the terminal equipment can be generated from a Discrete Fourier Transform (DFT) vector. The following takes downlink transmission beams on the base station side as an example for description. The uplink receiving beams on the base station side and the transmission/receiving beams on the terminal equipment side can also be generated by a similar method.

For example, assuming that the base station is equipped with $n_t$ transmitting antennas, an equivalent channel from the base station to the terminal equipment can be represented as a $n_t \times 1$ vector H. The DFT vector u can be expressed as:

$$u = \left[ 1 \quad e^{j\frac{2\pi}{C}} \quad \ldots \quad e^{j\frac{2\pi(n_t-1)}{C}} \right]^T$$

Among them, the length of the DFT vector u is $n_t$, C represents a parameter for adjusting width and beamforming gain of a beam, and "T" represents a transposition operator.

Multiplying the equivalent channel H from the base station to the terminal equipment by the DFT vector u can obtain a transmission beam of the base station (for example, one of the downlink transmission beams shown in FIG. 3).

In one embodiment, the parameter C used to adjust the width and beamforming gain of a beam in the above formula can be expressed by the product of two parameters $O_2$ and $N_2$. By adjusting the two parameters $O_2$ and $N_2$ respectively, the width and beamforming gain of the beam can be adjusted. In general, the larger the number $n_t$ of antennas is, or the larger the parameter C (such as the product of $O_2$ and $N_2$) is, the stronger the obtained spatial directivity of the beam is, but the narrower the beam width is generally. In one embodiment, let $O_2=1$ and $N_2=1$, the DFT vector u thus obtained is a vector in which $n_t$ elements all are 1.

After the downlink beam sweeping and uplink beam sweeping processes have finished, the established BPL is used to perform subsequent data and/or control signal transmission. The above-mentioned process of determining a matching transmitting and receiving beam pair for the base station and the terminal equipment through beam sweeping is sometimes referred to as a beam training process.

A millimeter-wave communication system can employ multiple working modes, such as point-to-point mode, single-user mode, and multi-user mode. The point-to-point mode can be used for backhaul between base stations (BS), the single-user mode and multi-user mode can be used for communication between the base station and one or more user equipment (UE). In terms of implementation architecture, a pure analog beamforming architecture (such as a fully connected architecture and a sub-connection architecture which are not combined with digital precoding), a fully-connected analog-digital mixed precoding architecture, or a sub-connected analog-digital mixed precoding architecture can be employed.

FIGS. 4a and 4b show configurations at the base station side and the user side in a single-user system, respectively. As shown in FIG. 4a and FIG. 4b, in the user side and the base station side, each radio frequency link is connected to a set of phase shifters, and each phase shifter is connected to its corresponding antenna. The values (such as phase values) of a set of phase shifters may be indicated by a set of configuration parameters, such as a DFT vector, also called as a weight vector or a beam vector. Herein, the weight vector at the base station side is represented as f and the weight vector at the user side is referred as w. Since in this example, the phase shifter only adjusts the phase of the signal without changing its amplitude, the magnitude of each element in the weight vector is 1. In a millimeter-wave communication system of this architecture, due to limited number of radio frequency links, neither the base station side nor the user side can directly estimate the channel state information. Therefore, the common analog beamforming scheme uses a method based on an analog Tx/Rx codebook. A codebook is a set of weight vectors. Assume that a codebook at the base station side is F, its codebook size is P (including P weight vectors), a codebook at the user side is W, and its codebook size is Q (including Q weight vectors), then a weight vector at the base station side must be selected from the codebook F at the base station side, and a weight vector at the user side must be selected from the codebook W at the user side.

When the millimeter wave communication is performed between the base station side and the user side, a weight vector in the codebook which is intended to be used shall be determined by beam training in advance. In the beam training, for example, a weight vector used to form the best beam can be determined by a maximal signal-to-noise ratio criterion, which can be expressed as the following formula:

$$\{w_{opt}, f_{opt}\} = \operatorname{argmax} |w^H H f| \text{ where } w \in W, f \in F$$

In the above formula, $H \in \mathbb{C}^{N \times M}$ represents the downlink channels between the base station side and the user side. W is a candidate set (codebook) for the weight vector at the user side, and F is a candidate set (codebook) for the weight vector at the base station side. $w_{opt}$, $f_{opt}$ are the determined optimal weight vectors for the user side and base station side.

Due to the characteristic that a millimeter wave channel path has large attenuation, and the number of scatters of the millimeter wave multipath channel is small, the millimeter wave channel H usually can be modeled as $$H = \sqrt{\frac{MN}{N_{cl} N_{ray}}} \sum_{i=1}^{N_{cl}} \sum_{l=1}^{N_{ray}} \alpha_{i,l} a_{UE}(\theta_{i,l}^{UE}, \phi_{i,l}^{UE}) a_{BS}^H(\theta_{i,l}^{BS}, \phi_{i,l}^{BS})$$

Among them, N and M represent the number of antennas equipped for the user side and the base station side, respectively, $N_{cl}$ is the number of scatters, $N_{ray}$ is the number of sub-paths included in each scatter, $\alpha_{i,l}$ represents a channel coefficient of a corresponding scattering path, $a_{UE}$ and $a_{BS}$ represent antenna response vectors of the user side and the base station, respectively, $\theta$ and $\phi$ are arrival angles in the horizontal and vertical directions, respectively.

In the millimeter wave communication, there exists a huge difference between the number of radio frequency links and the number of antennas for each of the transmitter and the receiver, where the number of radio frequency links is usually much smaller than the number of antennas. The transmitter and receiver can cause a radio frequency link to correspond to multiple antennas, and usage of a large-scale antenna array can generate extremely high directional gains by an analog beamforming technology. Therefore, in the millimeter-wave communication, an equivalent baseband channel matrix from the transmitter RF links to the receiver RF links is often estimated, the equivalent baseband matrix having a low dimension for ease of estimation. The receiver can estimate the equivalent baseband matrix and then perform coherent demodulation for the data transmitted by the transmitter.

In addition, orthogonal frequency division multiplexing has become the current mainstream wireless communication technology due to its superiority in many aspects. For example, it can be predicted that in the next generation of mobile communication networks, the orthogonal frequency division multiplexing technology will be used in conjunction with millimeter wave communication and massive multiple-input multiple-output antennas. The orthogonal frequency division multiplexing technology divides a relative wide communication bandwidth into multiple narrowband subcarriers, each subcarrier corresponding to a flat fading channel. In a system that combines multiple-input multiple-output antennas and orthogonal frequency division multiplexing, each subcarrier will correspond to a channel matrix, and then the channel matrices corresponding to all subcarriers shall be estimated.

Currently, some channel matrix estimation methods have been proposed for millimeter-wave communication. For example, in the millimeter wave transmission, because path attenuation and reflection attenuation are relatively high, the channels are sparse, that is, the number of transmission paths is small. Some techniques are known to estimate the channel matrix by introducing a compressive sensing method, or to further perform precoding design, but their implementation complexity is high and their practicability is poor.

In addition, a traditional channel estimation method applied to an orthogonal frequency division multiplexing system is to transmit pilots (reference signals) on some subcarriers at a certain interval for estimation. The receiver first estimates channel matrices corresponding to the subcarriers containing the pilots, and then estimates the channel matrices corresponding to the remaining subcarriers by interpolation. The use of interpolation causes the pilot signals to be inserted in all frequency bands, resulting in a large pilot transmission overhead. However, in the millimeter-wave communication, the frequency bandwidth used is relatively large, so that during each transmission, the transmitted orthogonal frequency division multiplexing symbol requires a large number of subcarriers containing pilots, thereby sacrificing the data rate.

On the other hand, in the traditional interpolation method, in order to ensure accuracy of the interpolation results, the selection of the frequency-domain pilot interval depends on relevant bandwidth of the channel. The interval is usually selected as a value which is reciprocal of several times (such as 10 times, 20 times) of maximum delay spread of the channel. This makes the pilots to be densely distributed in the frequency domain, which also causes a large pilot transmission overhead and reduces the data rate.

In order to reduce the pilot transmission overhead of the traditional interpolation channel estimation method, the present disclosure proposes a new channel estimation method by utilizing the sparsity of communication channels. In particular, in consideration of the sparsity of the communication channels, the present disclosure utilizes improved reference signal distribution in the frequency domain and/or time domain, and/or improved channel path condition estimation to achieve improved channel estimation.

In particular, the embodiments of the present disclosure are characterized by carrying reference signals on only part of the communication resources for channel estimation. According to an embodiment of the present disclosure, channel states on communication resources carrying the reference signals are estimated; and conditions of channel paths from a transmitter to a receiver are estimated by using the estimated channel states of the communication resources. From this, channel states on other communication resources from the transmitter to the receiver can be derived from the estimated channel path condition.

The embodiments of the present disclosure may be implemented in various manners, and may be applied to various wireless communication systems, particularly be suitable for a wireless communication system with channel sparsity.

According to some embodiments, the embodiments of the present disclosure are particularly preferably applicable to a millimeter-wave orthogonal frequency division multiplexing system, and can achieve improved channel estimation by utilizing the sparsity of the millimeter-wave channels per se and their stronger sparsity after beamforming.

According to some embodiments, the embodiments of the present disclosure may also be used in a wireless communication system that mainly communicates through a direct path. For example, in addition that the millimeter wave system has the characteristic of the direct path, in the traditional decimeter/centimeter wave and other systems, a scenario where an aircraft communicates with a ground base station has emerged now, and in such case, most of paths between the aircraft and the base station are direct paths without being obstructed by obstacles. Therefore, it is also suitable for employing the present disclosure.

It should be noted that the above application scenarios are merely exemplary, and the embodiments of the present disclosure can also be used in other wireless channel systems with channel sparsity.

According to an embodiment of the present disclosure, there provides an electronic device for a receiver in a wireless communication system. The electronic device can comprise a processing circuitry, which can be configured to: estimate, based on reference signals from a transmitter of the wireless communication system, channel states on communication resources carrying the reference signals, wherein the reference signals are distributed over communication resources of the communication system in a first frequency domain range, and frequency domain resources of the communication system are divided into a plurality of orthogonal frequency domain ranges including the first frequency domain range; and estimate conditions of channel paths from the transmitter to the receiver using the estimated channel states on the communication resources; wherein channel states on communication resources of other frequency domain ranges from the transmitter to the receiver are derived from the estimated conditions of the channel paths.

According to an embodiment of the present disclosure, there provides an electronic device for a receiver in a wireless communication system. The electronic device can comprises a processing circuitry which can be configured to: estimate, based on reference signals from a transmitter of the wireless communication system, channel states on communication resources carrying the reference signals, wherein the reference signals are distributed at a predetermined interval over frequency domain, and the predetermined interval is determined based on a maximum delay spread of channel and a frequency domain interval between adjacent communication resources in the communication system; and estimate conditions of channel paths from the receiver using the estimated channel states on the communication resources; wherein channel states on communication resources of other frequency domain ranges from the transmitter to the receiver are obtained from the estimated conditions of the channel paths.

According to an embodiment of the present disclosure, there provides an electronic device for a transmitter of a wireless communication system. The electronic device can comprises a processing circuitry which can be configured to: determine that reference signals are to be arranged only on communication resources of the communication system in a first frequency domain range; and transmit the reference signals to a receiver of the wireless communication system by using the communication resources in the first frequency domain range, wherein frequency domain resources of the communication system are divided into a plurality of orthogonal frequency domain ranges including the first frequency domain range; wherein conditions of channel paths from the transmitter to the receiver are estimated by using the estimated channel states on the communication resources; and wherein channel states on communication resources of other frequency domain ranges from the transmitter to the receiver are obtained from the estimated conditions of the channel paths.

According to an embodiment of the present disclosure, there provides an electronic device for a transmitter of a wireless communication system. The electronic device can comprise a processing circuitry which can be configured to: transmit reference signals to a receiver of the wireless communication system by using communication resources, wherein the reference signals are distributed at a predetermined interval over frequency domain, and the predetermined interval is determined based on a maximum delay spread of channel and a frequency domain interval between adjacent communication resources in the communication system, and wherein channel states on communication resources carrying the reference signals are estimated based on the reference signals from the transmitter; wherein conditions of channel paths from the transmitter to the receiver are estimated by using the estimated channel states on the communication resources; wherein channel states on other communication resources from the transmitter to the receiver are obtained from the estimated conditions of the channel paths.

It should be noted that the above-mentioned embodiments can also be implemented in combination with each other. For example, in a case where the frequency domain resources are divided into orthogonal frequency domain ranges, the reference signals may also be distributed in the frequency domain at predetermined intervals.

The basic implementation of the embodiments of the present disclosure will be described in detail below with reference to the drawings. It should be noted that these basic implementations can be equally applied to the above-mentioned embodiments of the transmitter/receiver side, as well as other embodiments of the present disclosure.

Description of the Term

The term "communication resources" mentioned here can have different meanings in different communication systems. For example, a "communication resource" may be a time domain resource and/or a frequency domain resource. Taking LTE as an example, each LTE frame (10 ms) can be divided into 10 equal-sized subframes, and each subframe (1 ms) can include 2 consecutive time slots, and each time slot includes a resource block (RB). The resource block can be represented by a resource grid. The resource grid can be divided into multiple resource elements (RE). For example, each resource block contains 12 consecutive subcarriers in the frequency domain, and for normal cyclic prefix in each OFDM code element, each resource block contains 7 consecutive OFDM code elements in the time domain, that is, each resource block contains 84 resource elements. In such LTE frames, user data or symbols of reference signals are allocated corresponding resource elements. However, in addition to time-frequency resources, "communication resources" can also refer to spatial domain resources or code domain resources.

The reference signal is a kind of signal which is known as being provided from a transmission side to a receiving side for channel estimation or channel detection, and can be used for various measurements to determine the actual channel condition experienced by a radio signal from the base station to the UE. Compared with theoretical methods such as geographic location estimation, etc., channel estimation based on reference signals is more accurate. The reference signal is of great significance for mobility management, resource allocation, MIMO operation, and data demodulation.

Depending on the transmission direction, the reference signal can be typically classified as an uplink reference signal and a downlink reference signal. In the time and/or frequency domain, the reference signal and the user data stream are multiplexed in an uplink frame or a downlink frame, and the reference signal occupies certain communication resources in the frame. The downlink reference signal is a predefined signal that is sent from the base station to the UE and occupies specific downlink communication resources (for example, specific resource elements in a time-frequency resource block), and is used for downlink channel estimation, downlink channel detection, and cell search. For example, the downlink reference signal includes, but is not limited to, a cell reference signal (CRS), a data demodulation reference signal (DMRS), a channel state information reference signal (CSI-RS), and the like. The uplink reference signal is a predefined signal that is sent from the UE to the base station and occupies specific uplink communication resources (for example, specific resource elements in a time-frequency resource block), and is used for uplink channel estimation and uplink channel quality measurement, etc. The uplink reference signal includes, but is not limited to, DMRS, sounding reference signal (SRS), and the like. In one example, the CSI-RS is used for feedbacking the downlink channel state.

In the communication system of the present disclosure, different reference signals usually have different usage scenarios and purposes. For example, DMRS may be transmitted mainly along with PUCCH, PDCCH, PUSCH, or PDSCH for the base station to perform channel state estimation and related demodulation. SRS may be transmitted periodically or aperiodically for the base station to perform channel state estimation in order to support channel-based uplink scheduling and link adaptation.

Generally speaking, channel measurement can be performed through multiple ports. Usually the ports correspond to the reference signals one by one. The reference signals of different ports can be transmitted using the same communication resources or can be sent using different communication resources. When the reference signals (for example, CSI-RS) of multiple ports are transmitted through the same communication resources (for example, time-frequency resources), in order to distinguish the reference signals of different ports at the receiving side, the reference signals on respective ports are transmitted by means of orthogonal code division multiplexing of the same reference signal sequence, or the reference signals on respective ports employ different reference signal sequences.

According to some embodiments, the communication system is an OFDM-based communication system, and the communication resources correspond to subcarriers. The following will be explained in detail based on this, but it should be understood that the implementation described below can be equally applied to other types of communication resources. As an example, an OFDM-based non-orthogonal multiple access NOMA communication system can also be used.

In the embodiment of the present disclosure, the reference signals may be reference signals specifically used for channel estimation, such as CSI-RS/SRS; or reference signals inserted into data for demodulation, such as DMRS (which may be more sparsely and less inserted), where the receiving side can utilize DMRS on part of subcarriers to obtain channels on other subcarriers on the entire resource block carrying data and use the channels for demodulation. Of course, depending on the communication system of a specific application, the reference signals may also be other types of reference signals.

System Configuration

Figure 5:
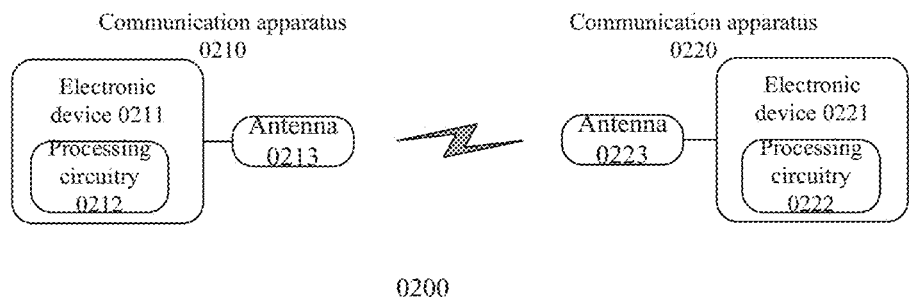
FIG. 5 illustrates an exemplary communication system.

FIG. 5 shows a schematic diagram of a communication system 0200 according to an embodiment of the present disclosure. The communication system 0200 may include a communication apparatus 0210 and a communication apparatus 0220 that wirelessly communicate with each other. Although FIG. 5 shows that one communication apparatus 0210 communicates with one communication apparatus 0220, the communication apparatus 0210 can communicate with multiple communication apparatuses 0220, and the communication apparatus 0220 can communicate with multiple communication apparatuses 0210, for example, in a case of multi-point cooperation.

The communication apparatus 0210 may include an electronic device 0211 and an antenna 0213. In addition, the communication apparatus 0210 may further include other components not shown, such as a radio frequency link, a baseband processing unit, a network interface, a processor, a memory, a controller, and the like. The electronic device 0211 may be associated with the antenna 0213. For example, the electronic device 0211 may be directly or indirectly connected to the antenna 0213 (for example, other components may be interposed therebetween), transmit radio signals via the antenna 0213, and receive radio signals via the antenna 0213.

The electronic device 0211 may include a processing circuitry 0212. In addition, the electronic device 0211 may further include an input-output interface and a memory. The processing circuitry 0212 in the electronic device 0211 can output (digital or analog) signals to other components in the communication apparatus 0210, and can also receive (digital or analog) signals from other components in the communication apparatus 0210. In addition, the processing circuitry 0212 may control some or all operations of other components in the communication apparatus 0210.

The processing circuitry 0212 may be in the form of a general-purpose processor, or may be a dedicated processing circuit, such as an ASIC. For example, the processing circuitry 0212 can be configured by a circuit (hardware) or a central processing device such as a central processing unit (CPU). In addition, the processing circuitry 0212 may carry a program (software) for operating the circuit (hardware) or the central processing device. The program can be stored in a memory (such as arranged in the communication apparatus

0210 or the electronic device 0211) or an external storage medium connected from the outside, and downloaded via a network (such as the Internet).

Although it is shown in FIG. 5 that the electronic device 0211 is separated from the antenna 0213, the electronic device 0211 may also be implemented as including the antenna 0213. In addition, the electronic device 0211 may also be implemented as including one or more other components in the communication apparatus 0210, or the electronic device 0211 may be implemented as the communication apparatus 0210 itself. In an actual implementation, the electronic device 0211 may be implemented as a chip (such as an integrated circuit module including a single chip), a hardware component, or a complete product.

The communication apparatus 0220 may include an electronic device 0221 and an antenna 0223, and the electronic device 0221 may include a processing circuitry 0222. In addition, the above description of the structure of the communication apparatus 0210 is also applicable to the communication apparatus 0220, and details are not described herein again.

The communication system 0200 may be a cellular communication system, a machine type communication (MTC) system, an ad-hoc network, or a cognitive radio system (e.g., IEEE P802.19.1a and Spectrum Access System (SAS)), etc.

The communication apparatus 0210 can be implemented as a base station (BS), a small base station, a Node B, an e-NodeB (eNB), a g-NodeB (gNB), a relay, etc. in a cellular communication system, a terminal device in a MTC system, a sensor node in an ad-hoc network, a coexistence managers (CM), SAS, etc. in a cognitive radio system, and the like. For example, the communication apparatus 0210 may preferably be implemented as any type of node gNB, such as a macro gNB (associated with a macro cell) and a small gNB (associated with a small cell). A small gNB may be a gNB covering a cell smaller than a macro cell, such as a micro gNB, a pico gNB, and a home (femto) gNB. Alternatively, the communication apparatus 0210 may be implemented as any other type of base station, such as an eNB, a NodeB, and a base transceiver station (BTS). The communication apparatus 0210 may include: a main body (also referred to as a base station device) configured to control wireless communication; and one or more remote wireless headends (RRH) located different from the main body. In addition, various types of terminals which will be described later can operate as the communication apparatus 0210 by temporarily or semi-persistently performing the base station function.

The communication apparatus 0220 may be implemented as a terminal equipment or a user equipment (UE). For example, the communication apparatus 0220 may be implemented as a mobile terminal (such as a smart phone, a tablet personal computer (PC), a notebook PC, a portable game terminal, a portable/dongle-type mobile router, and a digital camera device), a UAV, or a vehicle on-board terminal (such as a car navigation equipment). The communication apparatus 0220 may also be implemented as a terminal that performs machine-to-machine (M2M) communication, also referred to as a machine type communication (MTC) terminal. In addition, the communication apparatus 0220 may be a wireless communication module (such as an integrated circuit module including a single chip) mounted on each of the terminals described above. The communication apparatus 0220 may also be implemented as a smart meter, a smart home appliance, or a Geolocation Capability Object (GCO), a Citizens Broadband Radio Service Device (CBSD) in a cognitive radio system.

For simplicity of description, the processing of the communication apparatuses 0210 and 0220 will be described below on an assumption that the communication apparatus 0210 is a base station and the communication apparatus 0220 is a user equipment. The communication from the communication apparatus 0220 to the communication apparatus 0210 is referred to as uplink communication. Note that in a case where the communication apparatus 0210 is not a base station and the communication apparatus 0220 is not a user equipment, for example, in a case of proximity-based service communication between two user equipments or in a case of wireless communication between two base stations, the communication apparatuses 0210 and 0220 can also perform the processing described below. In addition, part or all of the processings performed by the communication apparatuses 0210 and 0220 described below may be performed by the processing circuits 0212 and 0222, or may be performed by other components in the communication apparatus 0210 and 0220 and/or other components in other apparatuses under the control of the processing circuits 0212 and 0222.

Implementation of Electronic Device

The electronic device described in this disclosure can also be implemented in various other ways. According to some embodiments, the processing circuitry of the electronic device may include various units to implement various embodiments according to the present disclosure. For example, the processing circuitry of the electronic device for the receiver side may include various estimation units to implement various estimation operations described herein. The processing circuitry of the electronic device for the transmitter side may include a transmission unit and a receiving unit to implement various operations performed on the transmitter side as described herein.

Figure 6A:
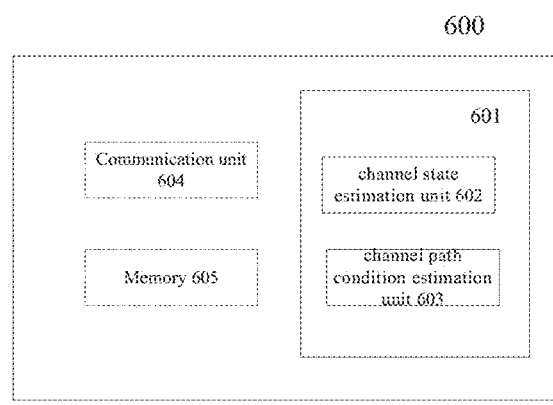
FIG. 6A illustrates an exemplary electronic device for a transmitter side according to an embodiment of the present disclosure.

FIG. 6A illustrates an exemplary electronic device 600 for the receiver side according to an embodiment of the present disclosure. In one embodiment, the electronic device 600 may be implemented as a receiver or part thereof, or may be implemented as a device or part of the device for controlling a receiver or otherwise being related to the receiver.

The electronic device 600 shown in FIG. 6A may include a processing circuitry 601, which may refer to various implementations of a digital circuitry system, an analog circuitry system, or a mixed signal (combination of analog signals and digital signals) circuitry system in a computing system that perform functions. The processing circuitry may include, for example, a circuit such as an integrated circuit (IC) and an application specific integrated circuit (ASIC), a portion or circuit of a separate processor core, an entire processor core, a separate processor, a programmable hardware device such as a field programmable array (FPGA)), and/or a system including multiple processors.

In one embodiment, the processing circuitry 601 includes at least a channel state estimation unit 602 and a channel path condition estimation unit 603. Various operations described below may be implemented by units 602 and 603 of the electronic device 600 or other possible units.

In one embodiment, the channel state estimation unit 602 may estimate channel states on a communication resources carrying reference signals from the transmitter based on the reference signals, and the channel path condition estimation unit 603 may utilize the estimated channel states of the communication resources to estimate conditions of channel paths from the transmitter to the receiver. The corresponding estimation process will be described in detail below.

The processing circuitry may further include units for using the estimated conditions of channel paths to derive channel states on other communication resources from the transmitter to the receiver. Of course, such a unit may also be located outside the processing circuitry or even outside the electronic device. The corresponding processing will be described in detail below.

The electronic device 600 may further include, for example, a communication unit 604 and a memory 605.

The communication unit 604 may be configured to communicate with a receiving side under the control of the processing circuitry 601. In one example, the communication unit 604 may be implemented as including communication components such as the antenna arrays and/or the radio frequency links described above. In one embodiment, the communication unit may provide the estimation result obtained in the processing circuitry 601 to the electronic device on the base station side. In one embodiment, the communication unit may also transmit and receive information for beamforming processing, and may even include a processing unit for performing beamforming processing. Of course, such a processing unit may be outside the communication unit.

The communication unit 604 is drawn with a dashed line because it can also be located outside the electronic device 600.

The memory 605 may store various kinds of information generated by the processing circuit 601 (for example, information about beam training, information about a target channel direction, and basic compensation phase information, etc.), programs and data used for operation by the electronic device 600, and data to be transmitted by the communication unit 604, and so on. The memory 605 is drawn with a dashed line because it can also be located inside the processing circuitry 601 or even outside the electronic device 600. The memory 605 may be a volatile memory and/or a non-volatile memory. For example, the memory 605 may include, but is not limited to, random access memory (RAM), dynamic random access memory (DRAM), static random access memory (SRAM), read-only memory (ROM), and flash memory.

Figure 6B:
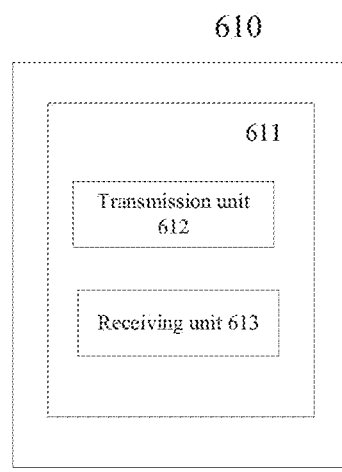
FIG. 6B illustrates an exemplary electronic device for a receiver side according to an embodiment of the present disclosure.

FIG. 6B illustrates an exemplary electronic device for a transmitter side according to an embodiment of the present disclosure. The electronic device 610 shown in FIG. 6B may comprise a processing circuitry 611, which may be implemented in various ways as described above.

In one embodiment, the processing circuitry 611 may include a transmission unit 612 and a receiving unit 613. Various operations below may be implemented by the units 612 and 613 or other possible units.

In one embodiment, the transmission unit 612 may send reference signals to the receiver through a part of communication resources, and the receiving unit 613 may receive any information about the estimation result from the receiver side, such as the estimated channel states, the estimated channel path conditions, and so on.

The electronic device 610 may further include, for example, a communication unit and a memory as described above.

It should be noted that each of the above units is only a logical module classified according to the specific function it implements, instead of limiting its specific implementation manner. For example, it can be implemented in software, hardware, or a combination of software and hardware. In actual implementation, the foregoing units may be implemented as independent physical entities, or may be implemented by a single entity (for example, a processor (CPU or DSP, etc.), an integrated circuit, etc.).

It should be noted that the arrangement of each unit as described above is also exemplary only, and is not limited to the above-mentioned case. For example, considering that the estimation processing can also be distributed on both of the receiver side and the transmitter side, some functions in the estimation unit on the receiver side can also be at least partially distributed on the transmitter side, and perform calculation by receiving information feedback from the receiver. In addition, for example, the transmission and receiving units on the transmitter side may be similarly arranged on the receiver side.

It should be noted that the transmitter side and the receiver side as described above may correspond to respective parties in a wireless communication system. For example, the transmitter side may correspond to a base station, the receiver side may correspond to a user equipment, and the operations particularly correspond to downlink communication transmission. For example, the transmitter side may correspond to a user equipment, the receiver side may correspond to a base station, and the operation particularly corresponds to uplink communication transmission.

Transceiver Structure and Configuration

Figure 7:
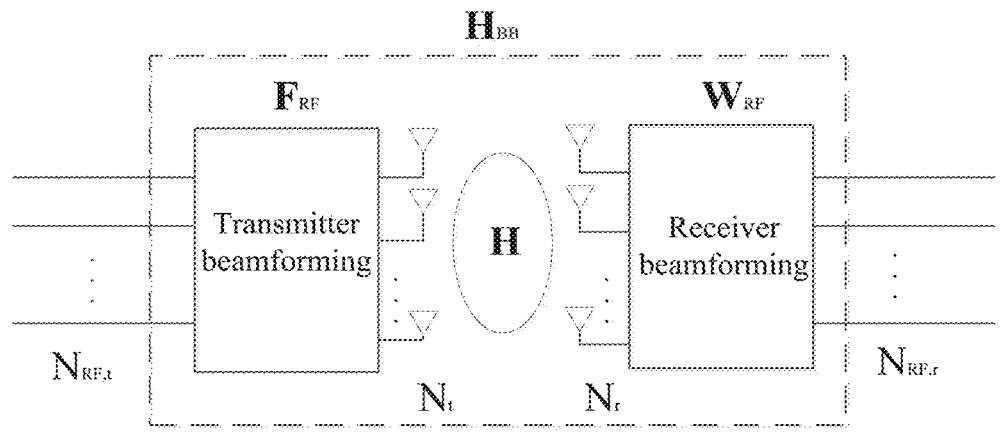
FIG. 7 is a schematic diagram of a transceiver structure of a millimeter wave Massive Multi-Input Multi-Output antenna system.

The structure of the transceiver based on millimeter wave and massive multiple-input multiple-output antennas is shown in FIG. 7, wherein $N_{RF,t}$, $N_{RF,r}$ represent the number of RF links for the transmitter and the number of RF links for the receiver respectively, and $N_t$, $N_r$ represent the number of antennas for the transmitter and the umber of antennas for the receiver respectively. The analog beamforming module of the transmitter maps the data stream over $N_{RF,t}$ radio frequency links to $N_t$ transmission antennas. The mapping matrix can be expressed as $F_{RF}$ with a dimension of $N_t \times N_{RF,t}$. Similarly, the receiving side maps the data on the $N_r$ receiving antennas to $N_{RF,r}$ radio frequency links, and the mapping matrix can be expressed as $W_{RF}$ with a dimension of $N_r \times N_{RF,r}$. Since the beamforming does not generate any power gain, the modulus length of each column in $F_{RF}$, $W_{RF}$ as a column vector should be normalized to one.

Therefore, the mathematical model of signal transmission and receiving can be expressed as $$y = W_{RF}^H H_{RF} x + W_{RF}^H n$$

Among them, x, y represent the transmission vector of the transmitter RF links and the reception vector of the receiver RF links respectively, and their vector dimensions are $N_{RF,t} \times 1$, $N_{RF,r} \times 1$ respectively. H is the channel matrix, and the matrix dimension is $N_r \times N_t$. n is a noise vector of the receiver antennas, whose dimension is $N_r \times 1$.

Here an equivalent baseband channel matrix is defined as $$H_{BB} = W_{RF}^H H F_{RF}$$

It can be seen that the dimension of the equivalent baseband channel matrix $H_{BB}$ is $N_{RF,r} \times N_{RF,t}$, which is much smaller than the dimension $N_r \times N_t$ of the channel matrix H, therefore, in order to simplify the operation, the equivalent baseband channel matrix $H_{BB}$ will be estimated instead of the channel matrix H.

Here, the beamforming matrices can be expressed as $F_{RF} = [f_1, f_2, \ldots, f_{N_{RF,t}}]$, $W_{RF} = [w_1, w_2, \ldots, w_{N_{RF,r}}]$, so the equivalent baseband channel matrix can be expressed as $$H_{BB} = \begin{bmatrix} w_1^H H f_1 & \cdots & w_1^H H f_{N_{RF,t}} \\ \vdots & \ddots & \vdots \\ w_{N_{RF,r}}^H H f_1 & \cdots & w_{N_{RF,r}}^H H f_{N_{RF,t}} \end{bmatrix}$$

Note that each element in the matrix has the same form. The channel estimation proposed in the present disclosure is performed for one of the elements, and it is applicable to the elements at any position of the matrix.

Therefore, in order to make the subsequent description more clear, it is assumed in the subsequent description that the dimension of $H_{BB}$ is 1×1, that is, the numbers of radio frequency links of the transmitter and the receiver are $N_{RF,t}=N_{RF,r}=1$. At this time, both $F_{RF}$, $W_{RF}$ are degraded into vectors, as indicated by f, w, and $H_{BB}$ is degraded into a vector indicated by $H_{BB}$. In addition, in order to simplify the explanation, the antenna arrays of the transmitter and receiver both are assumed to be equally spaced at half-wavelength spacing in one dimension, but this method is still applicable to antennas which are arranged non-linearly.

Millimeter wave multi-path channel model and simplified channel model

A channel model of a millimeter wave multiple-input multiple-output system under a multi-path frequency selective fading channel can be expressed as $$H(f) = \sqrt{\frac{N_t N_r}{L}} \sum_{l=1}^{L} \alpha_l a_r(\theta_{rl}) a_t^H(\theta_{tl}) e^{-2\pi \tau_l f}$$

Where f represents the frequency, L is the number of paths in the channel, $a_l$, $\theta_{rl}$, $\theta_{tl}$, $\tau_l$ represent a complex gain, angle of arrival, angle of exit, and transmission delay of the lth path respectively, and $a(\theta)$ is the response vector of the antenna array, which can be expressed as $$a(\theta) = \frac{1}{\sqrt{N}} \left[ 1, e^{j\pi\sin\theta}, e^{j2\pi\sin\theta}, \ldots, e^{j(N-1)\pi\sin\theta} \right]^T$$

Figure 8:
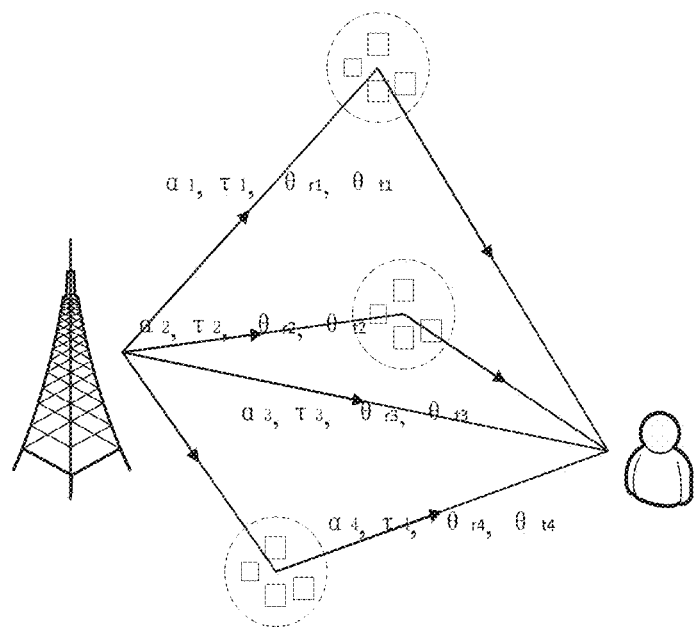
FIG. 8 is a schematic diagram of a millimeter wave channel model.

Among them, N is the number of antennas in the antenna array, $\theta$ represents the angle of arrival or the angle of exit. This channel model is shown in FIG. 8, and can be understood as the sum of response of each path in the transmission channel, where each path includes parameters such as complex gain, angle of arrival, angle of exit, transmission delay, and so on.

Now consider the representation of an equivalent baseband channel in the orthogonal frequency division multiplexing system under this model $$H_{BB}(k) = \sum_{l=1}^{L} \sqrt{\frac{N_t N_r}{L}} \alpha_l w^H a_r(\theta_{rl}) a_t^H(\theta_{tl}) f e^{-j2\pi\tau_l k \Delta f}$$

where k represents a subcarrier index and $\Delta f$ represents a subcarrier frequency interval.

From this model, an intensity parameter $\beta_l$ and a delay parameter $\Delta_l$ of the lth path can be defined as $$\beta_l = \sqrt{\frac{N_t N_r}{L}} \alpha_l w^H a_r(\theta_{rl}) a_t^H(\theta_{tl}) f$$

$$\Delta_l = -2\pi\tau_l \Delta f$$

so, the equivalent baseband channel can be simplified as $$H_{BB}(k) = \sum_{l=1}^{L} \beta_l e^{j\Delta_l k}$$

Note that both $\beta_l$, $\Delta_l$ are independent from k.

At the same time, due to the sparsity of the millimeter-wave channels after beamforming, it can be assumed that the total number L of paths is small. Therefore, it is the basic concept of the present disclosure that the equivalent baseband channel $H_{BB}(k)$ for all subcarriers can be obtained by only estimating L and $\beta_l$, $\Delta_l$, l=1, 2, ..., L.

Figure 9:
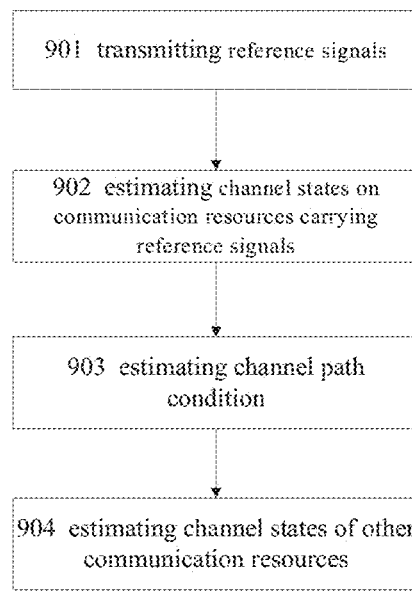
FIG. 9 illustrates a conceptual flowchart of channel estimation according to an embodiment of the present disclosure.

Hereinafter, channel estimation according to an embodiment of the present disclosure will be summarized with reference to FIG. 9, which illustrates a flowchart of channel estimation according to an embodiment of the present disclosure. It should be noted that each step shown in FIG. 9 may be performed by the receiver side or the transmitter side.

In step 901, reference signal transmission is performed. In the context of this description, reference signals may also be referred to as pilot signals, and they are interchangeable.

In embodiments of the present disclosure, the transmitted reference signals may be distributed in a manner which is significantly different from that in the conventional method.

Figure 10:
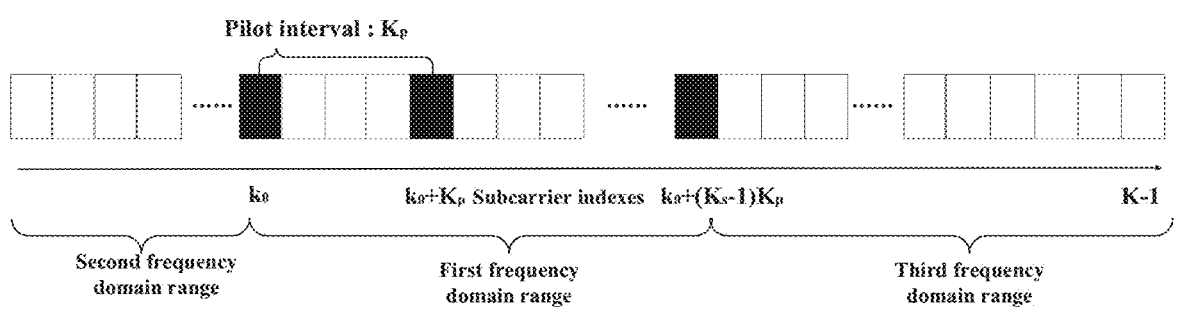
FIG. 10 is a schematic diagram of a sparse pilot pattern in the frequency domain.

According to some embodiments, the reference signals may be arranged on only a part of communication resources of the communication system; and the reference signals are transmitted to the receiver side through the part of communication resources. For example, as shown in FIG. 10, the reference signals may be distributed on only communication resources of the communication system in a partial frequency domain range (such as, a first frequency domain range), and the partial frequency domain range is only a small part of the entire frequency domain range.

According to an embodiment, the reference signals may be distributed on communication resources of the communication system in a first frequency domain range, and frequency domain resources of the communication system are divided into a plurality of orthogonal frequency domain ranges including the first frequency domain range.

According to some embodiments, the communication system is an OFDM-based communication system, and the communication resources corresponds to subcarriers. Hereinafter the detailed description will be based on this, but it should be understood that the implementation described below can be equally applied to other types of communication resources.

Now assume that the indexes of all subcarriers in the frequency band used for communication are 0, 1, ..., (K−1), where K is the total number of subcarriers, and the subcarrier indexes of the pilots transmitted for each channel estimation can be represented as $$k_0 + k'K_p, k'=0,1,\ldots,(K_s-1)$$

wherein $K_p$ indicates the difference of subcarrier indexes between adjacent reference signals, $K_s$ indicates the number of subcarriers carrying the reference signals, and $k_0$ indicates the minimum value of the corresponding indexes of all subcarriers carrying the reference signals.

In an embodiment of the present disclosure, a distribution interval of the transmitted reference signals may be significantly different from that in a conventional method.

According to one embodiment, the reference signals may be distributed in the frequency domain at predetermined intervals. Here, K, may correspond to the predetermined interval. The setting of the frequency domain pilot interval K, will affect the estimation performance of the above method, and can be realized in a variety of ways.

According to some embodiments, the predetermined interval may be determined based on a maximum delay spread of a channel and a frequency domain interval between adjacent communication resources in a communication system.

According to some embodiments, the number of subcarriers containing the reference signals may be determined based on the accuracy of the channel estimation and the bandwidth in the first frequency domain range which is intended to be occupied by the subcarriers containing the reference signals.

The predetermined interval and the number of subcarriers are set in consideration of the channel estimation performance of the embodiment of the present disclosure. Hereinafter, examples of setting the predetermined interval and the number of subcarriers will be described in detail.

In step 902, channel states on communication resources carrying reference signals are estimated based on the received reference signals (pilots).

After the receiver receives the pilots transmitted by the transmitter, the information about channel states of the subcarriers (communication resources) transmitting the pilots can be estimated based on the received pilot signals.

The information about channel states can also be estimated in a variety of ways. Taking the least squares criterion as an example, the estimation process can be expressed as $$\hat{H}(k_0 + k'K_p) = \frac{y(k_0 + k'K_p)}{s} = H(k_0 + k'K_p) + w^H n,$$
$$k' = 0, 1, \ldots, (K_s - 1)$$

wherein, $\hat{H}$ represents the channel estimation result, and s represents the value of the pilot signal on a subcarrier indexed by $k_0+k'K_p$. For convenience, s=1 is set for all subcarriers here. Through the pilot transmission and channel estimation in the above process, the information about channel states obtained by the receiver at this time is $\hat{H}(k_0+k'K_p)$, k'=0, 1, . . . , $(K_s-1)$.

In step 903, conditions of channel paths from the transmitter to the receiver are estimated using the estimated channel states of the communication resources.

According to some embodiments, the conditions of channel paths may include the number of paths, the phase parameter of each path, and the strength parameter of each path. Of course, according to the specific application environment, etc., the channel path conditions may also include other types of parameters.

Figure 11:
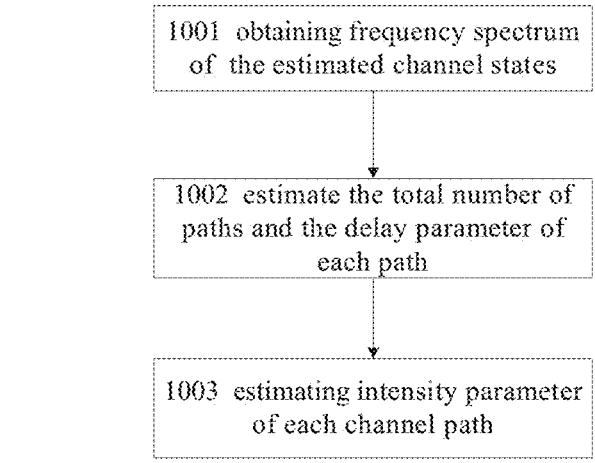
FIG. 11 shows a conceptual flowchart of channel path condition estimation according to an embodiment of the present disclosure.

The channel path condition estimation can be implemented by using various suitable methods. The channel path condition estimation according to some embodiments of the present disclosure will be described below with reference to FIG. 11.

At step 1001, the frequency spectrum of data about the estimated channel states of the subcarriers is obtained for estimating the number of paths and a phase parameter of each path.

It should be noted that in the following description, a delay parameter of a path is taken as an example to describe the phase parameter of the path, but it should be noted that the phase parameter of the path are not limited to the delay parameter of the path, but can also indicate other types of parameters associated with the phase of the path, as long as such parameters can be obtained from the spectrum.

According to some embodiments, the frequency spectrum is obtained by performing time-frequency transformation on the data about the estimated channel states of the subcarriers. The time-frequency transformation can be performed by using various appropriate techniques, such as DFT, FFT, and the like.

Specifically, the previously obtained channel state estimation results $\hat{H}(k_0+k'K_p)$, k'=0, 1, . . . , $(K_s-1)$ can be used to estimate the total number L of paths and the delay parameter $\Delta_l$, l=1, 2, . . . , L corresponding to each path.

According to the simplified channel model, $\hat{H}(k_0+k'K_p)$ can be expressed as $$\hat{H}(k_0 + k'K_p) = \sum_{l=1}^{L} \beta_l e^{j\Delta_l(k_0+k'K_p)} + w^H n$$

According to the above formula, $\hat{H}(k_0+k'K_p)$ can be regarded as a sum of L complex sinusoidal digital signals, where the lth path has a corresponding digital frequency $K_p\Delta_l$. Therefore, the frequency spectrum of $\hat{H}(k_0+k'K_p)$ can be analyzed by discrete Fourier transform (DFT), so as to analyze the frequency components in the frequency spectrum to estimate L, and further extract the frequency corresponding to each frequency component in the frequency spectrum to estimate the delay parameter $\Delta_l$ of each path.

Preferably, in order to ensure the operation efficiency, a fast discrete Fourier transform (FFT) is used instead of DFT. It should be understood, however, that this is not necessary. When the operation efficiency of DFT meets the requirement, there is no need to use FFT to replace DFT.

The operation length of FFT shall be firstly determined. In order to ensure the accuracy of the frequency spectrum obtained by FFT, a 1024-point FFT is used here. Therefore, it is necessary to perform a zero-padding operation for $\hat{H}(k_0+k'K_p)$, k'=0, 1, . . . , $(K_s-1)$ to ensure that the total number of points is 1024. On the other hand, in order to reduce the influence of FFT sidelobes caused by the zero-padding operation, a window function needs to be applied after zero-padding. Therefore, the data before 1024-point FFT can be expressed as $$[w(k')\hat{H}(k_0+k'K_p),0,0, \ldots ,0], k'=0,1, \ldots ,(K_s-1)$$

Among them w(k') is the window function used. The following is described by using the Hamming window as an example of w(k').

It should be noted that the above-mentioned zero-padding, windowing operation, etc. are merely exemplary, and the above-mentioned spectrum-related operations of the present disclosure may also be performed without such operations, or can be performed in a case of further including other operations. In general, the choice of spectrum-related operations of the present disclosure may depend on the desired frequency spectrum accuracy. Generally, the above-mentioned windowing operation may not be performed when the frequency spectrum accuracy basically meets the requirement.

In step 1002, the frequency spectrum obtained after the transformation is analyzed to determine the total number of paths and the phase parameter of each path.

According to some embodiments, the frequency components in the frequency spectrum are analyzed by means of peak search to determine the total number of paths.

According to some embodiments, the number of paths corresponds to the number of peaks in the frequency spectrum above a predetermined threshold, and the phase parameter of each path is determined based on the frequency spectrum of the peak corresponding to the path.

According to some embodiments, during determination of the number of paths L, an upper limit may be determined for the total number L of paths, and the upper limit may be set in any suitable manner. Due to the sparsity of the millimeter-wave channels after beamforming, it is assumed here that L does not exceed 4, that is, at most 4 peaks appear in the spectrum. Then, a threshold for peak search is set, and a peak in the spectrum whose amplitude exceeds the threshold can be regarded as corresponding to a frequency component or a path.

The predetermined threshold may be set in any suitable manner. For example, it can be set according to prior knowledge, or set according to some application parameters. According to some embodiments, the predetermined threshold is determined based on the number of subcarriers containing the reference signals and the signal-to-noise ratio at the receiver side.

As an example, the threshold can be empirically set as $$1.5 \times \sqrt{\frac{K_s}{SNR}}$$

wherein SNR represents the signal-to-noise ratio of the receiver.

If the number of peaks exceeding the threshold exceeds the set upper limit, the upper limit value for the peaks will be taken as L, and the largest L peak values will be used to estimate the delay parameter.

Figure 12:
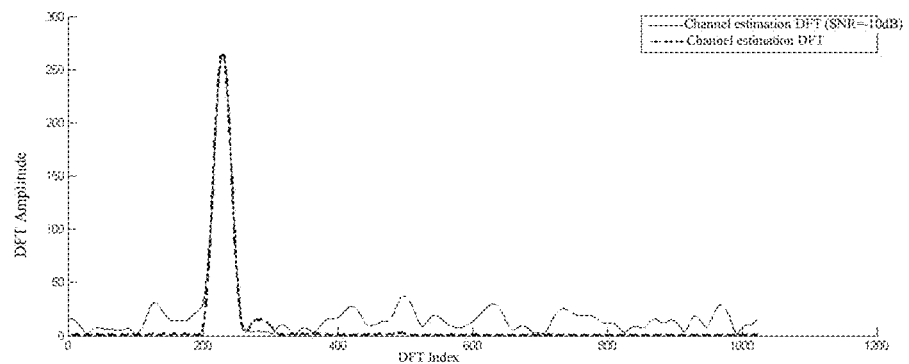
FIG. 12 is a schematic diagram of an exemplarily sample DFT result, where L=1.

FIG. 12 shows an example of a 1024-point FFT result in a case of L=1. Because L=1, there is only a single peak in the FFT spectrum. The FFT result of the channel estimation value affected by noise will generate a peak caused by noise outside the single peak, the generating peak having an amplitude which is usually small and does not exceed the threshold. For a peak that exceeds the threshold, assuming the FFT index corresponding to the peak is $\hat{j}$, the delay parameter of the path corresponding to the peak can be estimated as follows $$\Delta_l = \frac{2\pi}{K_p}\left(\frac{\hat{j}}{1024} - 1\right)$$

Figure 13:
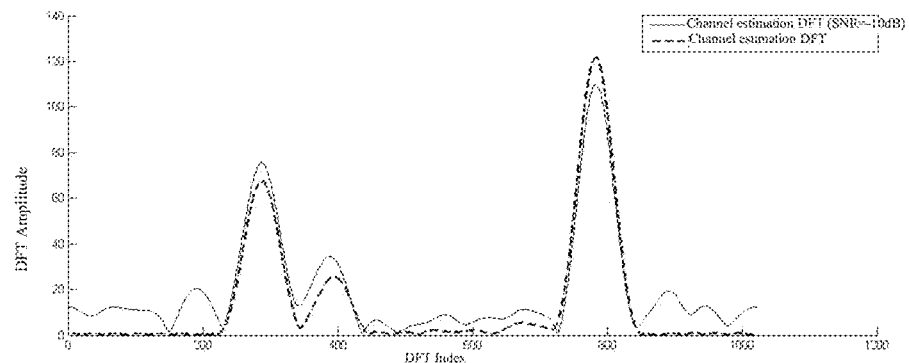
FIG. 13 is a schematic diagram of an exemplarily sample DFT result, where L=3.

FIG. 13 shows an example of a 1024-point FFT result in a case of L=3. There are three correct peaks in the figure. At the same time, due to the influence of noise, a noise peak exceeding the threshold appears. However, because the amplitude of noise peak is often small, it can be verified through simulation that even if there are noise peaks, the estimation error of this method will only be affected slightly. In addition, the probability of noise peaks appearing is very low.

Herein, for the estimation of the number of paths and delay parameters, in addition to using FFT or DFT, other methods of signal spectrum analysis or frequency component extraction can also be used.

In step 1003, path intensity parameter estimation is performed for each channel path.

According to some embodiments, the intensity parameter of each path is estimated based on the estimated channel states of the subcarriers, the number of paths, and the phase parameter of each path.

According to some embodiments, the intensity parameter of each path can be estimated by solving a set of linear equations established from the estimated channel states of the subcarriers, the number of paths, and the phase parameter of each path according to a multipath channel model.

As an example, the receiver estimates the total number L of paths and delay parameter $\Delta_l$, l=1, 2, . . . , L in at least the above manner. The receiver will then estimate the strength parameter $f_l$ for each path based on L, $\Delta_l$ and $\hat{H}(k_0+k'K_p)$.

According to the simplified channel model, the set of linear equations for $\beta_l$ can be obtained as follows $$E\begin{bmatrix}\beta_1\\\beta_2\\\vdots\\\beta_L\end{bmatrix} = \begin{bmatrix}\hat{H}(k_0)\\\hat{H}(k_0+K_p)\\\vdots\\\hat{H}(k_0+(K_s-1)K_p)\end{bmatrix}$$

among them $$E = \begin{bmatrix} e^{j\Delta_1 k_0} & e^{j\Delta_2 k_0} & \cdots & e^{j\Delta_l k_0}\\ e^{j\Delta_1(k_0+K_p)} & e^{j\Delta_2(k_0+K_p)} & & e^{j\Delta_l(k_0+K_p)}\\ \vdots & & \ddots & \vdots\\ e^{j\Delta_1(k_0+(K_s-1)K_p)} & e^{j\Delta_2(k_0+(K_s-1)K_p)} & \cdots & e^{j\Delta_l(k_0+(K_s-1)K_p)} \end{bmatrix}$$

The solution $\beta_l$ of the set of linear equations can be estimated by the least square method:

$$\begin{bmatrix}\beta_1\\\beta_2\\\vdots\\\beta_L\end{bmatrix} = (E^H E)^{-1} E^H \begin{bmatrix}\hat{H}(k_0)\\\hat{H}(k_0+K_p)\\\vdots\\\hat{H}(k_0+(K_s-1)K_p)\end{bmatrix}$$

This gives the estimate of $\beta_l$.

Note that the dimension of the matrix E is $K_s \times L$, and thus the dimension of $E^H E$ is L×L. Because the value of L is small, the complexity of the operation of inverting the matrix $E^H E$ in the above process is also low.

Here, the least square method is used for estimating $\beta_l$. In addition, $\beta_l$ can be estimated by a method for solving a set of equations in the following form, such as the least square error method (MMSE)

$$Hx=y$$

Where H is a matrix, x, y are vectors, H and y are known, and x is a vector to be estimated.

It should be noted that the estimation of $\beta_l$ may be performed in any other suitable manner.

In step 904, information about channel states of all subcarriers will be derived.

According to some embodiments, the estimated conditions of channel paths from the transmitter to the receiver may be directly substituted into a corresponding signal model of the communication system, to derive information about channel states on communication resources in other frequency domain ranges.

As an example, the receiver can derive the information about channel states of all subcarriers based on the estimated total number L of paths, the path delay parameter $\Delta_l$ and the strength parameter $\beta_l$ according to the following formula $$H_{BB}(k)=\Sigma_{l=1}^{L}\beta_l e^{j\Delta_l k}$$

Therefore, by adopting the improved channel estimation method of the present disclosure, all channel states on other communication resources/frequency ranges from the transmitter to the receiver can be restored.

In the embodiment of the present disclosure, the setting of the predetermined interval between the reference signals and/or the setting of the number of subcarriers carrying the reference signals may affect the performance of channel estimation. In a specific implementation, they can be set in a variety of ways.

As an example, a parameter $K_p$ corresponding to the predetermined interval may be set as follows.

Depending on the estimation manner of the delay parameter $\Delta_l$, the range of the delay parameter $\Delta_l$ that can be estimated is $$-\frac{2\pi}{K_p} \leq \Delta_l \leq 0$$

So the delay $\tau_l$ shall satisfy $$\tau_l \leq \frac{1}{K_p \Delta f}$$

In order to ensure that $\Delta_l$ does not exceed the estimated range, it is necessary for $K_p$ to satisfy $$K_p \leq \frac{1}{\sigma_{max}\Delta f}$$

where $\sigma_{max}$ is the maximum delay spread of a channel, $\Delta f$ is the frequency domain interval between adjacent communication resources in the communication system. The upper limit of $K_p$ is given by the above formula and is determined from the maximum delay spread of the channel.

Meanwhile, because the difference of $\Delta_l$ corresponding to two adjacent points in the spectrum is $$\frac{2\pi}{1024 K_p}$$

where the larger the value of $K_p$ is, the higher the resolutions of the 1024-FFT spectrum for $\Delta_l$ corresponding to different paths are. Therefore, preferably, the maximum value of the interval can be up to a reciprocal of the product of the maximum delay spread and the subcarrier interval.

The setting of the number of subcarriers/pilots will be exemplarily described below.

For example, when $K_p$ is fixed, the estimation accuracy can increase as the total number $K_s$ of pilots increases. The reason is that when $K_s$ increases, the influence of sidelobes in 1024-point FFT caused by the zero-padding operation is reduced, and the width of the main lobe is narrowed, which will improve the estimation accuracy of the total number L of paths and path delay parameter $\Delta_l$. In addition, the accuracy of the least square estimation used in estimating the intensity parameter $\beta_l$ will increase as $K_s$ increases, but the pilot overhead will also increase as the value of $K_s$ increases.

Conversely, if the value of $K_s$ is too small, sidelobes corresponding to the peaks of FFT spectrum will have larger amplitude and the main lobe will have a larger width, resulting in larger estimation error. It is assumed here that the number of FFT points used in path estimation is $2^n$, 1024-FFT corresponding to n=10, and in order to ensure the estimation accuracy, $K_s$ shall satisfy $$K_s \geq \frac{2^n}{64}$$

For example, if 1024-FFT is used, the value of $K_s$ needs to be at least 16.

Based on the above, for setting of $K_p$ and $K_s$, the upper bound of $K_p$ shall be firstly determined based on the maximum delay spread of the channel and the subcarrier interval, and a larger $K_p$ can be selected without exceeding the upper bound. Further, according to the set number of FFT points, a lower bound of $K_s$ is determined, and based on this lower bound, the largest possible $K_s$ can be set based on this lower bound while taking into account the limitations of bandwidth and pilot overhead, so as to improve the accuracy of channel estimation.

The bandwidth occupied by the frequency bands containing the pilots is about a bandwidth of $K_p K_s$ subcarriers. If the bandwidth corresponding to the $K_p K_s$ subcarriers still exceeds the expected total bandwidth in the case of $K_s$ taking its minimum value, then the value of $K_p$ can be reduced so that the bandwidth corresponding to the $K_p K_s$ subcarriers is less than expected total bandwidth.

Distribution of reference signals on time-frequency resources

The above mainly describes the distribution of reference signals in frequency domain resources. It should be noted that, in addition to the frequency domain resources, the reference signals may also be distributed on the time domain resources in a specific manner.

According to some embodiments, the reference signals may be distributed over at least one time slot, and thus the reference signals distributed over at least one time slot may be used to jointly estimate the channel states of the subcarriers containing the reference signals.

According to some embodiments, in a specific time slot, the reference signals are distributed in the entire transmission frequency band, and in other time slots than the specific time slot, the reference signals are distributed only in a partial frequency band range; and wherein the reference signals in the specific time slot can be used to estimate the number of paths and the phase parameter of each path, and in a time slot immediately after the specific time slot, the intensity parameter of each path can be updated by using the estimated number of paths and the phase parameter of each path.

In one implementation, the number of paths as well as the phase parameter and intensity parameter of each path can be estimated simultaneously in a specific time slot, and the estimation result of the number of paths and the path phase parameter can be used to estimate the intensity parameter of the path in the next adjacent time slot.

Therefore, the path number, phase, and intensity can be reported as path parameters after measurement in the first time slot, and only the intensity can be reported within a predetermined time thereafter. The base station side can combine the previously reported path number and phase to restore the current channel states.

According to some embodiments, in all time slots, the reference signals are distributed only over a partial frequency band range.

According to some embodiments, for even-numbered and odd-numbered time slots, the reference signals are alternately distributed in a lower-frequency half of the frequency band range with or a higher-frequency half of the frequency band range.

Among them, the reference signals in one of the even-numbered time slot and the odd-numbered time slot are used to estimate the number of paths and the phase parameter of each path, and in the other time slot in the even-numbered time slot and the odd-numbered time slot after the time slot, the intensity parameter of each path is updated by using the estimated number of paths and the phase parameter of each path.

In one implementation, the number of paths as well as the phase parameter and intensity parameter of each path can be estimated simultaneously in one of the even-numbered and odd-numbered time slots, and the estimation result of the number of paths and the path phase parameter can be used to estimate the intensity parameter of the path in the other time slot in the even-numbered time slot and the odd-numbered time slot after the time slot.

The following describes distribution of reference signals on time-frequency resources as an example. This distribution can also be referred to as mapping of reference signals to time-frequency resources.

The following exemplarily shows an example of a reference signal to time-frequency resource mapping method according to an embodiment of the present disclosure, and the transmission mode is a single-layer data transmission. The following mapping method is applicable to reference signal settings in a millimeter-wave OFDM system for channel estimation, such as CSI-RS, DM-RS, and uplink sounding reference signals (SRS).

Figure 14:
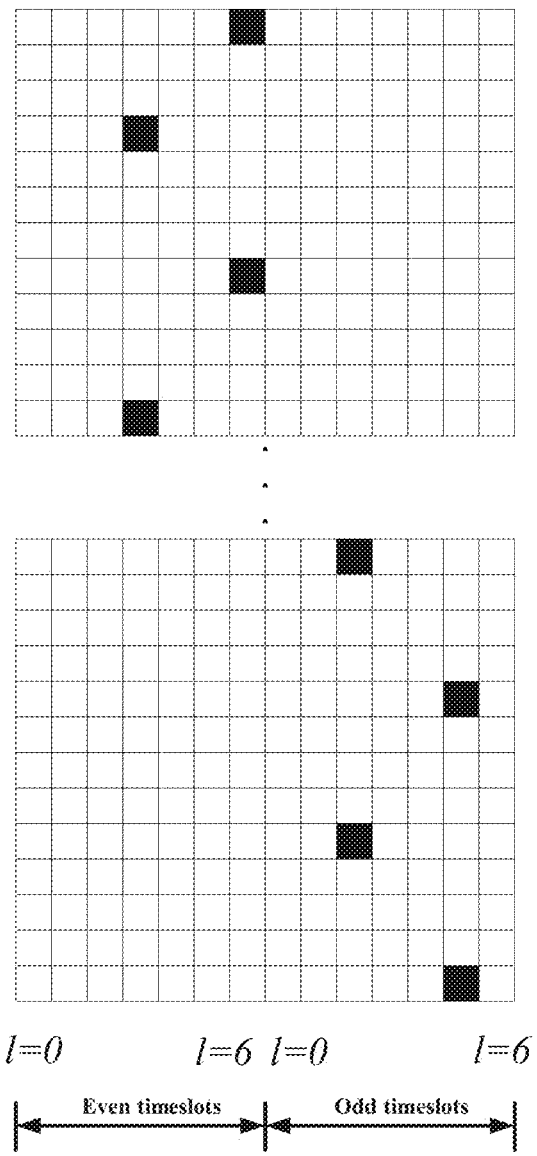
FIG. 14 is a schematic diagram of an example of mapping reference signals to time-frequency resources according to an embodiment.

FIG. 14 illustrates a mapping mode according to an embodiment of the present disclosure, which can be expressed as:

$$a_{k,l}^{(p)} = r_{n_s}\left(0.75 \cdot l' \cdot N_{RB}^{PDSCH} + m'\right)$$

$$k = (k')\mathrm{mod}N_{sc}^{RB} + N_{sc}^{RB} \cdot n_{PRB}$$

$$k' = \begin{cases} 8m' + v_{shift} & l = 3 \\ 8m' + (v_{shift} + 2)\mathrm{mod}4 & l = 6 \\ 8m' + v_{shift} + \frac{1}{2}N_{sc}^{RB}N_{RB}^{PDSCH} & l = 2 \\ 8m' + (v_{shift} + 2)\mathrm{mod}4 + \frac{1}{2}N_{sc}^{RB}N_{RB}^{PDSCH} & l = 5 \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s\mathrm{mod}2 = 0 \\ 2, 3 & \text{if } n_s\mathrm{mod}2 = 1 \end{cases}$$

$$m' = 0, 1, \ldots, \left(0.75N_{RB}^{PDSCH} - 1\right)$$

In all the time slots in this mode, the pilots are only distributed on a part of the frequency band. For this example, in even-numbered time slots, the pilots are distributed over a half of bandwidth with lower frequency; in odd-numbered time slots, the pilots are distributed over a half of bandwidth with higher frequency. The pilot overhead of this example is only a quarter of the pilot overhead of a conventional single-layer transmission.

In this mapping mode of the reference signals, the receiver can restore the information about channel states for the entire frequency band by using the pilots distributed over only half of the bandwidth in each time slot. On this basis, the receiver can also use the pilots on multiple time slots to jointly estimate the channels. For example, when the channel time-varying characteristic is within a controllable range, the simplest method is for the receiver to average the channel estimation results of two adjacent time slots. Due to the difference between the theoretical model and the actual channel, transmitting the pilots on only half of the bandwidth will cause an error in the estimation of the other half of the bandwidth that does not transmit the pilots. Combining the pilots of two adjacent time slots to estimate the channels can compensate for this error, thereby improving estimation accuracy.

Figure 15:
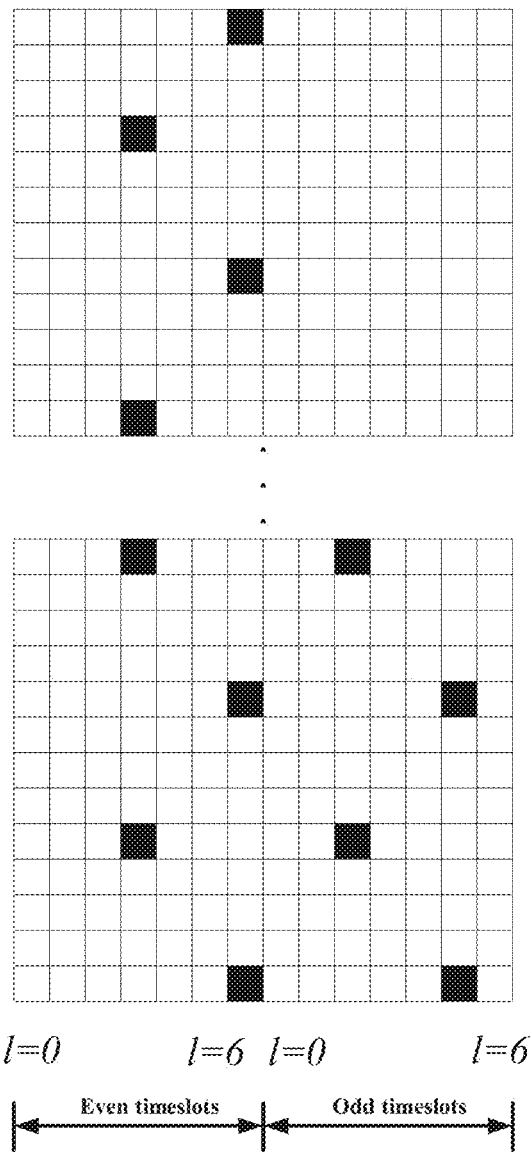
FIG. 15 is a schematic diagram of an example of mapping reference signals to time-frequency resources according to another embodiment.

FIG. 15 illustrates a mapping mode according to an embodiment of the present disclosure, which can be expressed as:

$$a_{k,l}^{(p)} = r_{n_s}\left(0.75 \cdot l' \cdot N_{RB}^{PDSCH} + m'\right)$$

$$k = (k')\mathrm{mod}N_{sc}^{RB} + N_{sc}^{RB} \cdot n_{PRB}$$

$$k' = \begin{cases} 8m' + v_{shift} & l = 3 \\ 8m' + (v_{shift} + 2)\mathrm{mod}4 & l = 6 \\ 8m' + v_{shift} + \frac{1}{2}N_{sc}^{RB}N_{RB}^{PDSCH} & l = 2 \\ 8m' + (v_{shift} + 2)\mathrm{mod}4 + \frac{1}{2}N_{sc}^{RB}N_{RB}^{PDSCH} & l = 5 \end{cases}$$

$$l = \begin{cases} 3 & l' = 0 \\ 6 & l' = 2 \\ 2 & l' = 4 \\ 5 & l' = 5 \end{cases}$$

$$l' = \begin{cases} 0, 2 & \text{if } n_s\mathrm{mod}2 = 0 \\ 4, 5 & \text{if } n_s\mathrm{mod}2 = 1 \end{cases}$$

$$m' = \begin{cases} 0, 1, \ldots, \left(1.5N_{RB}^{PDSCH} - 1\right) & \text{if } n_s\mathrm{mod}2 = 0 \\ 0, 1, \ldots, \left(0.75N_{RB}^{PDSCH} - 1\right) & \text{if } n_s\mathrm{mod}2 = 1 \end{cases}$$

In this mapping mode, the pilots are distributed over the entire frequency band for some time slots, and are distributed over a part of the frequency band for other time slots. For this example, pilots are distributed over the entire frequency band in even-numbered time slots, and are distributed over half of the frequency band in odd-numbered time slots. The pilot overhead of this example is three-eighths of that of a conventional single-layer transmission.

Similar to the first example, using the reference signal mapping method of this example, the receiver can also use only pilots within one time slot to perform channel estimation, or can estimate the channel by using multiple time slots jointly. For example, it can be assumed that the number of paths and the path delay are constant in every two time slots (if the speed of a high-speed mobile user is 100 m/s and each time slot is 0.5 ms, then the user's movement distance in such two time slots is 0.1 m, and it can be found that the change in the path delay after two time slots is less than 1 ns according to the propagation speed of the electromagnetic wave, which has a small effect on the delay parameter so that it can be ignored), and only the intensity parameter of each path will change. In this way, the receiver can estimate the number of paths and delay parameter by using pilots distributed over the entire frequency band in even-numbered time slots, and then use the previously obtained number of paths and delay parameter to estimate only intensity parameter of each path in subsequent odd-numbered time slots. This method can also be applied to the mapping mode in the first example.

Channel Estimation Feedback

After performing the above channel estimation, the receiver can feedback the obtained channel estimation results, such as conditions of channel paths, back to the transmitter side, so that the transmitter can perform subsequent processing, such as allocating resources for subsequent data transmission or for demodulation processing, etc.

Alternatively, according to some embodiments, the estimated parameters may also be fed back to the transmitter, so that the transmitter performs channel path condition estimation.

In existing communication systems, such as the long-term evolution system (LTE), after channel estimation has been done according to the channel state information reference signal (CSI-RS), the user equipment (UE) can feed back the information about channel state corresponding to each subcarrier or other channel-related information, and the base station can determine related parameters such as the modulation manner, coding manner, and time-frequency resource scheduling manner, as well as a precoding matrix, transmission mode, etc. of the multiple-input multiple-output antenna system in a single-user or multi-user scenario based on the channel information, and notify the above information to the UE in a signaling manner. However, if the UE feeds back the information about channel state of each subcarrier to the base station, the amount of information that needs to be fed back is large, and a larger additional communication overhead will be generated. Therefore, in LTE, the UE calculates information such as the channel quality identifier (CQI), precoding matrix index (PMI), rank identifier (RI) and the like based on channel estimation and feeds such information back to the base station. Although the additional communication overhead is reduced, the base station cannot obtain accurate downlink channel state information, and since the UE's data processing capabilities and power are limited, the feedback information such as CQI, PMI, RI, and the like can only be obtained by rough estimation.

According to the embodiments of the present disclosure, several parameters involved in the channel estimation method proposed by the present disclosure, including the total number of paths, the delay of each channel path, the intensity parameter of each channel path and the like as described above are feedback, so that the complete channel state information can be represented by several parameters, and then the base station can directly calculate the complete channel state information from the parameters, determine an optimal transmission manner (including the modulation manner, time-frequency resource scheduling, and precoding matrices for multiple-input multiple-output antennas, and the like as described above).

It should be noted that several channel parameters related to the channel estimation involved in this disclosure are exemplary. In some applications, it can be fed back and processed as the replacement of existing channel related parameters, such as CQI, PMI, RI, etc. In other applications, it can coexist with the existing channel-related parameters, such as CQI, PMI, RI, etc., and can serve as a useful supplement to the existing channel-related parameters.

According to the transmission mode of reference signals, the channel estimation parameters can be fed back by using the corresponding transmission mode. The feedback of the channel estimation parameters obtained from CSI-RS will be exemplarily described below.

As an example, if the UE implements the channel estimation based on the CSI-RS, the UE needs to feedback the channel information to the base station after the channel estimation. Here, the UE can perform feedback by sending the number L of paths, the path delay parameter $\beta_l$, and the path strength parameter $\Delta_l$, and the total number of parameters required for feedback is 2 L+1. After receiving the parameters, the base station can derive the channels of all subcarriers.

An encoding method for the feedback information is exemplarily described as follows: First set the maximum value $L_{max}$ of L, and assume $L_{max} \leq 4$, and 2-bit space can be allocated for L in the control channel resources feedback from the UE to the base station, and the UE feeds back L through the 2-bit information space. Then, the number L of $\Delta_l$ are feedback in the subsequent uplink control channel resources. Since $\Delta_l$ is a real number, each value of $\Delta_l$ can be represented by L 8-bit number $\delta_l$, and a 3-bit amplitude factor r is transmitted concurrently, each $\Delta_l$ can be calculated from a fixed-point number and the amplitude factors, for example, $\Delta_l = \delta_l \times 10^{-r/20}$. Therefore, a total of uplink control channel resources required for feedback the number L of $\Delta_l$ is 8 L+3 bits. Finally, the number L of $\beta_l$ are feedback in the subsequent uplink control channel resources. Because $\beta_l$ is a complex number, its real part and imaginary part need to be transmitted separately. The coding method for the real part or the imaginary part is the same as that for $\Delta_l$. A total of 2 L 8-digit number and a 3-bit amplitude factor are required, so the uplink control channel resources required for feedbacking the number L of $\beta_l$ are 16 L+3 bits. In this encoding mode, a total of 2 L+1 parameters are fed back, and a total of 24 L+8 bits, i.e., 3 L+1 bytes, needs to be transmitted.

Due to the sparsity, the value of L is small, which allows the UE to feed back complete subcarrier channels to the transmitter with a small channel information feedback overhead.

Regarding the distribution of CSI-RS required to implement the above process, CSI-RI may also be distributed only in a part of the entire frequency band. The UE estimates 2 L+1 parameters required for feedback based on the CSI-RS on the part of frequency band, and the base station derives the channels of the entire frequency band based on the 2 L+1 parameters.

Feedback of the channel estimation results can be achieved by various devices.

According to some embodiments, the receiver further includes a radio frequency link and a transceiving antenna, the radio frequency link and the transceiving antenna are configured to feedback the transmitter at least the information about channel states on the communication resources in the first frequency domain range estimated by the processing circuitry.

According to some embodiments, the electronic device for the receiver side further includes a transceiving antenna configured to feed back the estimated channel path condition to the transmitter side.

After the transmitter receives the feedback channel information and restores the channel of each subcarrier, the transmitter can determine the relevant transmission parameters based on the channel states and feed it back to the UE. For example, one or more of the parameters such as modulation manner, coding manner, time-frequency resource scheduling, precoding matrix indication, rank indication, and channel quality indication, etc. can be determined from the subcarrier channels. The transmitter then feedbacks the above information to the UE through the downlink control channel.

It should be noted that it is not necessary to restore all the frequency bands to make a decision. For example, according to the utilization of frequency band resources, only the available frequency bands can be restored for frequency resource selection.

According to some embodiments, the transceiving antenna of the receiver is further configured to receive transmission resource allocation information from the transmitter side, and the processing circuitry is configured to control signal transmission and reception on the allocated transmission resources, wherein the transmission resources are determined based on the channel states on communication resources in each frequency domain range from the transmitter to the receiver. The transmission resource allocation information may be implemented to include information such as a resource location indication and a modulation and coding scheme, etc.

According to some embodiments, the frequency domain range of communication resources of the communication system is located in a frequency band corresponding to a millimeter wave or a decimillimeter wave. Millimeter waves usually correspond to very high frequency EHF, 30-300 GHz, and the wavelength is 10-1 mm, while decimillimeter waves usually correspond to supreme high frequency, 300-3000 GHz, and the wavelength is 1-0.1 mm.

Simulation Results

Here, the channel estimation based on the channel sparsity according to the embodiment of the present disclosure is simulated. The simulation parameters used here are set as follows: the OFDM system bandwidth is 250 MHz, the number of subcarriers is 1024, and the carrier frequency is 30 GHz; the number of antennas for the transmitter and receiver is 128 and 16, respectively, and the number of radio frequency links for the transmitter and receiver both is 1; the beam selection manner used by each of the transmitter and receiver is based on the single-link to single-link maximum gain criterion, that is, $$[f, w] = \underset{f,w}{\mathrm{argmax}} \left\| w^H H f \right\|$$

Among them, f, w are the beamforming vectors used by the transmitter and the receiver, which are respectively selected from one column of a DFT matrix with a dimension of 128×128 and one column of a DFT matrix with a dimension of 16×16, and both have a modulus length of 1.

Figure 16:
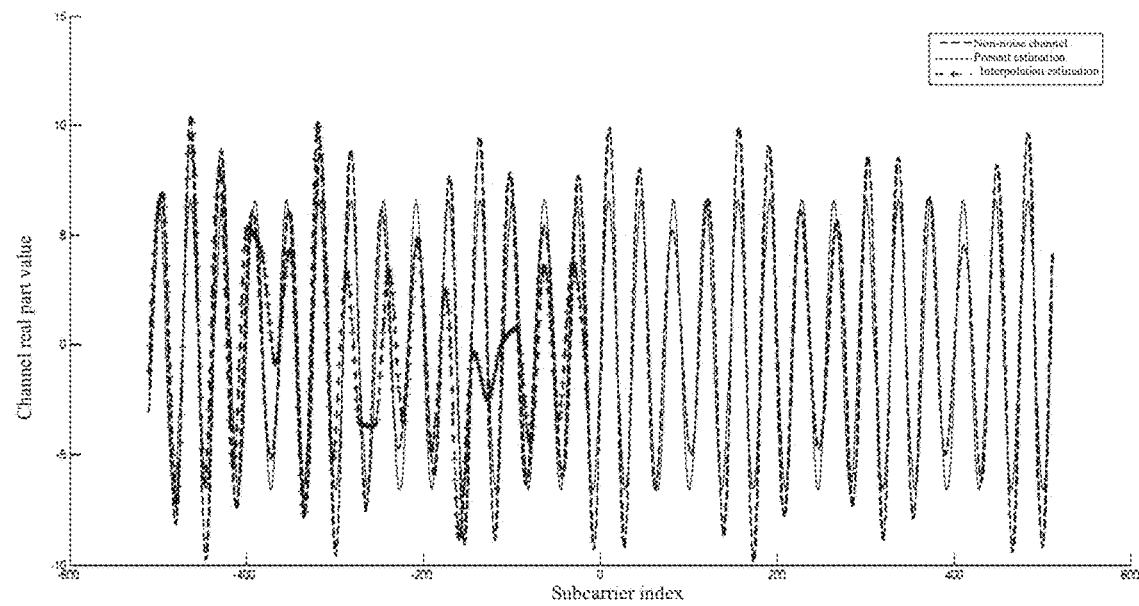
FIG. 16 is a comparison diagram of simulation results of channel estimation with pilots being inserted on only half of the bandwidth, where the real part is SNR=−10 dB.

FIG. 16 shows a comparison of channel estimation based on traditional interpolation and sparse pilot channel estimation under a channel model with L=50 (before beamforming). Here, the pilot interval $K_p$=16 and the total number of pilots $K_s$=32, that is, the pilots are transmitted over only half of the bandwidth. It can be seen from the results that the traditional interpolation method can only estimate the channels in half of the bandwidth, and because the pilot is distributed too sparsely, the estimation result of the interpolation method has a large error. Meanwhile, the sparse pilot channel estimation method can more accurately restore the channels in all frequency bands.

Figure 17:
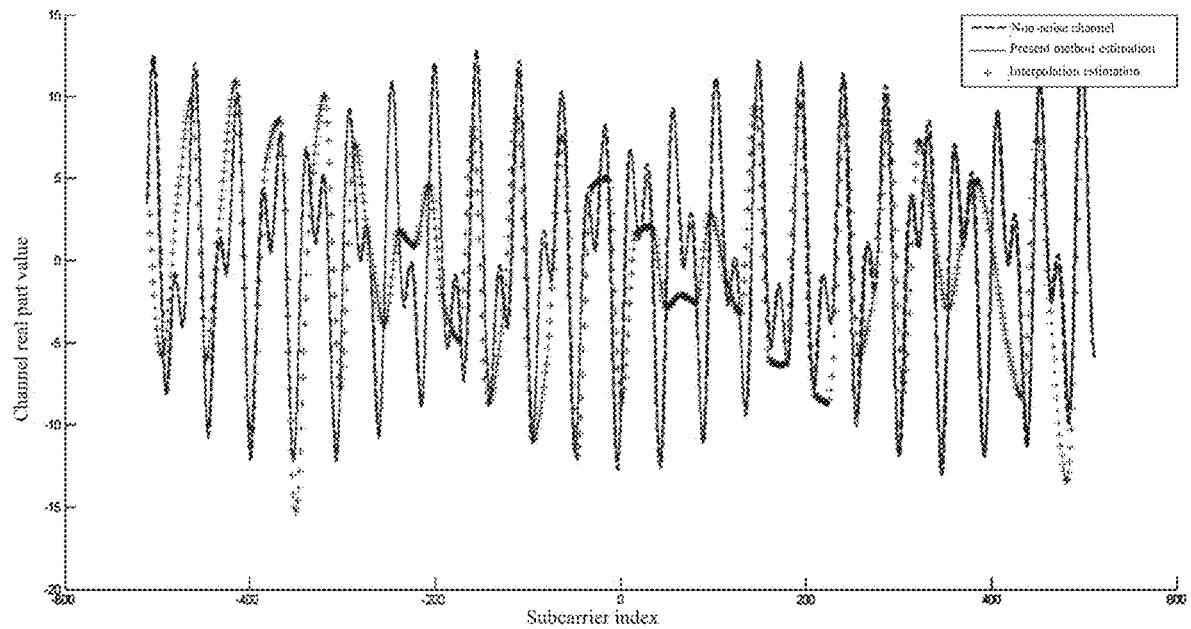
FIG. 17 is a comparison diagram of simulation results of channel estimation with pilots being inserted on the whole bandwidth, where the real part is SNR=−10 dB.

Similarly, in FIG. 17, the simulated parameters $K_s$=64 and other parameters remain the same as that in FIG. 16, that is, the pilots are transmitted over all the frequency bands instead. It can be seen from the results that the interpolation method still cannot accurately estimate the channels due to the sparsity of the pilots. But the sparse pilot channel estimation can obtain a more accurate estimation result based on FIG. 16 since $K_s$ is doubled.

Figure 18:
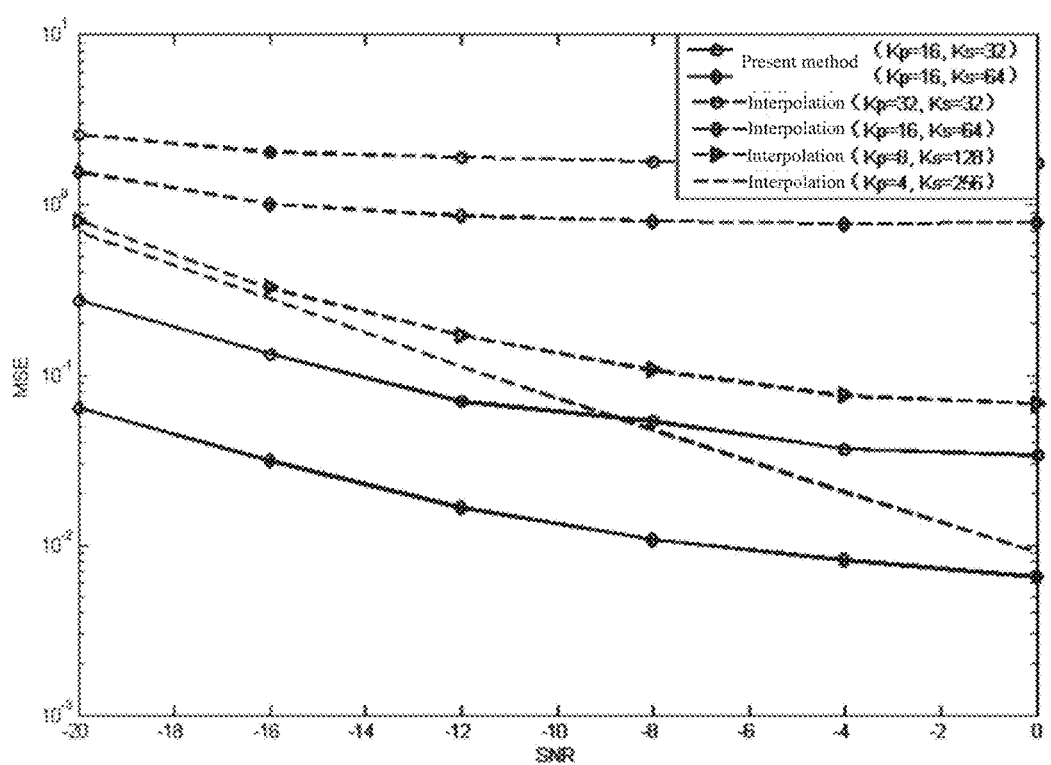
FIG. 18 is a schematic diagram illustrating MSE performance simulation comparison.

In addition, FIG. 18 shows the mean square error (MSE) simulation results of the sparse pilot channel estimation and the interpolation channel estimation, where MSE is defined as $$\frac{\sum_{k=0}^{K-1} \left\| \hat{H}_{BB}(k) - H_{BB}(k) \right\|^2}{\sum_{k=0}^{K-1} \left\| H_{BB}(k) \right\|^2}$$

Among them, $\hat{H}_{BB}(k)$ is the channel estimation result for the kth subcarrier. From FIG. 18, it can be seen that under the same pilot overhead, the MSE performance of the sparse pilot channel estimation is significantly better than the performance of the interpolation method. When $K_s$ is smaller, the interpolation method cannot effectively restore the channels, but the sparse pilot channel estimation can still obtain better MSE performance in this case. In addition, it can be seen that the sparse pilot channel estimation can still achieve better MSE performance in the case of low SNR, which indicates that this method has better resistance to noise.

Compared with the conventional interpolation method, the channel estimation according to the embodiment of the present disclosure greatly reduces the pilot overhead.

Moreover, according to an embodiment of the present disclosure, a transmitter can transmit a pilot pattern with a more sparse distribution. According to an embodiment of the present disclosure, a transmitter may transmit pilots in only a part of communication resources/a part of frequency ranges, instead of all communication resources/frequency ranges.

Further, the embodiments according to the present disclosure have low computational complexity and strong implementability.

The exemplary electronic devices according to the embodiments of the present disclosure have been described above. It should be noted that embodiments of the present disclosure may also relate to methods for a receiving side and a transmitting side in a wireless communication system.

Another aspect of the present disclosure relates to a method for a receiver in a wireless communication system. According to some embodiments, the method comprises: estimating, based on reference signals from a transmitter of the wireless communication system, channel states on communication resources carrying the reference signal, wherein the reference signals are distributed over communication resources of the communication system in a first frequency domain range, and frequency domain resources of the communication system are divided into a plurality of orthogonal frequency domain ranges including the first frequency domain range; and estimating conditions of channel paths from the transmitter to the receiver using the estimated channel states on the communication resources; wherein channel states on communication resources of other frequency domain ranges from the transmitter to the receiver are derived from the estimated conditions of the channel paths.

Another aspect of the present disclosure relates to a method for a receiver in a wireless communication system.

According to some embodiments, the method comprises: estimating, based on reference signals from a transmitter of the wireless communication system, channel states on communication resources carrying the reference signals, wherein the reference signals are distributed at a predetermined interval over frequency domain, and the predetermined interval is determined based on a maximum delay spread of channel and a frequency domain interval between adjacent communication resources in the communication system; and estimating conditions of channel paths from the transmitter to the receiver using the estimated channel states on the communication resources; wherein channel states on communication resources of other frequency domain ranges from the transmitter to the receiver are obtained from the estimated conditions of the channel paths.

Another aspect of the present disclosure relates to a method for a transmitter in a wireless communication system. According to some embodiments, the method comprises: determining that reference signals are to be arranged only on communication resources of the communication system in a first frequency domain range; and transmitting the reference signals to a receiver of the wireless communication system by using the communication resources in the first frequency domain range, wherein frequency domain resources of the communication system are divided into a plurality of orthogonal frequency domain ranges including the first frequency domain range; wherein conditions of channel paths from the transmitter to the receiver are estimated by using the estimated channel states on the communication resources; and wherein channel states on communication resources of other frequency domain ranges from the transmitter to the receiver are obtained from the estimated conditions of the channel paths.

Another aspect of the present disclosure relates to a method for a transmitter in a wireless communication system. According to some embodiments, the method comprises: transmitting reference signals to a receiver of the wireless communication system by using communication resources, wherein the reference signals are distributed at a predetermined interval over frequency domain, and the predetermined interval is determined based on a maximum delay spread of channel and a frequency domain interval between adjacent communication resources in the communication system, and wherein channel states on communication resources carrying the reference signals are estimated based on the reference signals from the transmitter; wherein conditions of channel paths from the transmitter to the receiver are estimated by using the estimated channel states on the communication resources; wherein channel states on other communication resources from the transmitter to the receiver are obtained from the estimated conditions of the channel paths.

It should be noted that these method embodiments can be implemented in any way. For example, it may be implemented by the corresponding device, circuitry, apparatus, etc. in the receiver and/or transmitter in any suitable manner. The implementation of the methods will not be described in detail here.

It should be understood that the operations or functions of these electronic devices may be combined with each other to achieve more or less operations or functions than that described. The operational steps of the methods can also be combined with each other in any suitable order, so that more or fewer operations than described can be similarly achieved.

Various application examples of channel estimation according to the embodiments of the present disclosure will be exemplified below.

First Application Example

According to an embodiment of the present disclosure, the channel estimation technique of the present disclosure can be applied in combination with the beamforming processing in a wireless communication system.

According to some embodiments, the communication system is a millimeter-wave communication system, and the electronic device for the receiver side is implemented as a user equipment or a base station, and further includes transceiving antennas. The transceiving antennas include multiple antennas and phase shifters each of which is coupled to one antenna. A processing circuitry controls phase setting of the phase shifters based on a beam sweeping result between the receiver and the transmitter to form beams directed to the transmitter, and the transceiving antennas utilize the beams to receive reference signals from a transmitter so that the processing circuitry can perform channel estimation based thereon.

For example, in such an application scenario, reference signals may be distributed on communication resources as channel state information reference signals (CRI-RS).

For example, in a scenario that analog beam pairs are needed to assist communication in very high frequency bands such as millimeter wave (channel sparsity caused by high frequencies), the disclosed method is used to perform channel estimation within a beam pair, that is, beam sweeping pairing is performed firstly, and then channels (equivalent baseband channels HBB) are estimated within the paired beams.

The basic operations in this example application scenario will be briefly described below with reference to FIGS. 19-22. The basic operations mainly involve downlink and uplink operations. The gNB indicates, for example, a base station, and the UE indicates, for example, a user equipment. Depending on the specific signal flow direction, they can indicate the transmitter side and/or the receiver side respectively. It should be noted that this is only exemplary, and the transmitter side and the receiver side can be implemented in various other manners as long as they can intercommunicate with each other.

In such an application scenario, based on whether the uplink and downlink channels are systematic, different processing methods can be adopted accordingly.

According to some embodiments, in an asymmetric situation, for example, in a FDD system in which the uplink and downlink channels are asymmetric or the uplink and downlink beam pairs are asymmetric, the first device (for example, the transmitter side) transmits the reference signals mainly on several sub-bands, and the second device (for example, the receiver side) measures the reference signals of the subbands, determines and feeds back path parameters, and then the first device restores channels on the other frequency bands from the first device to the second device based on the feedback path parameters.

According to some embodiments, in a symmetric case, such as a TDD system with symmetrical uplink and downlink channels or symmetrical uplink and downlink beam pairs, the first device (for example, the transmitter side) transmits the reference signals mainly on several sub-bands, and the second device (for example, the receiver side) measures the reference signals of the subbands, and the second device determines path parameters and restores channels on other frequency bands than the several subbands from the first device to the second device based on the part parameters, and determines channels on other frequency bands from the second device to the first device based on channel reciprocity.

Figure 19:
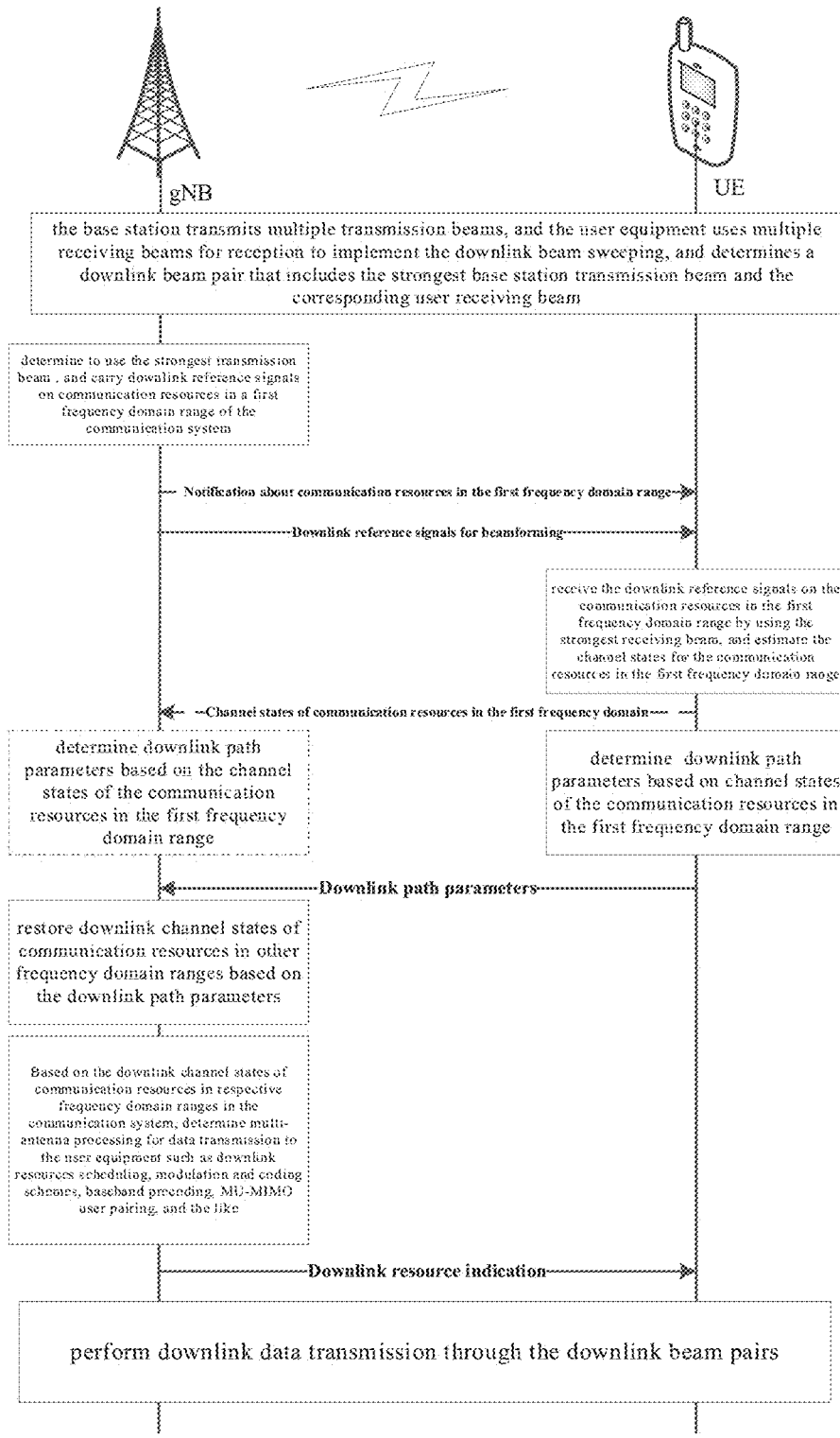
FIG. 19 shows an application example of downlink CSI-RS transmission in an asymmetric scenario.

FIG. 19 shows an application example of downlink CSI-RS transmission in an exemplary asymmetric scenario.

First, the base station transmits multiple transmission beams, and the user equipment uses multiple receiving beams for reception to implement the downlink beam sweeping, and determines a downlink beam pair that includes the strongest base station transmission beam and the corresponding user receiving beam.

This determination process can be implemented by various known beam-pair sweeping methods. For example, it can be implemented by various beamforming training methods, such as the beamforming training method as described above, and therefore will not be described in detail here.

Then, by using the determined transmission and receiving beam pairs, the base station and the user equipment can perform the embodiments according to the present disclosure to perform appropriate channel estimation for subsequent data transmission.

The base station determines to use the strongest transmission beam for transmission, and carries downlink reference signals on communication resources in a first frequency domain range of the communication system. Thereby, the reference signals subjected to beamforming are downlinked to the user side.

The physical resources on which the reference signals are arranged can be flexibly set in various ways. For example, it can be determined based on factors such as availability of resources, instead of placing reference signals at fixed resource locations as in the prior art, so that flexibility in resource utilization can be achieved.

Communication resources with respect to the first frequency domain range can be utilized to send downlink reference signals from the base station to the user side, as shown by the dashed line in FIG. 19. It should be noted that in an example of flexible configuration, the communication resources with respect to the first frequency domain range may be notified to the user side in various ways. For example, the user can be notified by notification information such as broadcast information, dedicated information and the like.

As another embodiment, the physical resources on which the reference signals are located may also be fixed by means of a communication protocol in advance. In this case, the physical resources need not to be notified to the user because the user side has already known this situation in advance.

The user equipment may receive the downlink reference signals on the communication resources in the first frequency domain range by using the strongest receiving beam, and estimate the channel states for the communication resources in the first frequency domain range. This estimation operation may operate as the embodiment of the present disclosure as described above.

The user equipment may determine the downlink path parameters based on the estimated channel states of the communication resources in the first frequency domain range. For example, as in the embodiment of the present disclosure described above, the estimated channel states of communication resources in the first frequency domain range can be utilized to estimate the conditions of channel paths from the base station to the user side, thereby determining the downlink path parameters.

Then, the user side may notify the base station side of the downlink path parameters.

It should be noted that the above operations are exemplary. According to another embodiment, the determination of the downlink path parameters may also be performed on the base station side, as shown by the dashed lines in FIG. 19.

In this case, the user side may notify the base station side of the estimated channel states of the communication resources in the first frequency domain range, and the base station side may determine the downlink path parameters based on the estimated channel states of the communication resources in the first frequency domain range. For example, as the embodiments of the present disclosure described above, the estimated channel states of the communication resources in the first frequency domain range can be utilized to estimate the conditions of channel paths from the base station to the user side, thereby determining the downlink path parameters.

The base station side restores downlink channel states of communication resources in other frequency domain ranges in the communication system based on the determined downlink path parameters, as in the embodiments of the present disclosure described above.

Based on the downlink channel states of communication resources in respective frequency domain ranges in the communication system, the base station can determine multi-antenna processing for data transmission to the user equipment such as downlink resources scheduling, modulation and coding schemes, baseband precoding, MU-MIMO user pairing, and the like, and provides the determined downlink resource indication to the user side. Specifically, the base station side, for example, performs at least one of the following: finding a resource block corresponding to a subcarrier with a large magnitude from the restored equivalent baseband channels on respective subcarriers, scheduling the resource block to the user equipment for transmission, determining a suitable modulation and coding scheme based on the equivalent baseband channel of the resource block, determining a matching downlink precoding matrix based on the equivalent baseband channel of the resource block, and performing MU-MIMO transmission to other user equipments whose equivalent baseband channel orthogonality is better on the resource block.

Therefore, the base station can perform downlink data transmission through the downlink beam pairs.

Figure 20:
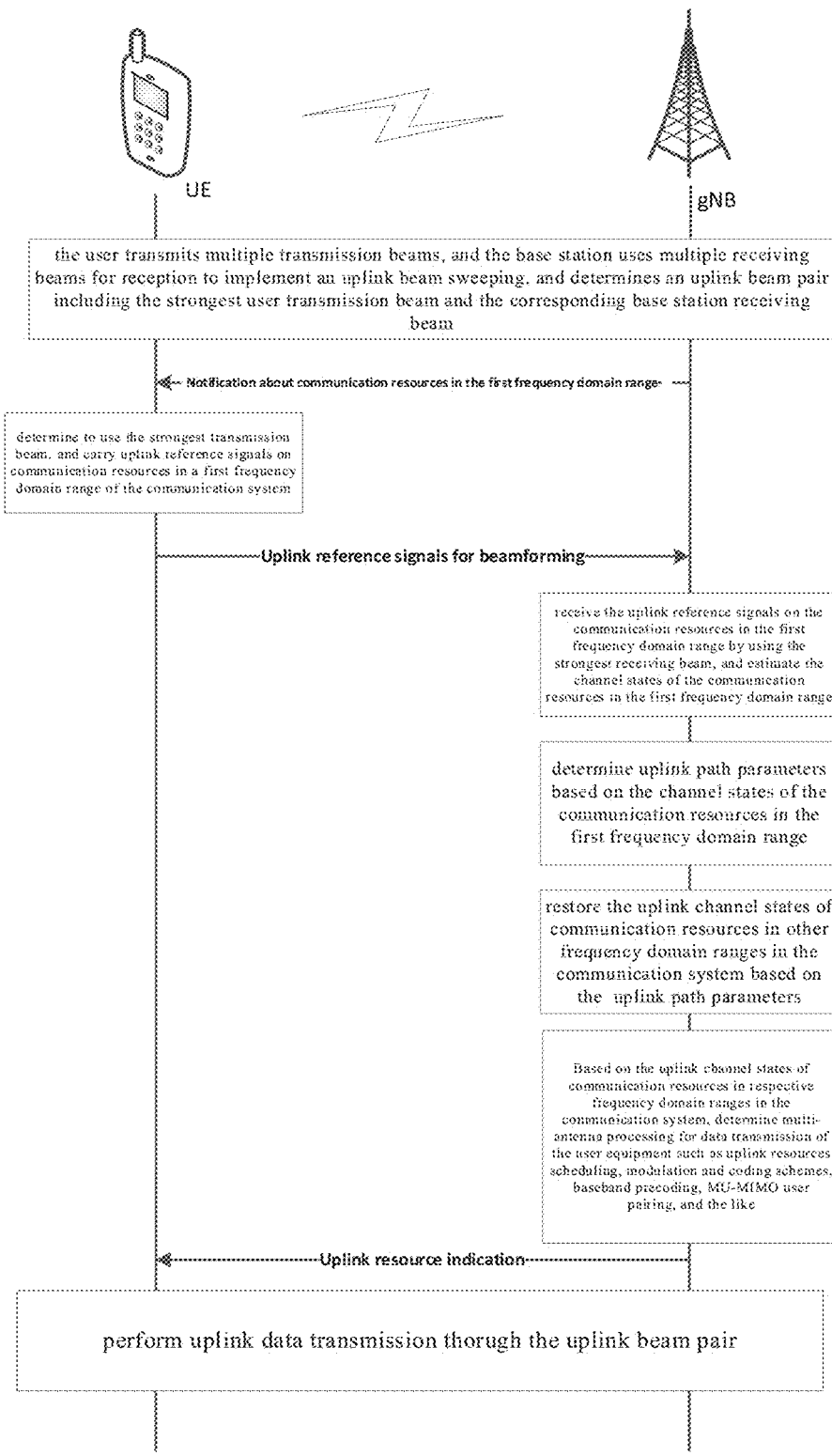
FIG. 20 shows an application example of uplink CSI-RS transmission in an asymmetric scenario.

FIG. 20 shows an application example of determining uplink channels by means of uplink SRS transmission in an exemplary asymmetric scenario.

First, the user equipment transmits multiple transmission beams, and the base station uses multiple receiving beams for reception to implement an uplink beam sweeping, and determines an uplink beam pair including the strongest user transmission beam and the corresponding base station receiving beam.

This determination process can be implemented by various known beam pair forming methods. For example, it can be implemented by various beamforming training methods, such as the beamforming training method described above, and therefore will not be described in detail here.

Then, by using the determined transmission and receiving beam pair, the user side and the base station can perform the embodiments according to the present disclosure to perform appropriate channel estimation for subsequent data transmission.

The user determines to use the strongest transmission beam for transmission, and carries uplink reference signals on communication resources in a first frequency domain range in the communication system. As a result, the reference signals subjected to beamforming are uplinked to the base station side.

As described above, the communication resources with respect to the first frequency domain range can notified the user side from the base station, as shown by the dashed line in FIG. 20. For example, the user can be notified by notification information such as broadcast information, dedicated information and the like. As another embodiment, the physical resources on which the reference signals are located may also be fixedly set by means of a communication protocol in advance. In this case, the physical resources need not to be notified to the user because the user side has already known this situation in advance.

The base station can receive the uplink reference signals on the communication resources in the first frequency domain range by using the strongest receiving beam, and estimate the channel states of the communication resources in the first frequency domain range. This estimation operation may operate as the embodiment of the present disclosure described above.

The base station may determine the uplink path parameters based on the estimated channel states of the communication resources in the first frequency domain range. For example, as described in the embodiment of the present disclosure, the base station uses the estimated channel states of the communication resources in the first frequency domain range to estimate the conditions about channel paths from the base station to the user side, and thereby determine the uplink path parameters.

Then, the base station side can restore the uplink channel states of communication resources in other frequency domain ranges in the communication system based on the determined uplink path parameters, as in the embodiments of the present disclosure described above.

According to other embodiments, the determination of the uplink path parameters and/or the determination of the uplink channel states of communication resources in other frequency-domain ranges may also be performed on the user side, as described above, which usually depends on processing capability, work mode and the like of each of the base station and user side.

Based on the uplink channel states of communication resources in respective frequency domain ranges in the communication system, the base station can determine multi-antenna processing for data transmission of the user equipment such as uplink resources scheduling, modulation and coding schemes, baseband precoding, MU-MIMO user pairing, and the like, and provides the determined uplink resource indication to the user side.

Therefore, the user can perform uplink data transmission by means of the uplink beam pair.

Figure 21:
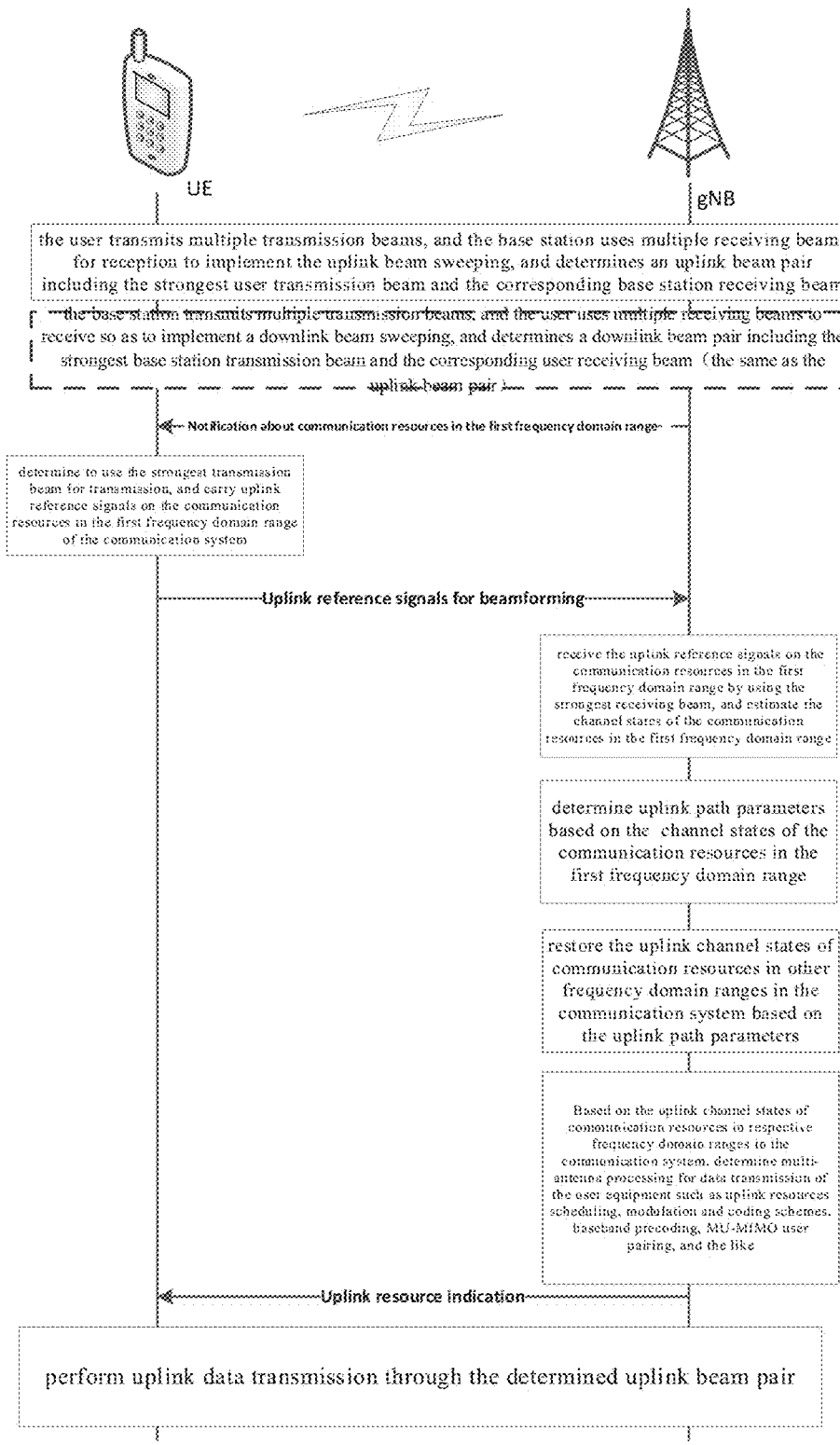
FIG. 21 shows an application example of uplink SRS transmission in a symmetric scenario.

FIG. 21 shows an application example of determining uplink channels by means of uplink SRS transmission in an example symmetrical scenario.

First, the user transmits multiple transmission beams, and the base station uses multiple receiving beams for reception to implement the uplink beam sweeping, and determines an uplink beam pair including the strongest user transmission beam and the corresponding base station receiving beam. In the case of symmetry, a downlink beam pair can be determined correspondingly, that is, the user receiving beam and the base station transmission beam are the same as the user transmission beam and the base station receiving beam, respectively.

It should be noted that the determination of the pair of transmission and receiving beams can also be achieved in other ways. For example, alternatively, it may be initiated by the base station side, as shown by the dotted line in FIG. 21. Specifically, the base station transmits multiple transmission beams, and the user uses multiple receiving beams to receive so as to implement a downlink beam sweeping, and determines a downlink beam pair including the strongest base station transmission beam and the corresponding user receiving beam. Due to the channel symmetry, the uplink beam pair is the same as the downlink beam pair, and accordingly the base station receiving beam and the user transmission beam can be determined, which are the same as the base station transmission beam and the user receiving beam, respectively.

This determination process can be implemented by various known beam pair forming methods. For example, it can be implemented by various beamforming training methods, such as the beamforming training method as described above, and therefore will not be described in detail here.

Then, by using the determined pair of transmission and receiving beams, the user side and the base station can perform an embodiment according to the present disclosure to perform appropriate channel estimation for subsequent data transmission.

The user determines to use the strongest transmission beam for transmission, and carries uplink reference signals on the communication resources in the first frequency domain range of the communication system. As a result, the reference signals subjected to beamforming is uplinked to the base station side.

As described above, the communication resources with respect to the first frequency domain range may be notified from the base station to the user side. For example, the user can be notified by notification information such as broadcast information and the like. As another embodiment, the physical resources on which the reference signals are located may also be fixedly set by means of a communication protocol in advance. In this case, the physical resources need not to be notified to the user because the user side has already known this situation in advance.

The base station can receive the uplink reference signals on the communication resources in the first frequency domain range by using the strongest receiving beam, and estimate the channel states of the communication resources in the first frequency domain range. This estimation operation may operate as the embodiment of the present disclosure described above.

The base station may determine the uplink path parameters based on the estimated channel states of the communication resources in the first frequency domain range. For example, as described in the embodiment of the present disclosure, the base station uses the estimated channel states of the communication resources in the first frequency domain range to estimate the conditions of channel paths from the user side to the base station, and thereby determine the uplink path parameters.

Then, the base station side can restore the uplink channel states of communication resources in other frequency domain ranges in the communication system based on the determined uplink path parameters, as in the embodiments of the present disclosure described above.

According to other embodiments, the determination of the uplink path parameters and/or the determination of the uplink channel states of other frequency-domain communication resources may also be performed on the user side, as described above. This usually depends on processing capability, work mode and the like of each of the base station and user side.

Based on the uplink channel states of communication resources in respective frequency domain ranges in the communication system, the base station can determine multi-antenna processing for data transmission of the user equipment such as uplink resources scheduling, modulation and coding schemes, baseband precoding, MU-MIMO user pairing, and the like, and provides the determined uplink resource indication to the user side.

Therefore, the user can perform uplink data transmission by means of the uplink beam pair.

Figure 22:
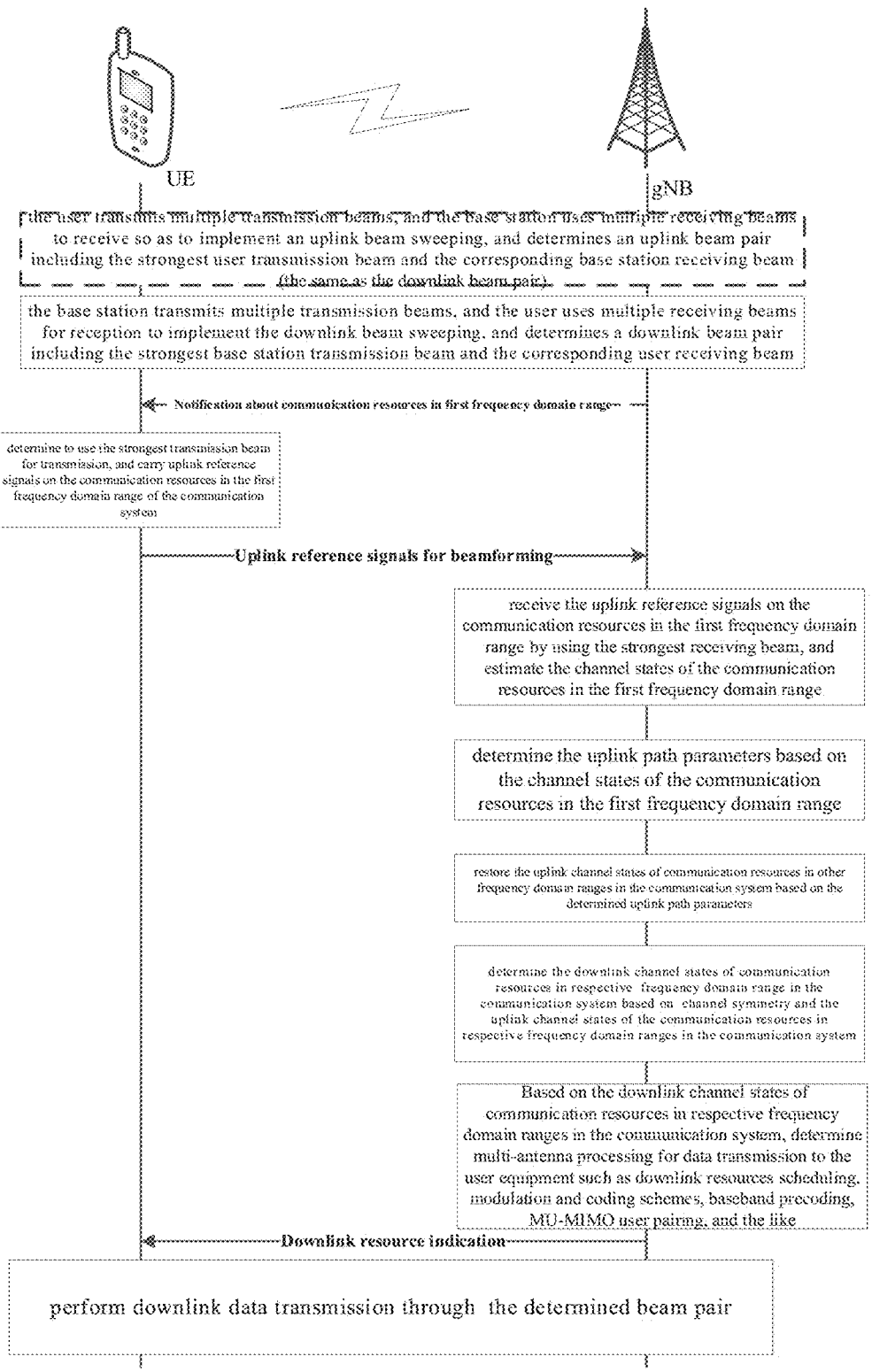
FIG. 22 shows an application example of downlink SRS transmission in a symmetric scenario.

FIG. 22 shows an application example of obtaining a downlink channel by means of uplink SRS transmission in an example symmetrical scenario.

First, a pair of transmission and receiving beams can be determined by means of symmetry. Specifically, the base station transmits multiple transmission beams, and the user uses multiple receiving beams for reception to implement the downlink beam sweeping, and determines a downlink beam pair including the strongest base station transmission beam and the corresponding user receiving beam. Due to channel symmetry, an uplink beam pair is the same as the downlink beam pair, that is, the base station receiving beam and the user transmission beam can be determined correspondingly, which are the same as the base station transmission beam and the user receiving beam, respectively.

It should be noted that the determination of the pair of transmission and receiving beams can also be achieved in other ways. For example, alternatively, it may be initiated by the user side, as shown by the dotted line in FIG. 22. Specifically, the user transmits multiple transmission beams, and the base station uses multiple receiving beams to receive so as to implement an uplink beam sweeping, and determines an uplink beam pair including the strongest user transmission beam and the corresponding base station receiving beam. In the case of symmetry, the downlink beam pair, that is, the user receiving beam and the base station transmission beam, can be determined correspondingly, which are the same as the user transmission beam and the base station receiving beam, respectively.

This determination process can be implemented by various known beam pair forming methods. For example, it can be implemented by various beamforming training methods, such as the beamforming training method described above, and therefore will not be described in detail here.

Then, by using the determined pair of transmission and receiving beams, the user side and the base station can perform an embodiment according to the present disclosure to perform appropriate channel estimation for subsequent data transmission.

Depending on the symmetry/reciprocity of beam/channel of the communication system, the downlink channel states can be estimated while performing uplink channel estimation, which can further simplify the estimation process. For example, the downlink channel estimation may be performed while uplink channel estimation is performed as described with reference to FIG. 21.

Specifically, after the base station side can restore uplink channel states of communication resources in other frequency domain ranges in the communication system based on the determined uplink path parameters, the base station side can also determine the downlink channel states of communication resources in respective frequency domain range in the communication system based on the channel symmetry and the restored uplink channel states of the communication resources in respective frequency domain ranges in the communication system.

Based on the downlink channel states of communication resources in respective frequency domain ranges in the communication system, the base station can determine multi-antenna processing for data transmission to the user equipment such as downlink resources scheduling, modulation and coding schemes, baseband precoding, MU-MIMO user pairing, and the like, and provides the determined downlink resource indication to the user side.

Therefore, the base station can perform downlink data transmission by means of the determined beam pair.

It should be noted that the above-mentioned application example based on symmetry can also perform uplink channel estimation while performing downlink channel estimation by means of symmetry.

It should be noted that the above-mentioned beam pair related application examples are merely exemplary, and the channel estimation according to the embodiments of the present disclosure can also be used in combination with various beam forming technologies developed today and in the future in various ways.

Second Application Example

The embodiments of the present disclosure are also particularly suitable for an application examples in which a wireless communication system has a large number of direct paths between a transmitter and a receiver for communication. The channels can be sparsely arranged due to a few of obstacles, and the embodiments of the present disclosure can be applied based on such sparsity.

In addition that the millimeter wave system has the characteristic of direct path, in the traditional decimeter/centimeter wave and other systems, a scenario where an aircraft communicates with a ground base station has emerged now, and in such case, most of paths between the aircraft and the base station are direct paths without being obstructed by obstacles. Furthermore, in a scenario of aerial communication between the base station and the aircraft, and a scenario that the base station and ordinary users/users and users communicate in open areas such as rural areas, etc., (channel sparsity caused by fewer obstacles), the method of the present disclosure can also be directly used to perform channel estimation.

According to some embodiments, the electronic device is implemented as an aircraft, and further includes an altitude determination unit configured to determine a flight altitude at which the aircraft is currently located and provide it to the processing circuitry, the processing circuitry being configured to, when determine the flight altitude is higher than a predetermined threshold, estimate channel states on the communication resources in the first frequency domain range as well as conditions of channel paths from the transmitter to the receiver.

Figure 23:
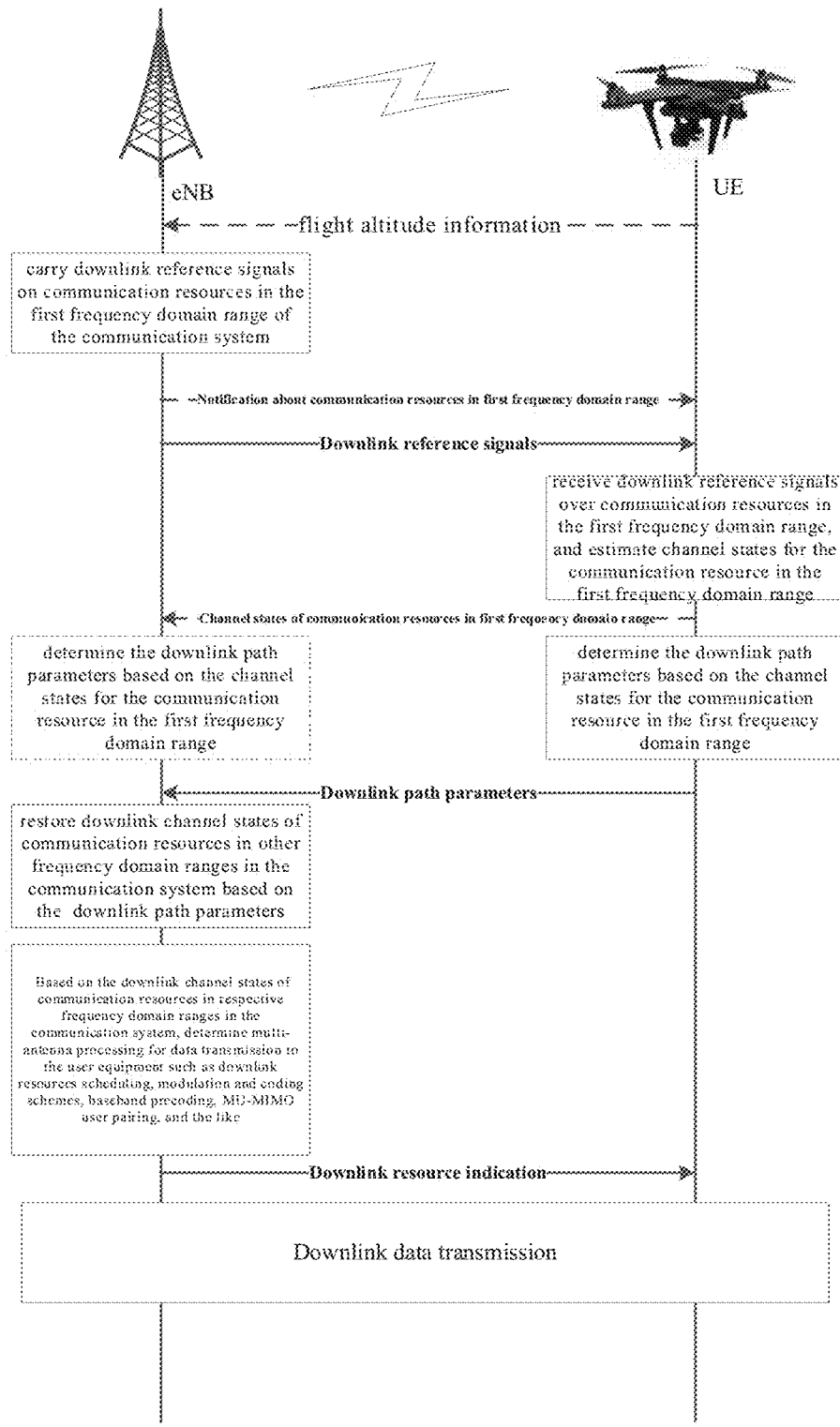
FIG. 23 shows an application example of downlink CSI-RS transmission in another asymmetric scenario.

FIG. 23 is an application example of determining downlink channels by means of the downlink CSI-RS transmission in an exemplary asymmetric scenario. Among them, gNB indicates a base station, and UE indicates a UAV or other similar high-altitude flight equipment.

First, the UE side notifies the base station side of the flight altitude information.

The UAV can determine the flight altitude information in a variety of ways. Generally, it is measured by an ultrasonic sensor (which measures the distance from the ground, which is relatively rare) or a barometer (in view that the change of the atmospheric pressure is influenced by the altitude), and the coordinates of the horizontal position are determined by a GPS module of the UAV. Of course, the UAV GPS module can also provide altitude information, but in mainstream UAVs, it is preferably to use a barometer, because data refresh rate of a low-cost GPS is too low, and the data lag may cause the UAV to reduce its altitude during high speed movement.

According to the embodiment, the base station side can judge the working mode of the UE by analyzing the flight altitude information sent by the UE. For example, when the flight altitude information is lower than a specific altitude threshold, the base station may deem the UE as a normal UE. In this case, the traditional channel estimation method can be used instead of the method of the present disclosure. On the other hand, when the flight altitude information is equal to or higher than the altitude threshold, it is considered that the UE belongs to a high-altitude flight equipment, such as an UAV, and the communication between the base station and the UE conforms to an obstacle-free communication scenario. The embodiments of the present disclosure can be applied to perform channel estimation and the like.

It should be noted that transmission of the flight altitude information is optional. In other implementations, the UE can directly notify the base station that it is an UAV in other ways, and in this case, the base station can directly use the embodiments of the present disclosure to perform channel estimation, etc., without further performing the judgment as described above.

Then, the base station carries downlink reference signals on communication resources in the first frequency domain range of the communication system.

The physical resources on which the reference signals are located can be flexibly set in various ways. For example, they can be determined based on factors such as the availability of resources, etc.

The communication resources with respect to the first frequency domain range can be utilized to transmit downlink reference signals from the base station to the user side. It should be noted that the communication resources with respect to the first frequency domain range can be notified to the user side in various ways. For example, the user can be notified by notification information such as broadcast information, dedicated information and the like. Furthermore, the information can be transmitted to the user side over different channels from that for the downlink reference signals.

As another embodiment, the physical resources on which the reference signals are located may also be fixedly set by means of a communication protocol in advance. In this case, the physical resources need not to be notified to the user because the user side has already known this situation in advance.

The UE may receive downlink reference signals over communication resources in the first frequency domain range, and estimate channel states for the communication resource in the first frequency domain range. This estimation operation may operate as the embodiment of the present disclosure described above.

The user side may determine the downlink path parameters based on the estimated channel states for the communication resource in the first frequency domain range. For example, as in the embodiments of the present disclosure described above, the conditions of channel paths from the base station to the user side can be estimated based on the estimated channel states of communication resources in the first frequency domain, thereby determining the downlink path parameters.

Then, the user side may notify the base station side of the downlink path parameters.

According to another embodiment, the determination of the downlink path parameters may be performed on the base station side. In this case, the user side may notify the base station side of the estimated channel state of the communication resources in the first frequency domain range, and the base station side may determine the downlink path parameters based on the estimated channel states of the communication resources in the first frequency domain range. For example, as the embodiments of the present disclosure described above, the estimated channel states of the communication resources in the first frequency domain range are used to estimate the conditions of channel paths from the base station to the user side, thereby determining the downlink path parameters.

The base station side restores downlink channel states of communication resources in other frequency domain ranges in the communication system based on the determined downlink path parameters, as in the embodiments of the present disclosure described above.

Based on the downlink channel states of communication resources in respective frequency domain ranges in the communication system, the base station can determine multi-antenna processing for data transmission to the user equipment such as downlink resources scheduling, modulation and coding schemes, baseband precoding, MU-MIMO user pairing, and the like, and provides the determined downlink resource indication to the user side.

Therefore, the base station can perform downlink data transmission by means of the downlink beam pair.

In an asymmetric scenario, the uplink path estimation and transmission from the user equipment to the base station can also be performed as in the first application example with reference to FIG. 20, but the determination of the beam pair can be omitted, which will not be described in detail here.

It should be noted that the communication between the aircraft user equipment and the base station may also have channel symmetry. In this symmetric scenario, the uplink/downlink channel estimation and transmission between the user equipment and the base station can also be performed as described in the first embodiment with reference to FIGS. 21 and 22, but the determination of the beam pair can be omitted, and will not be described here More details.

It should be noted that the above-mentioned second application example is mainly described based on an aircraft. However, it should be understood that the UE can also represent an ordinary user equipment in an open scenario, and the channel estimation/transmission can be performed similarly, but the user equipment needs not to provide altitude information at this time.

Third Application Example

The embodiments of the present disclosure are also applicable to a case of data demodulation process. The channel estimation method proposed in the present disclosure can be used for demodulating data. In this case, the reference signals used in the estimation process are demodulation reference signals (DM-RS).

The application of the channel estimation technology according to the embodiment of the present disclosure in a data demodulation process using DMRS will be described below with reference to FIGS. 24-25. In the figure, gNB indicates a base station, and UE indicates a user equipment, such as a mobile phone. It should be noted that this is only exemplary, and there may be various other implementation manners on the transmitter side and the receiver side as long as they can intercommunicate with each other.

Figure 24:
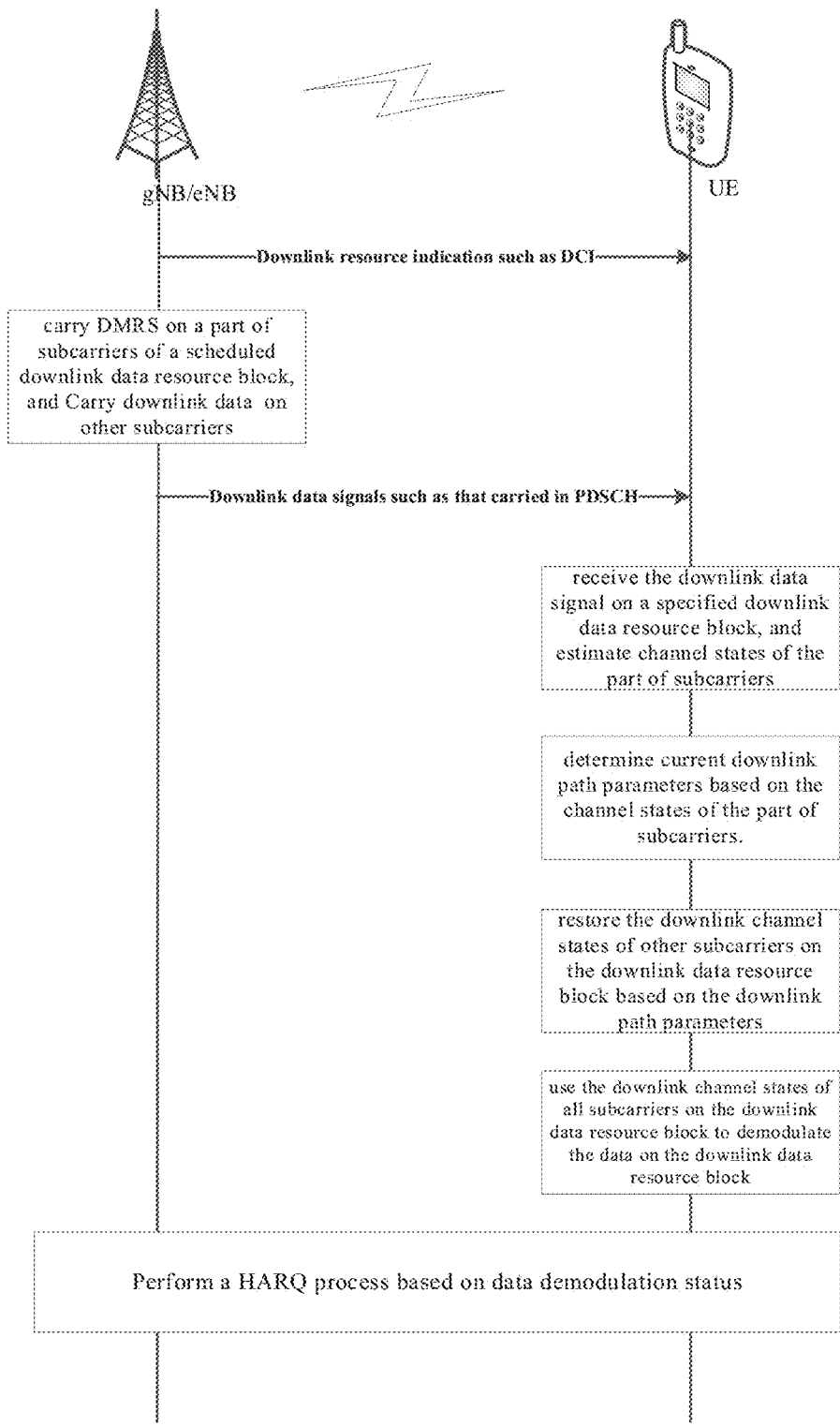
FIG. 24 shows an application example of DMRS downlink transmission.

FIG. 24 is an application example of DMRS downlink transmission.

First, the base station provides a downlink resource indication to the user side. The downlink resource indication may be provided in various ways, such as DCI.

Downlink resources can be flexibly set in various ways. For example, they can be determined based on factors such as the availability of resources. As another embodiment, the downlink sources may also be fixedly set by means of a communication protocol in advance. In this case, the physical resources need not to be notified to the user because the user side has already known this situation in advance.

Then, the base station causes DMRS to be carried on a part of subcarriers of a scheduled downlink data resource block, and downlink data to be carried on other subcarriers. Downlink data signals can be carried in various ways, such as PDSCH.

The user side can receive the downlink data signal on a specified downlink data resource block, and estimate channel states of the part of subcarriers. This estimation operation may be performed as described in the embodiments of the present disclosure described above, that is, the DMRS as reference signals are obtained by analyzing the downlink data signal, and then the channel states of the part of subcarriers are estimated based on the obtained DMRS.

The user side may determine the downlink path parameters based on the estimated channel states of the part of subcarriers. For example, as in the embodiment of the present disclosure described above, the conditions of channel paths from the base station to the user side are estimated by using the estimated channel states of the part of subcarriers, thereby determining the downlink path parameters.

Then, the user side may restore the downlink channel states of other subcarriers on the downlink data resource block based on the determined downlink path parameters, as in the embodiments of the present disclosure described above.

Then, the user side can use the downlink channel states of all subcarriers on the downlink data resource block to demodulate the data on the downlink data resource block.

The subsequent processings can be performed according to the data demodulation status. For example, a HARQ (Hybrid Automatic Retransmission Request) process may be performed based on the data demodulation status.

Figure 25:
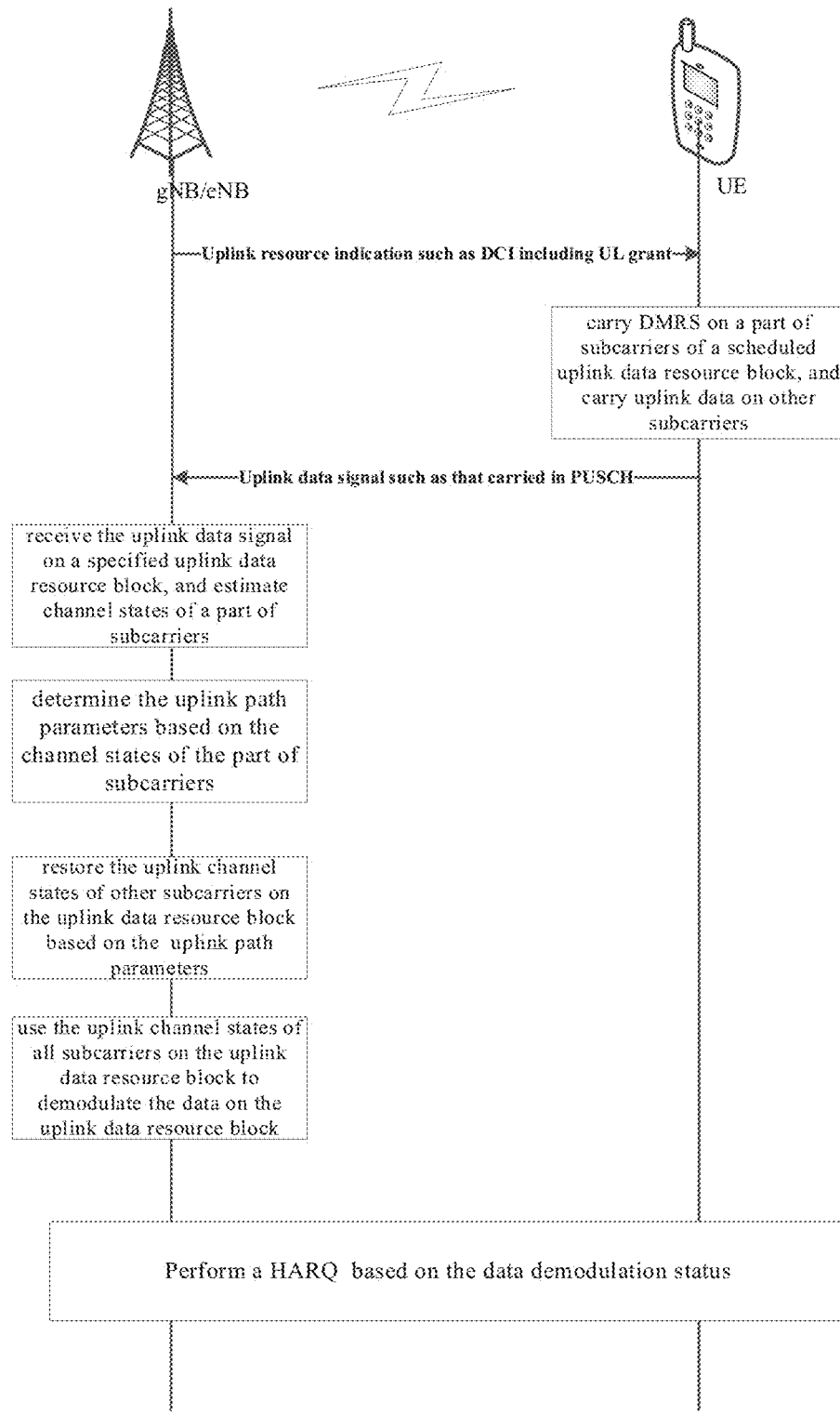
FIG. 25 shows an application example of DMRS uplink transmission.

FIG. 25 is an application example of DMRS uplink transmission.

First, the base station provides an uplink resource indication to the user side. The uplink resource indication may be provided in various ways, such as being provided as a DCI including a UL grant.

Uplink resources can be flexibly set in various ways. For example, they can be determined based on factors such as the availability of resources. As another embodiment, the uplink sources may also be fixedly set by means of a communication protocol in advance. In this case, the physical resources need not to be notified to the user because the user side has already known this situation in advance.

Then, the user side causes DMRS to be carried on a part of subcarriers of a scheduled uplink data resource block, and uplink data to be carried on other subcarriers. Uplink data signals can be carried in various ways, such as PUSCH.

The base station can receive the uplink data signal on a specified uplink data resource block, and estimate channel states of the part of subcarriers. This estimation operation may be performed as described in the embodiments of the present disclosure described above, that is, the DMRS as reference signals are obtained by analyzing the uplink data signal, and then the channel states of the part of subcarriers are estimated based on the obtained DMRS.

The base station may determine the uplink path parameters based on the estimated channel states of the part of subcarriers. For example, as in the embodiment of the present disclosure described above, the conditions of channel paths from the user side to the base station are estimated by using the estimated channel states of the part of subcarriers, thereby determining the uplink path parameters.

Then, the base station may restore the uplink channel states of other subcarriers on the uplink data resource block based on the determined uplink path parameters, as in the embodiments of the present disclosure described above.

Then, the base station can use the uplink channel states of all subcarriers on the uplink data resource block to demodulate the data on the uplink data resource block.

The subsequent processings can be performed according to the data demodulation status. For example, a HARQ (Hybrid Automatic Retransmission Request) process may be performed based on the data demodulation status.

It should be noted that the application examples described above are merely exemplary. The embodiments of the present disclosure can also be executed in any other suitable manner in the above application examples, and the advantageous effects obtained by the embodiments of the present disclosure still can be achieved. Moreover, the embodiments of the present disclosure can also be applied to other similar application examples, and the advantageous effects obtained by the embodiments of the present disclosure can still be achieved.

It should be understood that the machine-executable instructions in the machine-readable storage medium or program product according to the embodiments of the present disclosure may be configured to perform operations corresponding to the above-mentioned device and method embodiments. When referring to the above device and method embodiments, the embodiments of the machine-readable storage medium or program product are clear to those skilled in the art, and therefore will not be described repeatedly. Machine-readable storage medium and program products for carrying or including the above-mentioned machine-executable instructions also fall within the scope of the present disclosure. Such a storage medium may include, but is not limited to, a floppy disk, an optical disk, a magneto-optical disk, a memory card, a memory stick, and the like.

Figure 26:
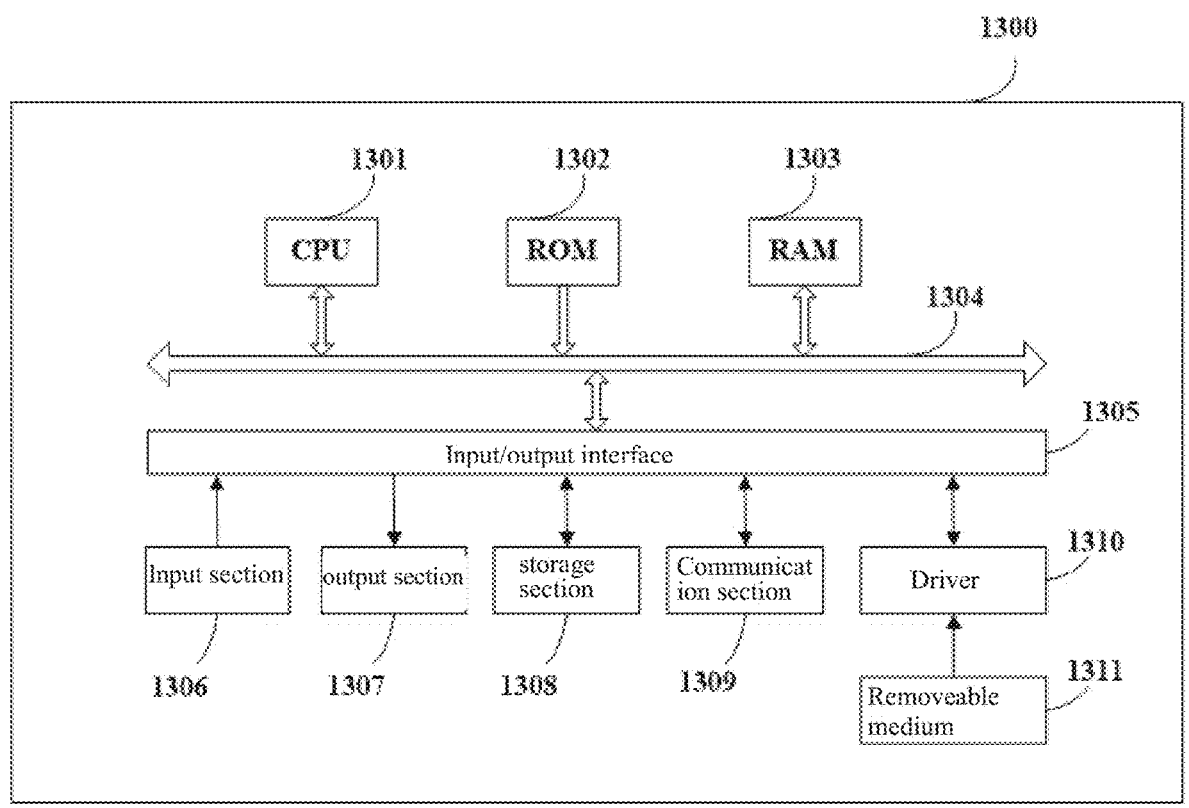
FIG. 26 is a block diagram of an exemplary structure of a personal computer as an information processing device that can be employed according to an embodiment of the present disclosure.

In addition, it should be understood that the processes and devices described above may also be implemented by software and/or firmware. When implemented by software and/or firmware, a program constituting the software is installed from a storage medium or a network to a computer having a dedicated hardware structure, such as a general-purpose personal computer 1300 shown in FIG. 26, and the computer can perform a variety of functions by installing various programs thereon. FIG. 26 is a block diagram showing an example structure of a personal computer as an information processing apparatus that can be adopted in an embodiment of the present disclosure. In one example, the personal computer may correspond to the above-described exemplary terminal equipment according to the present disclosure.

In FIG. 26, a central processing unit (CPU) 1301 performs various processes according to a program stored in a read only memory (ROM) 1302 or a program loaded from a storage section 1308 to a random access memory (RAM)

1303. In the RAM 1303, data required when the CPU 1301 executes various processes and the like is also stored as necessary.

The CPU 1301, the ROM 1302, and the RAM 1303 are connected to each other via a bus 1304. An input/output interface 1305 is also connected to the bus 1304.

The following components are connected to the input/output interface 1305: an input section 1306 including a keyboard, a mouse, etc.; an output section 1307 including a display, such as a cathode ray tube (CRT), a liquid crystal display (LCD), etc., and a speaker, etc.; a storage section 1308 including hard disks, etc.; and communication section 1309 including network interface cards such as LAN cards, modems, etc. The communication section 1309 performs communication processing via a network such as the Internet.

A driver 1310 is also connected to the input/output interface 1305 as needed. A removable medium 1311 such as a magnetic disk, an optical disk, a magneto-optical disk, a semiconductor memory, etc. is installed on the drive 1310 as needed, so that a computer program read out therefrom can be installed into the storage section 1308 as needed.

In a case where the above-mentioned processes are realized by a software, the programs constituting the software are installed from a network such as the Internet or a storage medium such as a removable medium 1311.

Those skilled in the art should understand that such a storage medium is not limited to the removable medium 1311 shown in FIG. 26 in which the program is stored and which is distributed separately from the device to provide the program to the user. Examples of the removable medium 1311 include a magnetic disk (including a floppy disk (registered trademark)), an optical disk (including a CD-ROM and a digital versatile disk (DVD)), and a magneto-optical disk (including a mini disk (MD) (registered trademark))) and semiconductor memory. Alternatively, the storage medium may be the ROM 1302, a hard disk included in the storage portion 1308, and the like, in which programs are stored and which are distributed to users along with the device containing them.

The technology of the present disclosure can be applied to various products. For example, the base stations mentioned in this disclosure can be implemented as any type of evolved Node B (gNB), such as macro gNB and small gNB. A small gNB may be a gNB covering a cell smaller than a macro cell, such as a pico gNB, a micro gNB, and a home (femto) gNB. Alternatively, the base station can be implemented as any other type of base station, such as a NodeB and a Base Transceiver Station (BTS). The base station may include: a main body (also referred to as a base station device) configured to control wireless communication; and one or more remote radio heads (RRHs) disposed at a place different from the main body. In addition, various types of terminals described below can work as base stations by temporarily or semi-persistently performing base station functions.

For example, the terminal equipment mentioned in this disclosure is also referred to as user equipment in some examples, and can be implemented as a mobile terminal such as a smart phone, a tablet personal computer (PC), a notebook PC, a portable gaming terminal, a portable/dongle Mobile routers and digital cameras, or vehicle terminals such as car navigation equipment. User equipment can also be implemented as a terminal that performs machine-to-machine (M) communication, also called as a machine type communication (MTC) terminal. In addition, the user equipment may be a wireless communication module mounted on each of the terminals described above, such as an integrated circuit module including a single chip.

Examples according to the present disclosure will be described below with reference to FIGS. 27 to 30.

Example of Base Station

It should be understood that the term "base station" in this disclosure has the full breadth of its usual meaning and includes at least a wireless communication station that is used as part of a wireless communication system or radio system for facilitating communication. Examples of base stations may be, for example but not limited to, the following: may be one or both of a base transceiver station (BTS) and a base station controller (BSC) in a GSM system, may be one or both of a radio network controller (RNC) and Node B in a WCDMA system, may be eNBs in LTE and LTE-Advanced systems, or may be corresponding network nodes in future communication systems (such as gNB, eLTE, eNB, etc. that may appear in 5G communication systems). Part of the functions in the base station of the present disclosure can also be implemented as an entity with control function for communication in D2D, M2M, and V2V communication scenarios, or as an entity that plays a spectrum coordination role in cognitive radio communication scenarios.

First Example

Figure 27:
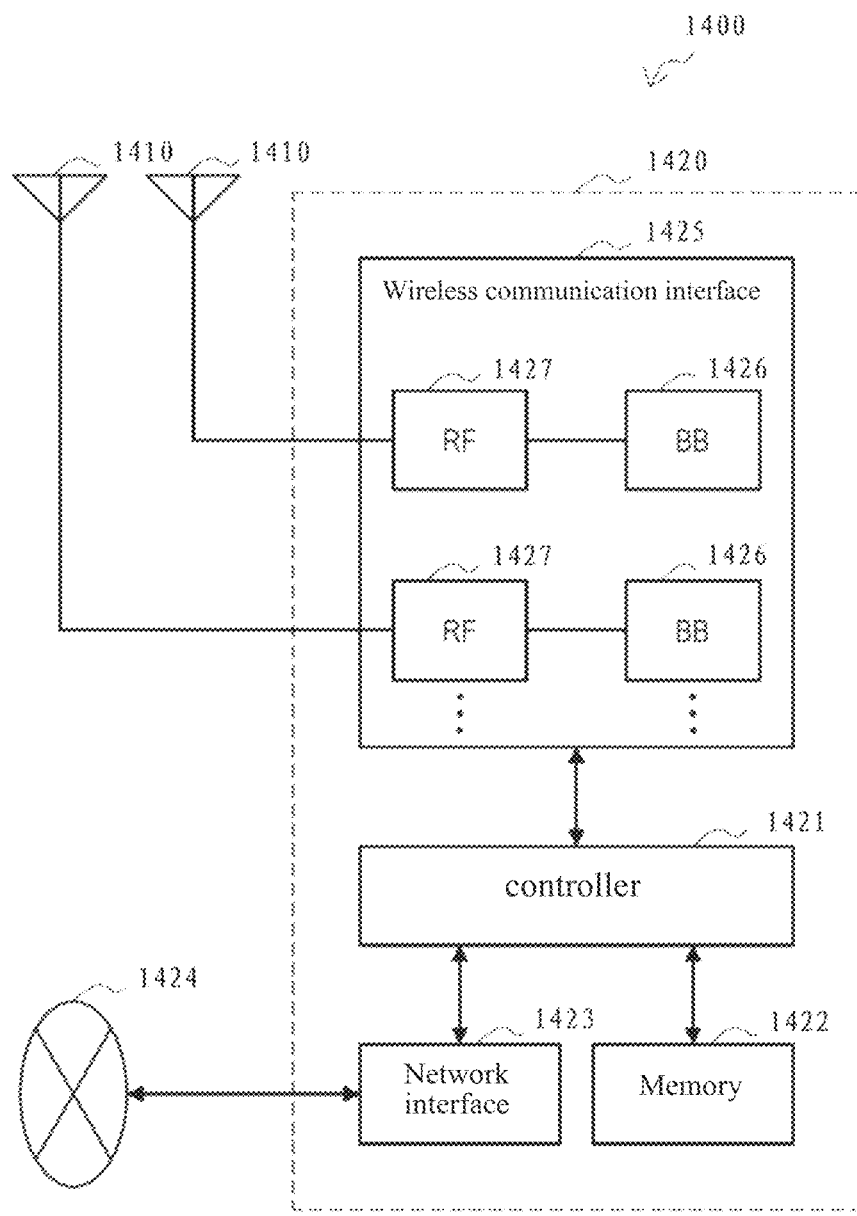
FIG. 27 is a block diagram showing a first example of a schematic configuration of a gNB to which the technology of the present disclosure can be applied.

FIG. 27 is a block diagram showing a first example of a schematic configuration of a gNB to which the technology of the present disclosure can be applied. The gNB 1400 includes a plurality of antennas 1410 and a base station device 1420. The base station device 1420 and each antenna 1410 may be connected to each other via an RF cable. In an implementation manner, the gNB 1400 (or the base station device 1420) herein may correspond to the above-mentioned electronic devices 300A, 1300A, and/or 1500B.

Each of the antennas 1410 includes a single or multiple antenna elements, such as multiple antenna elements included in a multiple-input multiple-output (MIMO) antenna, and is used for the base station device 1420 to transmit and receive wireless signals. As shown in FIG. 27, the gNB 1400 may include a plurality of antennas 1410. For example, multiple antennas 1410 may be compatible with multiple frequency bands used by gNB 1400.

The base station device 1420 includes a controller 1421, a memory 1422, a network interface 1423, and a wireless communication interface 1425.

The controller 1421 may be, for example, a CPU or a DSP, and operates various functions of the base station device 1420 at a higher layer. For example, the controller 1421 generates data packets based on data in signals processed by the wireless communication interface 1425, and passes the generated packets via the network interface 1423. The controller 1421 may bundle data from multiple baseband processors to generate bundled packets, and pass the generated bundled packets. The controller 1421 may have logical functions that perform controls such as radio resource control, radio bearer control, mobility management, admission control, and scheduling. The controls can be performed in conjunction with a nearby gNB or core network node. The memory 1422 includes a RAM and a ROM, and stores a program executed by the controller 1421 and various types of control data such as a terminal list, transmission power data, and scheduling data.

The network interface 1423 is a communication interface for connecting the base station device 1420 to the core network 1424. The controller 1421 may communicate with a core network node or another gNB via the network interface 1423. In this case, the gNB 1400 and the core network node or other gNBs may be connected to each other through a logical interface such as an S1 interface and an X2 interface. The network interface 1423 may also be a wired communication interface or a wireless communication interface for a wireless backhaul line. If the network interface 1423 is a wireless communication interface, compared with the frequency band used by the wireless communication interface 1425, the network interface 1423 can use a higher frequency band for wireless communication.

The wireless communication interface 1425 supports any cellular communication scheme such as Long Term Evolution (LTE) and LTE-Advanced, and provides a wireless connection to a terminal located in a cell of the gNB 1400 via an antenna 1410. The wireless communication interface 1425 may generally include, for example, a baseband (BB) processor 1426 and an RF circuit 1427. The BB processor 1426 may perform, for example, encoding/decoding, modulation/demodulation, and multiplexing/demultiplexing, and execute various types of signal processing in layers such as L1, Medium Access Control (MAC), Radio Link Control (RLC), and Packet Data Convergence Protocol (PDCP). As an alternative of the controller 1421, the BB processor 1426 may have a part or all of the above-mentioned logical functions. The BB processor 1426 may be a memory storing a communication control program, or a module including a processor and related circuits configured to execute the program. Updating the program can change the function of the BB processor 1426. The module may be a card or a blade inserted into a slot of the base station device 1420. Alternatively, the module may be a chip mounted on a card or a blade. Meanwhile, the RF circuit 1427 may include, for example, a mixer, a filter, and an amplifier, and transmits and receives a wireless signal via the antenna 1410. Although FIG. 27 illustrates an example in which one RF circuit 1427 is connected to one antenna 1410, the present disclosure is not limited to this illustration, but one RF circuit 1427 may be connected to multiple antennas 1410 at the same time.

As shown in FIG. 27, the wireless communication interface 1425 may include a plurality of BB processors 1426. For example, the plurality of BB processors 1426 may be compatible with multiple frequency bands used by gNB 1400. As shown in FIG. 27, the wireless communication interface 1425 may include a plurality of RF circuits 1427. For example, the plurality of RF circuits 1427 may be compatible with multiple antenna elements. Although FIG. 27 shows an example in which the wireless communication interface 1425 includes a plurality of BB processors 1426 and a plurality of RF circuits 1427, the wireless communication interface 1425 may also include a single BB processor 1426 or a single RF circuit 1427.

Second Example

Figure 28:
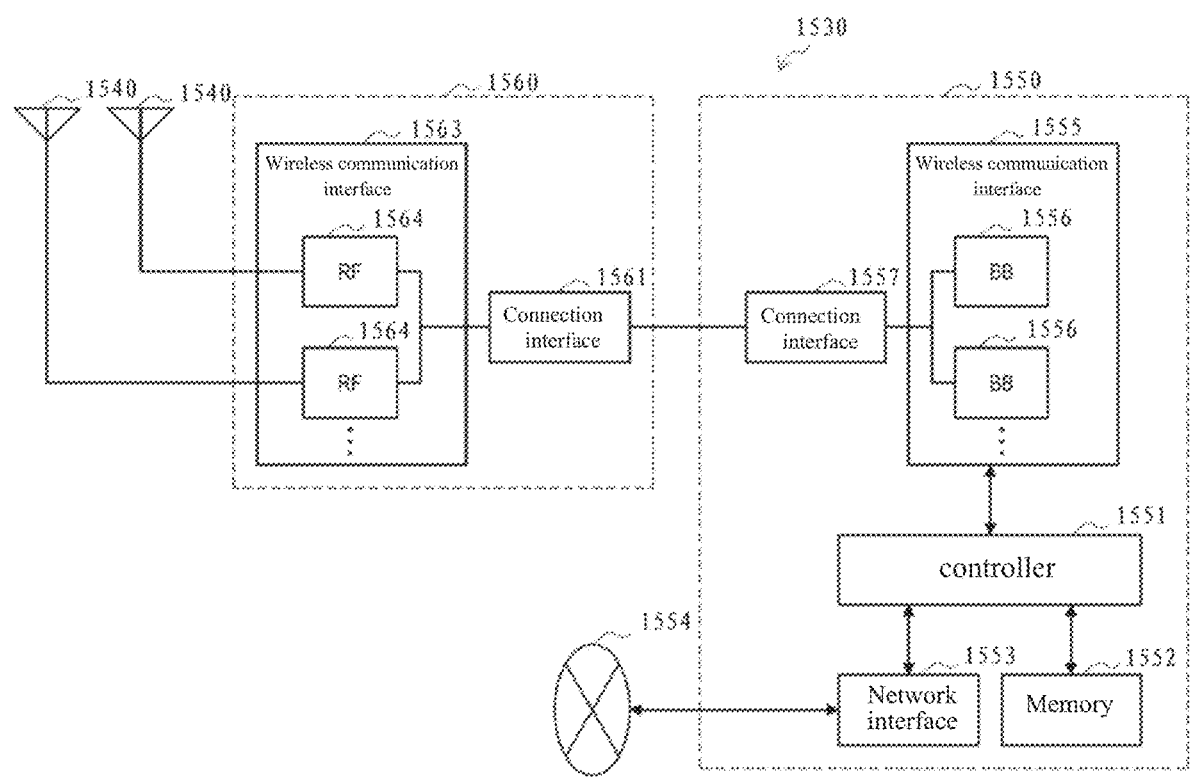
FIG. 28 is a block diagram showing a second example of a schematic configuration of a gNB to which the technology of the present disclosure can be applied.

FIG. 28 is a block diagram showing a second example of a schematic configuration of a gNB to which the technology of the present disclosure can be applied. The gNB 1530 includes multiple antennas 1540, base station equipment 1550, and RRH 1560. The RRH 1560 and each antenna 1540 may be connected to each other via an RF cable. The base station equipment 1550 and the RRH 1560 may be connected to each other via a high-speed line such as a fiber optic cable. In an implementation manner, the gNB 1530 (or the base station device 1550) herein may correspond to the foregoing electronic devices 300A, 1300A, and/or 1500B.

Each of the antennas 1540 includes a single or multiple antenna elements (such as multiple antenna elements included in a MIMO antenna) and is used for RRH 1560 to transmit and receive wireless signals. As shown in FIG. 28, the gNB 1530 may include multiple antennas 1540. For example, multiple antennas 1540 may be compatible with multiple frequency bands used by gNB 1530.

The base station device 1550 includes a controller 1551, a memory 1552, a network interface 1553, a wireless communication interface 1555, and a connection interface 1557. The controller 1551, the memory 1552, and the network interface 1553 are the same as the controller 1421, the memory 1422, and the network interface 1423 described with reference to FIG. 27.

The wireless communication interface 1555 supports any cellular communication scheme such as LTE and LTE-Advanced, and provides wireless communication to a terminal located in a sector corresponding to the RRH 1560 via the RRH 1560 and the antenna 1540. The wireless communication interface 1555 may typically include, for example, a BB processor 1556. The BB processor 1556 is the same as the BB processor 1426 described with reference to FIG. 27 except that the BB processor 1556 is connected to the RF circuit 1564 of the RRH 1560 via the connection interface 1557. As shown in FIG. 28, the wireless communication interface 1555 may include a plurality of BB processors 1556. For example, multiple BB processors 1556 may be compatible with multiple frequency bands used by gNB 1530. Although FIG. 28 shows an example in which the wireless communication interface 1555 includes a plurality of BB processors 1556, the wireless communication interface 1555 may also include a single BB processor 1556.

The connection interface 1557 is an interface for connecting the base station device 1550 (wireless communication interface 1555) to the RRH 1560. The connection interface 1557 may also be a communication module for communication in the above-mentioned high-speed line connecting the base station device 1550 (wireless communication interface 1555) to the RRH 1560.

The RRH 1560 includes a connection interface 1561 and a wireless communication interface 1563.

The connection interface 1561 is an interface for connecting the RRH 1560 (wireless communication interface 1563) to the base station device 1550. The connection interface 1561 may also be a communication module for communication in the above-mentioned high-speed line.

The wireless communication interface 1563 transmits and receives wireless signals via the antenna 1540. The wireless communication interface 1563 may generally include, for example, an RF circuit 1564. The RF circuit 1564 may include, for example, a mixer, a filter, and an amplifier, and transmits and receives wireless signals via the antenna 1540. Although FIG. 28 illustrates an example in which one RF circuit 1564 is connected to one antenna 1540, the present disclosure is not limited to this illustration, but one RF circuit 1564 may be connected to multiple antennas 1540 at the same time.

As shown in FIG. 28, the wireless communication interface 1563 may include a plurality of RF circuits 1564. For example, the plurality of RF circuits 1564 may support multiple antenna elements. Although FIG. 28 shows an example in which the wireless communication interface 1563 includes a plurality of RF circuits 1564, the wireless communication interface 1563 may include a single RF circuit 1564.

Example of User Equipment

First Example

Figure 29:
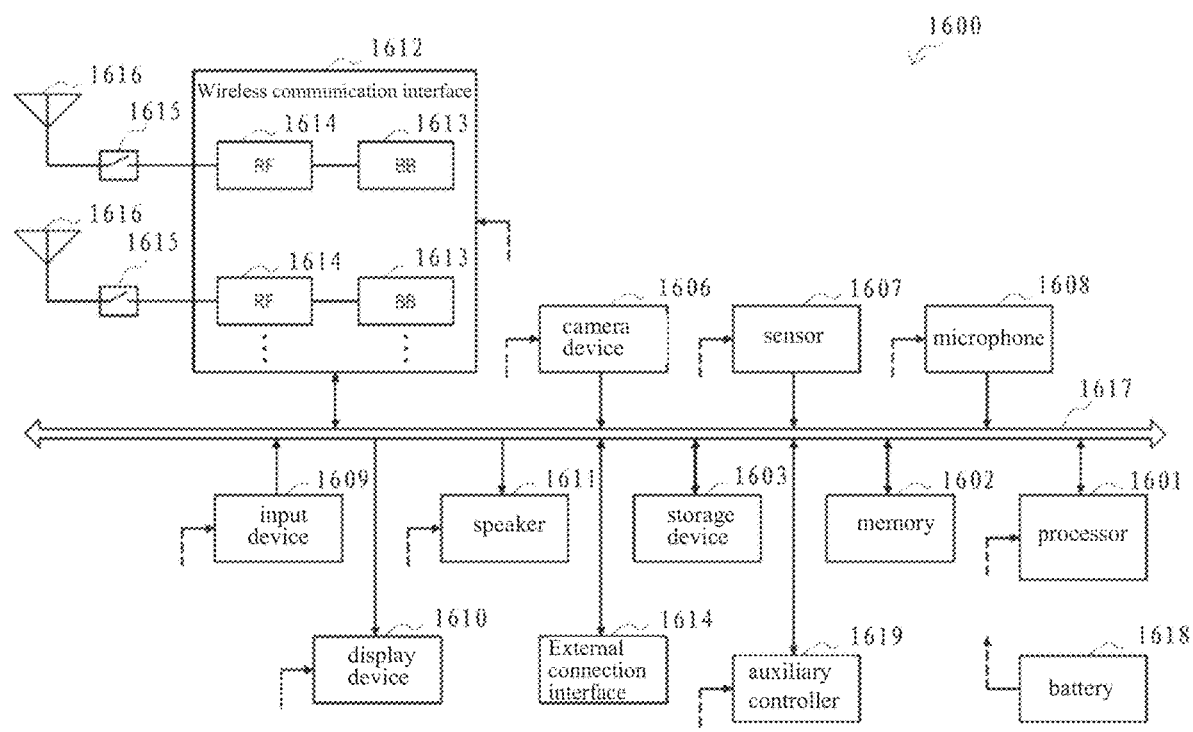
FIG. 29 is a block diagram showing an example of a schematic configuration of a smartphone to which the technology of the present disclosure can be applied.

FIG. 29 is a block diagram showing an example of a schematic configuration of a smartphone 1600 to which the technology of the present disclosure can be applied. The smartphone 1600 includes a processor 1601, a memory 1602, a storage device 1603, an external connection interface 1604, a camera device 1606, a sensor 1607, a microphone 1608, an input device 1609, a display device 1610, a speaker 1611, a wireless communication interface 1612, one or more antenna switches 1615, one or more antennas 1616, a bus 1617, a battery 1618, and an auxiliary controller 1619. In an implementation manner, the smart phone 1600 (or the processor 1601) herein may correspond to the foregoing terminal equipment 300B and/or 1500A.

The processor 1601 may be, for example, a CPU or a system on chip (SoC), and controls functions of an application layer and another layer of the smartphone 1600. The memory 1602 includes a RAM and a ROM, and stores data and programs executed by the processor 1601. The storage device 1603 may include a storage medium such as a semiconductor memory and a hard disk. The external connection interface 1604 is an interface for connecting external devices such as a memory card and a universal serial bus (USB) device to the smartphone 1600.

The camera device 1606 includes an image sensor such as a charge-coupled device (CCD) and a complementary metal oxide semiconductor (CMOS), and generates a captured image. The sensor 1607 may include a set of sensors such as a measurement sensor, a gyroscope sensor, a geomagnetic sensor, and an acceleration sensor. The microphone 1608 converts a sound input to the smartphone 1600 into an audio signal. The input device 1609 includes, for example, a touch sensor, a keypad, a keyboard, a button, or a switch configured to detect a touch on the screen of the display device 1610, and receives an operation or information input from a user. The display device 1610 includes a screen such as a liquid crystal display (LCD) and an organic light emitting diode (OLED) display, and displays an output image of the smartphone 1600. The speaker 1611 converts an audio signal output from the smartphone 1600 into a sound.

The wireless communication interface 1612 supports any cellular communication scheme such as LTE and LTE-Advanced, and performs wireless communication. The wireless communication interface 1612 may generally include, for example, a BB processor 1613 and an RF circuit 1614. The BB processor 1613 may perform, for example, encoding/decoding, modulation/demodulation, and multiplexing/demultiplexing, and perform various types of signal processing for wireless communication. Meanwhile, the RF circuit 1614 may include, for example, a mixer, a filter, and an amplifier, and transmits and receives wireless signals via the antenna 1616. The wireless communication interface 1612 may be a chip module on which a BB processor 1613 and an RF circuit 1614 are integrated. As shown in FIG. 29, the wireless communication interface 1612 may include multiple BB processors 1613 and multiple RF circuits 1614. Although FIG. 29 illustrates an example in which the wireless communication interface 1612 includes a plurality of BB processors 1613 and a plurality of RF circuits 1614, the wireless communication interface 1612 may also include a single BB processor 1613 or a single RF circuit 1614.

In addition, in addition to the cellular communication scheme, the wireless communication interface 1612 may support other types of wireless communication scheme, such as a short-range wireless communication scheme, a near field communication scheme, and a wireless local area network (LAN) scheme. In this case, the wireless communication interface 1612 may include a BB processor 1613 and an RF circuit 1614 for each wireless communication scheme.

Each of the antenna switches 1615 switches a connection destination of the antenna 1616 between a plurality of circuits included in the wireless communication interface 1612 (for example, circuits for different wireless communication schemes).

Each of the antennas 1616 includes a single or multiple antenna elements, such as multiple antenna elements included in a MIMO antenna, and is used for the wireless communication interface 1612 to transmit and receive wireless signals. As shown in FIG. 29, the smartphone 1600 may include a plurality of antennas 1616. Although FIG. 29 illustrates an example in which the smart phone 1600 includes a plurality of antennas 1616, the smart phone 1600 may also include a single antenna 1616.

In addition, the smartphone 1600 may include an antenna 1616 for each wireless communication scheme. In this case, the antenna switch 1615 may be omitted from the configuration of the smartphone 1600.

The bus 1617 connects the processor 1601, the memory 1602, the storage device 1603, the external connection interface 1604, the camera device 1606, the sensor 1607, the microphone 1608, the input device 1609, the display device 1610, the speaker 1611, the wireless communication interface 1612, and the auxiliary controller 1619 to each other. The battery 1618 supplies power to each block of the smartphone 1600 shown in FIG. 29 via a feeder, and the feeder is partially shown as a dotted line in the figure. The auxiliary controller 1619 operates the minimum necessary functions of the smartphone 1600 in the sleep mode, for example.

Second Example

Figure 30:
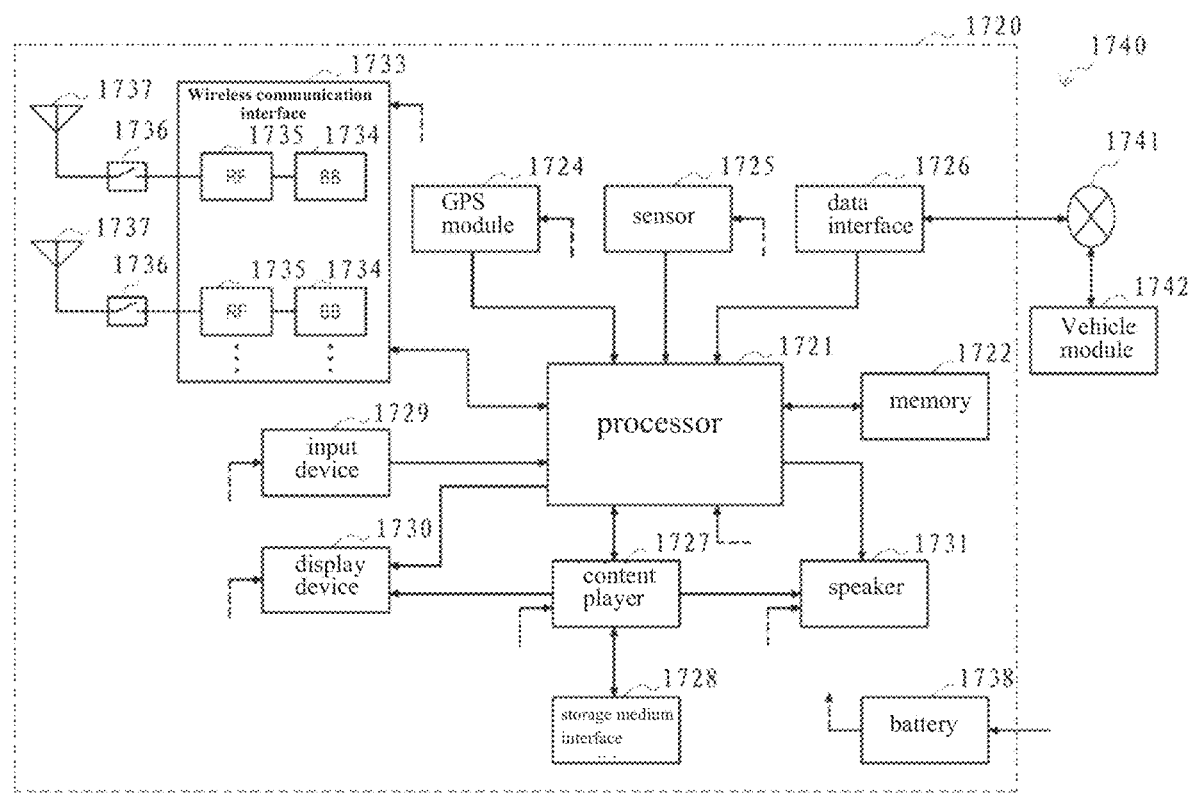
FIG. 30 is a block diagram showing an example of a schematic configuration of a car navigation device to which the technology of the present disclosure can be applied.

FIG. 30 is a block diagram showing an example of a schematic configuration of a car navigation device 1720 to which the technology of the present disclosure can be applied. The car navigation device 1720 includes a processor 1721, a memory 1722, a global positioning system (GPS) module 1724, a sensor 1725, a data interface 1726, a content player 1727, a storage medium interface 1728, an input device 1729, a display device 1730, a speaker 1731, and a wireless communication interface 1733, one or more antenna switches 1736, one or more antennas 1737, and a battery 1738. In an implementation manner, the car navigation device 1720 (or the processor 1721) herein may correspond to the terminal equipment 300B and/or 1500A described above.

The processor 1721 may be, for example, a CPU or a SoC, and controls navigation functions and other functions of the car navigation device 1720. The memory 1722 includes a RAM and a ROM, and stores data and programs executed by the processor 1721.

The GPS module 1724 uses a GPS signal received from a GPS satellite to measure the position (such as latitude, longitude, and altitude) of the car navigation device 1720. The sensor 1725 may include a set of sensors such as a gyroscope sensor, a geomagnetic sensor, and an air pressure sensor. The data interface 1726 is connected to, for example, an in-vehicle network 1741 via a terminal not shown, and acquires data (such as vehicle speed data) generated by the vehicle.

The content player 1727 reproduces content stored in a storage medium such as a CD and a DVD, which is inserted into the storage medium interface 1728. The input device 1729 includes, for example, a touch sensor, a button, or a switch configured to detect a touch on the screen of the display device 1730, and receives an operation or information input from a user. The display device 1730 includes a screen such as an LCD or OLED display, and displays an image of a navigation function or reproduced content. The speaker 1731 outputs the sound of the navigation function or the reproduced content.

The wireless communication interface 1733 supports any cellular communication scheme such as LTE and LTE-Advanced, and performs wireless communication. The wireless communication interface 1733 may generally include, for example, a BB processor 1734 and an RF circuit 1735. The BB processor 1734 may perform, for example, encoding/decoding, modulation/demodulation, and multiplexing/demultiplexing, and perform various types of signal processing for wireless communication. Meanwhile, the RF circuit 1735 may include, for example, a mixer, a filter, and an amplifier, and transmit and receive wireless signals via the antenna 1737. The wireless communication interface 1733 may also be a chip module on which a BB processor 1734 and an RF circuit 1735 are integrated. As shown in FIG. 30, the wireless communication interface 1733 may include a plurality of BB processors 1734 and a plurality of RF circuits 1735. Although FIG. 30 shows an example in which the wireless communication interface 1733 includes a plurality of BB processors 1734 and a plurality of RF circuits 1735, the wireless communication interface 1733 may also include a single BB processor 1734 or a single RF circuit 1735.

In addition, in addition to the cellular communication scheme, the wireless communication interface 1733 may support other types of wireless communication scheme, such as a short-range wireless communication scheme, a near field communication scheme, and a wireless LAN scheme. In this case, the wireless communication interface 1733 may include a BB processor 1734 and an RF circuit 1735 for each wireless communication scheme.

Each of the antenna switches 1736 switches the connection destination of the antenna 1737 between a plurality of circuits included in the wireless communication interface 1733, such as circuits for different wireless communication schemes.

Each of the antennas 1737 includes a single or multiple antenna elements, such as multiple antenna elements included in a MIMO antenna, and is used for the wireless communication interface 1733 to transmit and receive wireless signals. As shown in FIG. 30, the car navigation device 1720 may include a plurality of antennas 1737. Although FIG. 30 shows an example in which the car navigation device 1720 includes a plurality of antennas 1737, the car navigation device 1720 may also include a single antenna 1737.

In addition, the car navigation device 1720 may include an antenna 1737 for each wireless communication scheme. In this case, the antenna switch 1736 may be omitted from the configuration of the car navigation device 1720.

The battery 1738 supplies power to each block of the car navigation device 1720 shown in FIG. 30 via a feeder, and the feeder is partially shown as a dotted line in the figure. The battery 1738 accumulates power provided from the vehicle.

The technology of the present disclosure may also be implemented as a vehicle on-board system (or vehicle) 1740 including one or more of a car navigation device 1720, an in-vehicle network 1741, and a vehicle module 1742. The vehicle module 1742 generates vehicle data such as vehicle speed, engine speed, and failure information, and outputs the generated data to the in-vehicle network 1741.

The exemplary embodiments of the present disclosure have been described above with reference to the accompanying drawings, but the present disclosure is of course not limited to the above examples. A person skilled in the art may find various alternations and modifications within the scope of the appended claims, and it should be understood that they will naturally fall in the technical scope of the present disclosure.

For example, a plurality of functions included in one unit in the above embodiments may be implemented by separate devices. Alternatively, multiple functions implemented by multiple units in the above embodiments may be implemented by separate devices, respectively. In addition, one of the above functions may be implemented by multiple units. Needless to say, such configurations are included in the technical scope of the present disclosure.

In this specification, the steps described in the flowchart include not only processes performed in time series in the described order, but also processes performed in parallel or individually instead of having to be performed in time series. Further, even in the steps processed in a time series, needless to say, the order can be appropriately changed.

Although the present disclosure and its advantages have been described in detail, it should be understood that various changes, substitutions and alterations can be made hereto without departing from the spirit and scope of the present disclosure as defined by the appended claims. Furthermore, the terms "including", "comprising", or any other variation thereof, of the embodiments of the present disclosure are intended to encompass non-exclusive inclusion, such that a process, method, article, or device that includes a series of elements includes not only those elements, but also includes other elements not explicitly listed, or those inherent in the process, method, article, or equipment. Without more restrictions, the elements defined by the sentence "including a . . . " do not exclude the existence of other identical elements in the process, method, article, or equipment including the elements.

What is claimed is:

1. An electronic device for a receiver side in a wireless communication system, comprising:
   a processing circuitry configured to:
   estimate, based on reference signals from a transmitter of the wireless communication system, channel states on communication resources carrying the reference signals, wherein the reference signals are distributed over the communication resources in a low frequency domain range of the communication system, and frequency domain resources of the communication system are divided into a plurality of orthogonal frequency domain ranges; and
   estimate conditions of channel paths from the transmitter to the receiver using the estimated channel states on the low frequency communication resources,
   wherein channel states on communication resources of high frequency domain ranges from the transmitter to the receiver are derived from the estimated conditions of the channel paths,
   wherein the reference signals are carried on a part of subcarriers of a scheduled downlink data resource block, and downlink data is carried on other subcarriers, wherein the processing circuitry is configured to receive downlink data signal on a specified downlink data resource block and estimate channel states of the part of subcarriers based on the reference signals, wherein the processing circuitry is configured to restore downlink channel states of the other subcarriers on the specified downlink data resource block, wherein the processing circuitry is configured to use the downlink channel states of all subcarriers on the downlink data resource block to demodulate data on the downlink data resource block, and wherein the processing circuitry is configured to perform Hybrid Automatic Retransmission Request (HARQ) based on data demodulation status.

2. The electronic device of claim 1,
wherein the reference signals are distributed over the low frequency domain range at a predetermined interval, and
wherein the predetermined interval is determined based on a maximum delay spread of channel and a frequency domain interval between adjacent communication resources in the communication system.

3. The electronic device of claim 1, wherein the communication system is an OFDM-based communication system, and the communication resources correspond to the subcarriers, and wherein the number of subcarriers carrying the reference signals are determined based on accuracy of the channel estimation and a total bandwidth of the low frequency domain range which is expected to be occupied by the subcarriers containing the reference signals.

4. The electronic device of claim 1,
wherein the reference signal is a demodulation reference signal (DMRS), and
wherein the DMRS is carried on the part of subcarriers of a scheduled downlink data resource block, and downlink data is carried on the other subcarriers.

5. The electronic device of claim 4, wherein the processing circuitry is configured to receive downlink data signal on the specified downlink data resource block, and estimate channel states of the part of subcarriers based on the DMRS.

6. The electronic device of claim 1, wherein the number of paths and the phase parameter of each path are estimated based on a frequency spectrum of data of the estimated channel states of subcarriers, and wherein the number of paths corresponds to the number of peaks in the frequency spectrum of the data beyond a predetermined threshold and the phase parameter of each path are determined based on the frequency spectrum of a peak corresponding to the path.

7. The electronic device of claim 6, wherein the predetermined threshold is determined based on the number of subcarriers containing the reference signal and signal-to-noise ratio at the receiver side.

8. The electronic device of claim 7, wherein an intensity parameter of each path is estimated according to the estimated channel states of the subcarriers, the number of paths, and the phase parameter of each path.

9. The electronic device of claim 8, wherein the intensity parameter of each path is estimated by solving a set of linear equations for the intensity parameter of each path established based on a multipath channel model from the estimated channel states of the subcarriers, the number of paths and the phase parameter of each path.

10. The electronic device of claim 1, wherein channel states of subcarriers containing the reference signals are jointly estimated by using reference signals at least distributed over one time slot.

11. The electronic device of claim 10, wherein the reference signals are distributed over an entire transmission band in a specific time slot and the reference signals are only distributed over a part of a frequency band range in time slots other than the specific slot; and
wherein the number of paths and a phase parameter and an intensity parameter of each path are estimated using the reference signals in the specific time slot, and in a time slot immediately after the specific time slot, the intensity parameter of each path is updated by using the previously estimated number of paths and the phase parameter of each path.

12. The electronic device of claim 10, wherein in all time slots, the reference signals are only distributed over a part of a frequency band range, and
wherein for even-numbered and odd-numbered time slots, the reference signals are alternately distributed over a half of the frequency band range with lower frequency or a half of the frequency band range with higher frequency; and
wherein the number of paths and the phase parameter and the intensity parameter of each path are estimated using reference signals in one of the even-numbered time slots and the odd-numbered time slots, and at the other of the even-numbered time slots and the odd-numbered time slots after the time slot, the intensity parameter of each path is updated by using the previously estimated number of paths and the phase parameter of each path.

13. The electronic device of claim 1, wherein the receiver further comprises a radio frequency link and a transceiving antenna, and the radio frequency link and the transceiving antenna are configured to feed at least the information on the channel states on the communication resources of the low frequency domain range that are estimated by the processing circuitry back to the transmitter.

14. The electronic device of claim 1, wherein the electronic device for the receiver further comprises a transceiving antenna, which is configured to feed the estimated conditions of the channel paths back to the transmitter.

15. The electronic device of claim 14, wherein the transceiving antenna is further configured to receive transmission resource allocation information from the transmitter, and the processing circuitry is configured to control signal transmission and reception on allocated transmission resources, wherein the transmission resources are determined based on channel states on communication resources of respective frequency domain ranges from the transmitter to the receiver.

16. The electronic device of claim 1, wherein the communication system is a millimeter wave communication system, and the electronic device for the receiver is implemented as a user equipment or a base station, and further includes a transceiving antenna, where the transceiving antenna includes a plurality of antennas and phase shifters respectively coupled to each antenna, and the processing circuitry controls phase setting of the phase shifters based on a result of beam sweeping between the receiver and the transmitter to form beams directed toward the transmitter, and the transceiving antenna uses the beams to receive reference signals from the transmitter for channel estimation by the processing circuitry.

17. The electronic device of claim 1, wherein the electronic device is implemented as an aircraft and further comprises an altitude determination unit configured to determine and provide an altitude where the aircraft is currently located to the processing circuitry, and the processing circuitry is configured to estimate channel states on communication resources of the low frequency domain range and estimate conditions of channel paths from the transmitter to the receiver when it is determined that the altitude is above a predetermined threshold.

18. A method for an electronic device for a receiver side in a wireless communication system comprising:

estimating, based on reference signals from a transmitter of the wireless communication system, channel states on communication resources carrying the reference signals, wherein the reference signals are distributed over the communication resources in a low frequency domain range of the communication system, and frequency domain resources of the communication system are divided into a plurality of orthogonal frequency domain ranges, the reference signals being carried on a part of subcarriers of a scheduled downlink data resource block, and downlink data being carried on other subcarriers;

estimating conditions of channel paths from the transmitter to the receiver using the estimated channel states on the low frequency communication resources, wherein channel states on communication resources of high frequency domain ranges from the transmitter to the receiver are derived from the estimated conditions of the channel paths:

receiving downlink data signal on a specified downlink data resource block;

restoring downlink channel states of the other subcarriers on the specified downlink data resource block;

using the downlink channel states of all subcarriers on the downlink data resource block to demodulate data on the downlink data resource block; and performing Hybrid Automatic Retransmission Request (HARQ) based on data demodulation status.

19. A non-transitory computer-readable storage medium including computer executable instructions, wherein the instructions, when executed by an electronic device for a receiver side in a wireless communication system, cause the electronic device to perform a method, the method comprising:

estimating, based on reference signals from a transmitter of the wireless communication system, channel states on communication resources carrying the reference signals, wherein the reference signals are distributed over the communication resources in a low frequency domain range of the communication system, and frequency domain resources of the communication system are divided into a plurality of orthogonal frequency domain ranges, the reference signals being carried on a part of subcarriers of a scheduled downlink data resource block, and downlink data being carried on other subcarriers;

estimating conditions of channel paths from the transmitter to the receiver using the estimated channel states on the low frequency communication resources, wherein channel states on communication resources of high frequency domain ranges from the transmitter to the receiver are derived from the estimated conditions of the channel paths:

receiving downlink data signal on a specified downlink data resource block;

restoring downlink channel states of the other subcarriers on the specified downlink data resource block;

using the downlink channel states of all subcarriers on the downlink data resource block to demodulate data on the downlink data resource block; and performing Hybrid Automatic Retransmission Request (HARQ) based on data demodulation status.

* * * * *